(12) United States Patent
Ito

(10) Patent No.: US 7,289,275 B2
(45) Date of Patent: Oct. 30, 2007

(54) ZOOM LENS SYSTEM AND IMAGE PICKUP APPARATUS HAVING THE SYSTEM

(75) Inventor: Daisuke Ito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/293,751

(22) Filed: Dec. 2, 2005

(65) Prior Publication Data

US 2006/0132929 A1 Jun. 22, 2006

(30) Foreign Application Priority Data

Dec. 16, 2004 (JP) ............................. 2004-364447

(51) Int. Cl.
*G02B 15/14* (2006.01)
(52) U.S. Cl. ...................................... 359/689; 359/683
(58) Field of Classification Search ................ 359/683, 359/689

See application file for complete search history.

(56) References Cited

U.S. PATENT DOCUMENTS

| | | | |
|---|---|---|---|
| 4,647,160 A | 3/1987 | Ikemori | |
| 4,810,072 A | 3/1989 | Takahashi | |
| 4,828,372 A | 5/1989 | Betensky | |
| 4,838,666 A | 6/1989 | Shiraishi | |
| 5,270,863 A | 12/1993 | Uzawa | |
| 5,872,660 A | 2/1999 | Kohno | |
| 6,038,084 A | 3/2000 | Okada | |
| 6,124,984 A | 9/2000 | Shibayama | |
| 6,304,389 B1 | 10/2001 | Shibayama | |
| 6,498,688 B2 | 12/2002 | Shibayama | |
| 6,618,210 B2 | 9/2003 | Noguchi | |
| 6,671,103 B2 | 12/2003 | Itoh | |
| 6,856,467 B2 * | 2/2005 | Iyama | ........................ 359/682 |
| 7,042,652 B2 * | 5/2006 | Nose et al. | .................. 359/689 |
| 2002/0149857 A1 | 10/2002 | Nobe | |
| 2002/0154908 A1 | 10/2002 | Itoh | |
| 2003/0103157 A1 | 6/2003 | Watanabe | |
| 2005/0068634 A1 * | 3/2005 | Miyatake et al. | ........... 359/676 |

FOREIGN PATENT DOCUMENTS

| | | |
|---|---|---|
| JP | 59-018917 A | 1/1984 |
| JP | 61-267721 A | 11/1986 |
| JP | 63-135913 A | 6/1988 |
| JP | 3-288113 A | 12/1991 |
| JP | 4-217219 A | 8/1992 |
| JP | 06-094996 A | 4/1994 |
| JP | 7-261083 A | 10/1995 |
| JP | 9-258103 A | 10/1997 |
| JP | 10-039214 A | 2/1998 |

(Continued)

*Primary Examiner*—Ricky Mack
*Assistant Examiner*—William C Choi
(74) *Attorney, Agent, or Firm*—Canon U.S.A. Inc IP Division

(57) ABSTRACT

At least one exemplary embodiment is directed to a zoom lens system including, in order from an object side to an image side: a first lens unit having a negative optical power; a second lens unit having a positive optical power; and a third lens unit having a positive optical power. In this particular exemplary embodiment, the zoom lens system changes an interval between the first and second lens units, and an interval between the second and third lens units during zooming.

14 Claims, 29 Drawing Sheets

FOREIGN PATENT DOCUMENTS

| | | |
|---|---|---|
| JP | 10-213745 A | 8/1998 |
| JP | 11-52246 A | 2/1999 |
| JP | 2895843 B | 3/1999 |
| JP | 11-119101 A | 4/1999 |
| JP | 11-174322 A | 7/1999 |
| JP | 11-194274 A | 7/1999 |
| JP | 2001-42218 A | 2/2001 |
| JP | 2002-23053 A | 1/2002 |
| JP | 2002-196238 A | 7/2002 |
| JP | 2002-196240 A | 7/2002 |
| JP | 2002-267930 A | 9/2002 |
| JP | 2002-365545 A | 12/2002 |
| JP | 2003-156686 A | 5/2003 |
| JP | 2002-023053 A | 2/2007 |

* cited by examiner

ZOOM LENS SYSTEM AND IMAGE PICKUP APPARATUS HAVING THE SYSTEM

BACKGROUND OF THE INVENTION

1. Field of the Invention

The present invention relates to a zoom lens system, and more particularly although not exclusively, to a zoom lens system which can be used with or in an optical photography system.

2. Description of the Related Art

In recent years, with improvements in video cameras and digital still cameras using solid-state image pickup elements, there has been a demand for an image pickup optical system having a zoom lens that include a wide field angle and a large aperture ratio which can be used in the cameras.

In this type of camera, various types of optical members (e.g., a low pass filter and a color correction filter) can be disposed between a lens backmost portion and the image pickup element. Therefore, a lens system having a comparatively back focus is required for the optical system to be used in conventional cameras. Furthermore, in the camera using the image pickup element for a color image, the optical system which can be used in the camera is required to have a satisfactory telecentric property on an image side in order to avoid color shading.

Heretofore, conventional systems have proposed various two-unit zoom lenses of a so-called short zoom type which is constituted of two lens units: a first lens unit having a negative refractive power; and a second lens unit having a positive refractive power and which performs zooming while changing an interval between lenses. In these short zoom type of zoom lenses, the second lens unit which can have the positive refractive power is moved to vary a magnification, and the first lens unit which can have the negative refractive power is moved to compensate for an image position in association with the varying of the magnification. In such two lens units, a zoom ratio is about two.

Furthermore, to form the whole lens into a compact shape while achieving a two or higher zoom ratio, conventional systems proposed a so-called three-unit zoom lens in which a third lens unit having a negative or positive refractive power is disposed on an image side of the two-unit zoom lens (e.g., Japanese Examined Patent Application Publication (Kokoku) No. 7-3507 (corresponding to U.S. Pat. No. 4,810,072) and Japanese Examined Patent Application Publication (Kokoku) No. 6-40170 (corresponding to U.S. Pat. No. 4,647,160)). Conventional system have discussed various configurations of three unit zoom lens (e.g., Japanese Unexamined Patent Publication (Kokai) No. 63-135913 (corresponding to: U.S. Pat. No. 4,838,666), Japanese Unexamined Patent Publication (Kokai) No. 7-261083).

In a conventional three-unit zoom lens discussed in Japanese Unexamined Patent Publication (Kokai) No. 3-288113 (corresponding to U.S. Pat. No. 5,270,863), a zoom lens includes a fixed first lens unit having a negative refractive power, and a second and third lens units having a positive refractive powers which are moved to perform zooming.

Moreover, in the three-unit zoom lens where the first lens unit has a negative refractive power, and the second and third lens units have a positive refractive power, conventional systems discuss a configuration where the second lens unit is constituted of a positive first lens subunit, a positive second lens subunit, a negative third lens subunit, and a positive fourth lens subunit (e.g., Japanese Unexamined Patent Publication (Kokai) No. 9-258103 (corresponding to U.S. Pat. No. 5,872,660), Japanese Unexamined Patent Publication (Kokai) No. 11-52246 (corresponding to U.S. Pat. No. 6,124,984), Japanese Unexamined Patent Publication (Kokai) No. 11-174322, Japanese Unexamined Patent Publication (Kokai) No. 11-194274, Japanese Patent No. 3466385, Japanese Unexamined Patent Publication (Kokai) No. 2002-23053 (corresponding to U.S. Pat. No. 6,618,210), Japanese Unexamined Patent Publication (Kokai) No. 2002-196240 (corresponding to USAA 2002149857)).

Other conventional systems discuss three-unit zoom lens, which are constituted of lens units having a negative, positive, and positive refractive powers, with a three or higher zoom ratio (e.g., Japanese Unexamined Patent Publication (Kokai) No. 4-217219, Japanese Unexamined Patent Publication (Kokai) No. 10-039214, Japanese Unexamined Patent Publication (Kokai) No. 10-213745, Japanese Unexamined Patent Publication (Kokai) No. 11-119101 (corresponding to U.S. Pat. No. 6,038,084), Japanese Unexamined Patent Publication (Kokai) No. 11-174322, Japanese Unexamined Patent Publication (Kokai) No. 2001-42218 (corresponding to U.S. Pat. No. 6,304,389, Japanese Unexamined Patent Publication (Kokai) No. 2002-365545 (corresponding to USAA 2003103157), Japanese Unexamined Patent Publication (Kokai) No. 2002-267930 (corresponding to U.S. Pat. No. 6,498,688), Japanese Unexamined Patent Publication (Kokai) No. 2003-156686, and Japanese Patent No. 2895843 (corresponding to U.S. Pat. No. 4,828,372.)).

The conventional three-unit zoom lens designed for a 35 mm film photograph has such an excessively long back focus and unsatisfactory telecentric property that the lens is typically not suitable which can be used in image pickup apparatus using the solid-state image pickup element.

On the other hand, a so-called retracting type of zoom lens has been broadly used in which at a non-photographing time, an interval between the lens units is reduced to an interval that is different from that at a photographing time, and a length of the lens protruded from a camera main body is reduced in order to establish both a compact size of the camera and a high zoom ratio of the zoom lens.

In general, when the number of the lenses of each lens unit constituting the zoom lens is large, the length of each lens unit on an optical axis increases. When a movement amount of each lens unit in zooming and focusing is large, a total length of the lens system increases. As a result, typically a desired retracted length cannot be achieved, and it becomes difficult to use a retracting type of zoom lens. This tendency increases, when the zoom ratio of the zoom lens increases.

On the other hand, when a non-spherical lens is used, the number of the lenses can be reduced. However, the non-spherical lens is more expensive than a spherical lens. Therefore, when the number of the non-spherical lenses is increased, costs will increase.

SUMMARY OF THE INVENTION

At least one exemplary embodiment is directed to a zoom lens system in which the number of constituting lenses is set to be as small as possible but which has a superior optical performance.

A zoom lens system in accordance with at least one exemplary embodiment comprises, in order from an object side to an image side, a first lens unit having a negative optical power, a second lens unit having a positive optical power, and a third lens unit having a positive optical power. Moreover, an interval between the first and second lens units, and an interval between the second and third lens units change during zooming. In such zoom lens system, a constitution of each lens unit, and an arrangement of the respective lens units are appropriately set.

DESCRIPTION OF THE EMBODIMENTS

Figure 1:
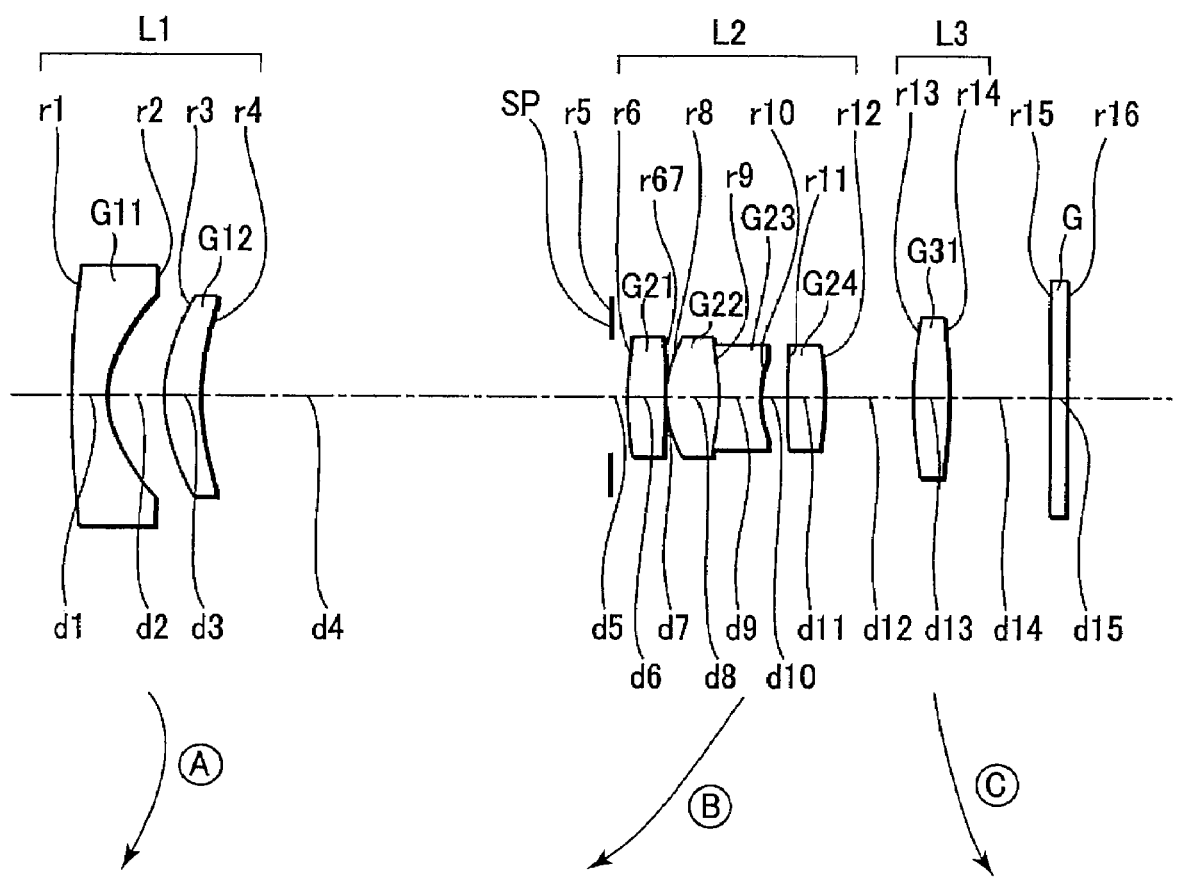
FIG. 1 illustrates a sectional view of a zoom lens of Exemplary Embodiment 1.

The following description of exemplary embodiment(s) is merely illustrative in nature and is in no way intended to limit the invention, its application, or uses.

Exemplary embodiments can be operatively connected to various imaging devices (e.g., electronic cameras, camcorders, video cameras, digital still cameras, film cameras, broadcast cameras, other imaging devices as known by one of ordinary skill, and equivalents) forming imaging systems.

Processes, techniques, apparatus, and materials as known by one of ordinary skill in the art may not be discussed in detail but are intended to be part of the enabling description where appropriate. For example lens and lens units are discussed and any material that can be used to form lenses should fall within the scope of exemplary embodiments (e.g., glass, Si). Additionally the actual size of the lens may not be discussed however any size from macro lenses to nano lenses are intended to lie within the scope of exemplary embodiments (e.g. lenses with diameters of nanometer size, micro size, centimeter size, and meter sizes).

Additionally exemplary embodiments are not limited to visual imaging devices (e.g., optical photographic systems), for example the system can be designed which can be used with infrared and other wavelength imaging systems. Additionally, exemplary embodiments can be used with non-digital systems as well as digital systems (e.g., photographic systems using CCDs).

Notice that similar reference numerals and letters refer to generally similar items in the following figures which may have different detailed properties from figure to figure depending upon the numerical examples associated with each figure. For example, L1 refers general to the first lens unit. The first lens unit L1 in FIG. 1 associated with numerical example 1, will have different detailed properties from the first unit L1 in FIG. 3 associated with the second numerical example.

Next, exemplary embodiments of a zoom lens system according to at least one exemplary embodiment will be described. First, zoom lenses of Exemplary Embodiments 1 to 9 will be described.

Figure 2A:
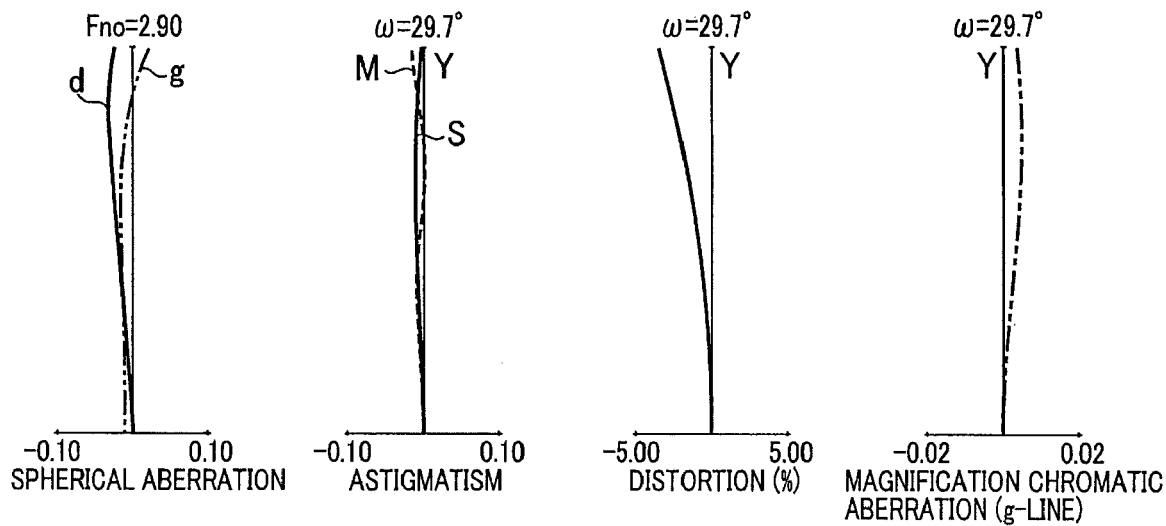
FIGS. 2A-2C illustrate an aberration diagram of the zoom lens of Exemplary Embodiment 1.
Figure 2B:
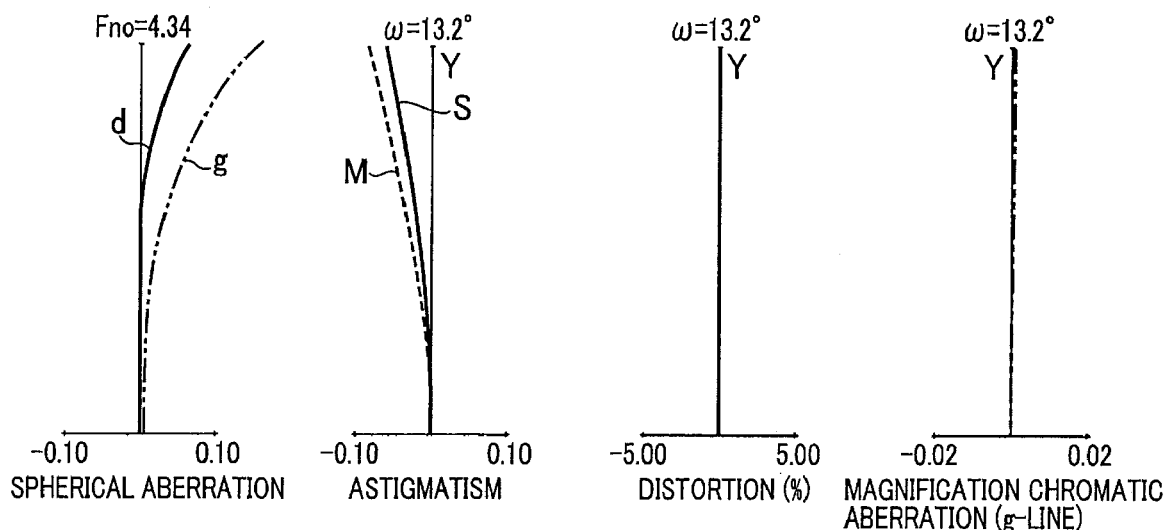
Figure 2C:
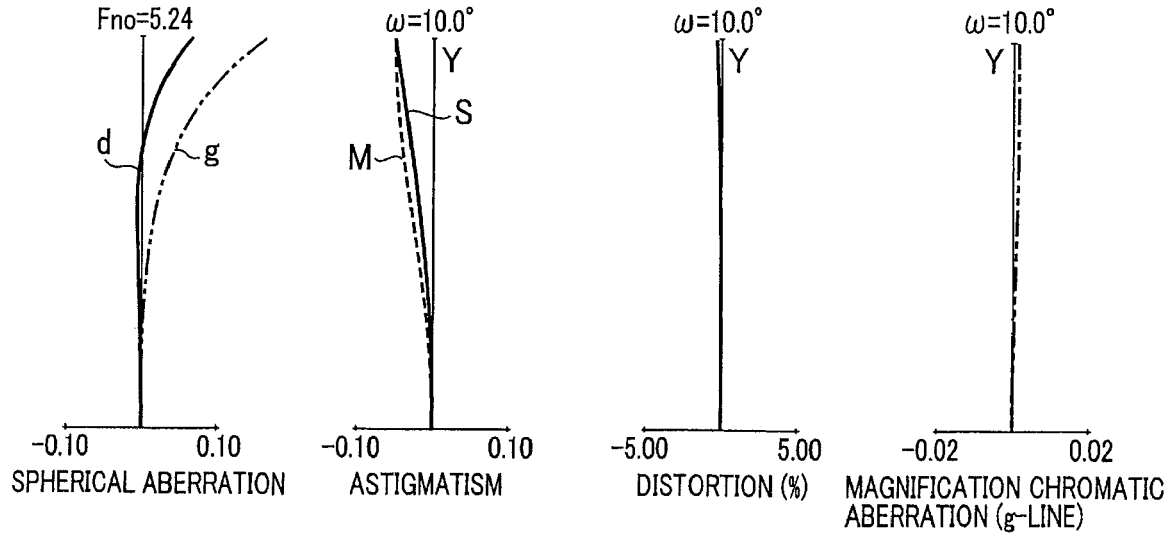

FIG. 1 illustrates a lens sectional view in a wide-angle end of a zoom lens according to Exemplary Embodiment 1. FIGS. 2(A) to (C) illustrate aberration diagrams of the wide-angle end of the zoom lens, an intermediate zoom position, and a telephoto end respectively, according to Exemplary Embodiment 1. The example of Exemplary Embodiment 1 relates to the zoom lens having a zoom ratio of about 3.1, and an aperture ratio of about 2.9 to 5.2.

Figure 3:
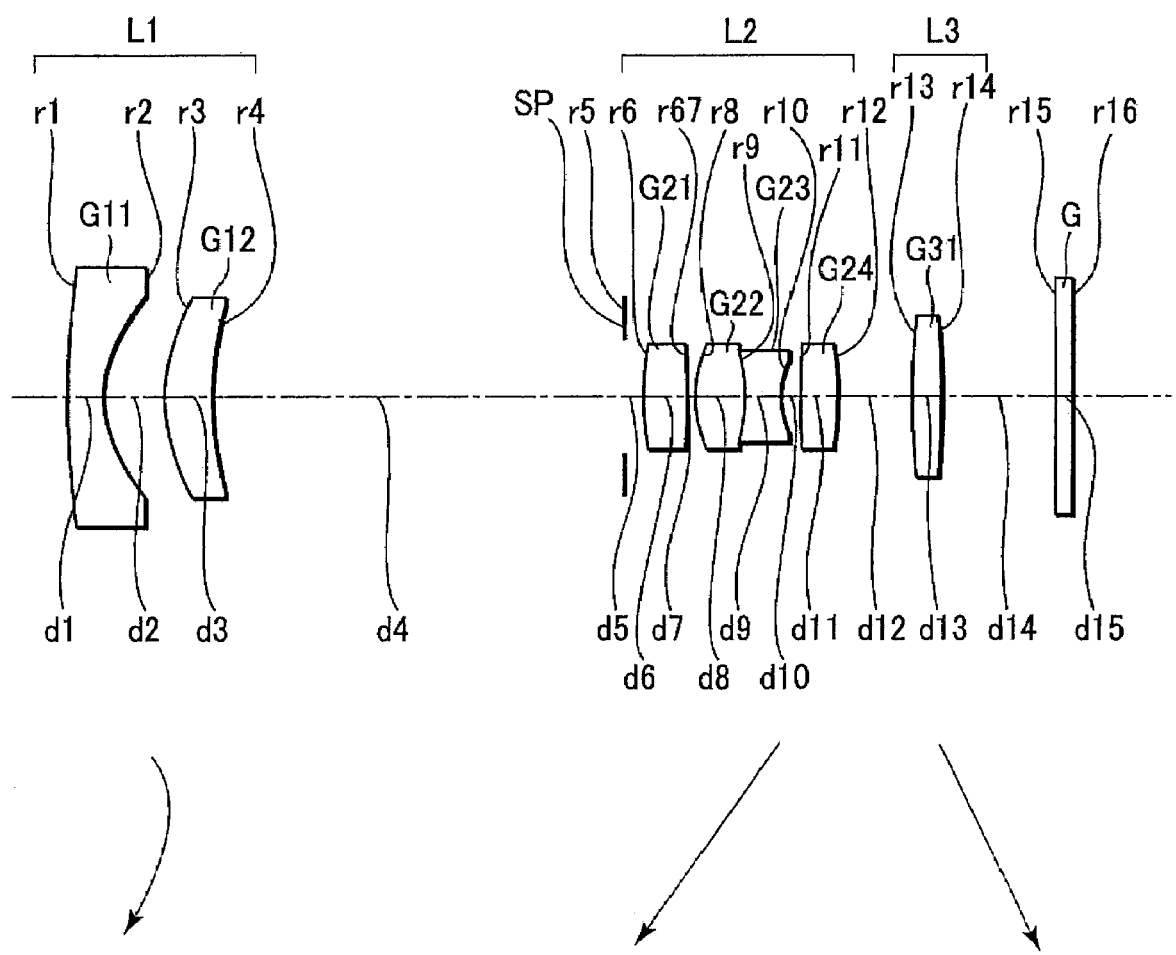
FIG. 3 illustrates a sectional view of a zoom lens of Exemplary Embodiment 2.
Figure 4A:
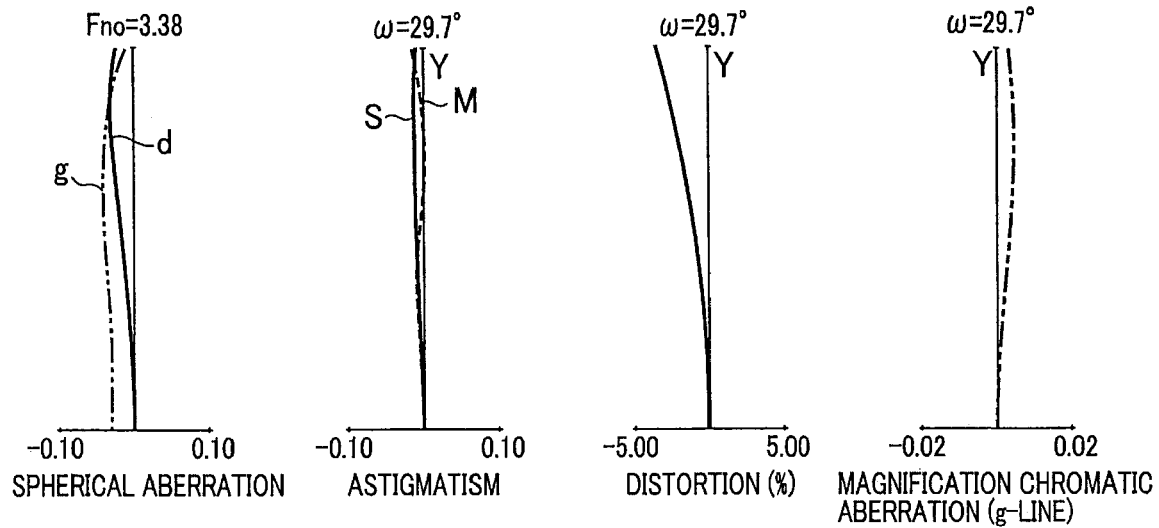
FIGS. 4A-4C illustrate an aberration diagram of the zoom lens of Exemplary Embodiment 2.
Figure 4B:
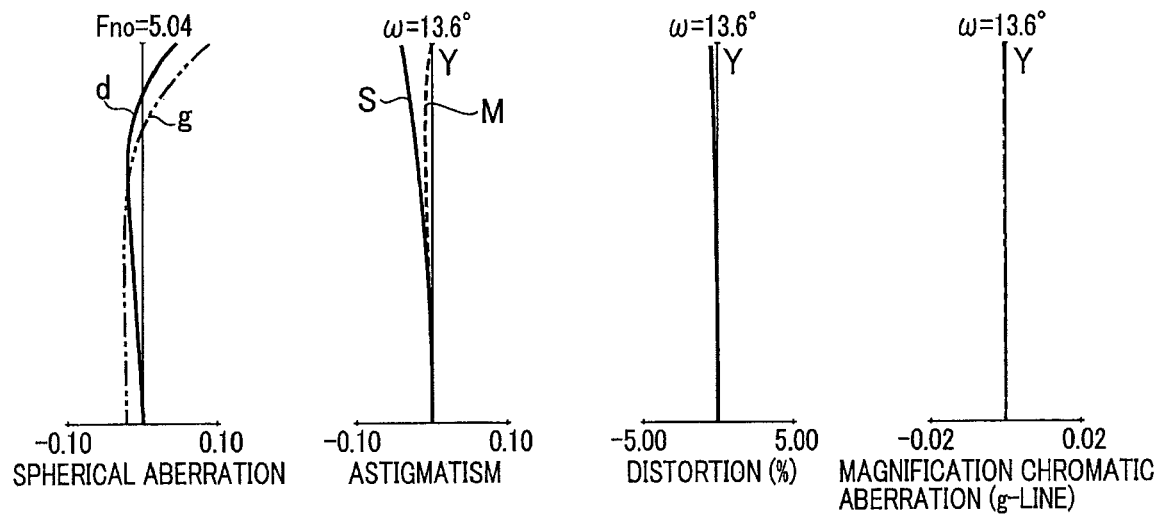
Figure 4C:
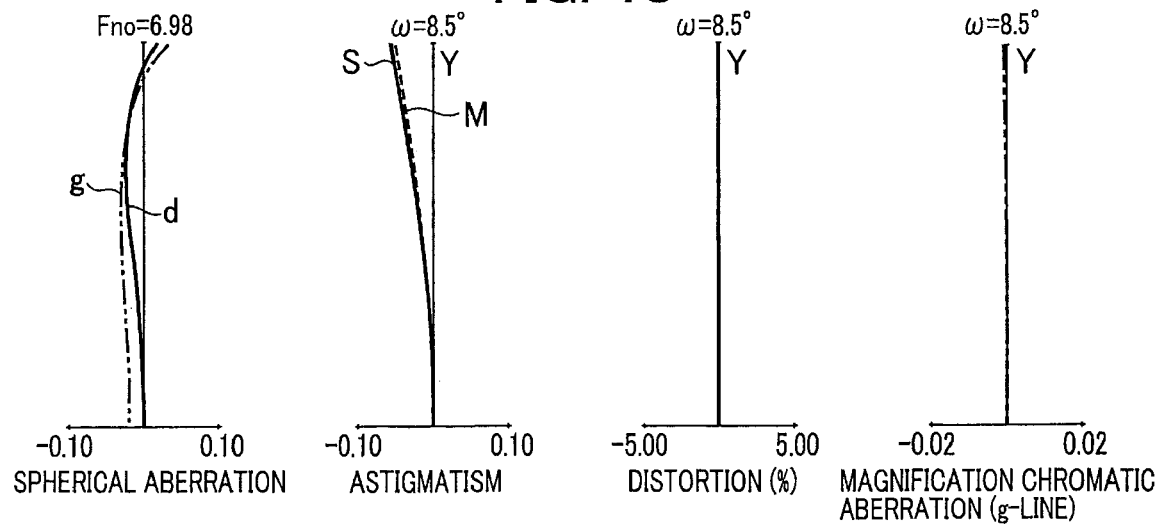

FIG. 3 is a lens sectional view in a wide-angle end of a zoom lens according to Exemplary Embodiment 2. FIGS. 4(A) to (C) illustrate aberration diagrams of the wide-angle end of the zoom lens, an intermediate zoom position, and a telephoto end respectively, according to Exemplary Embodiment 2. The example of Exemplary Embodiment 2 relates to the zoom lens having a zoom ratio of about 3.7, and an aperture ratio of about 3.4 to 7.0.

Figure 5:
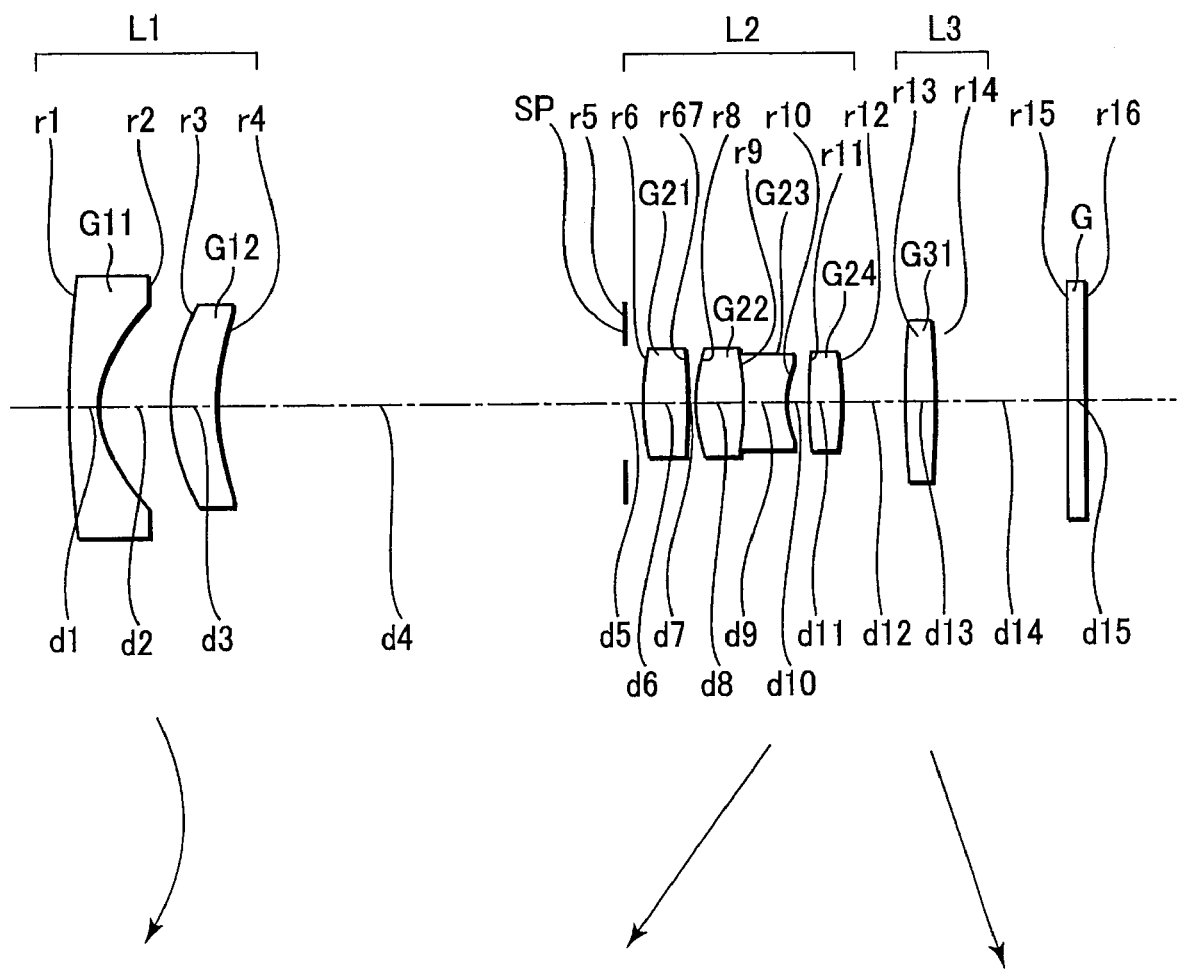
FIG. 5 illustrates a sectional view of a zoom lens of Exemplary Embodiment 3.
Figure 6A:
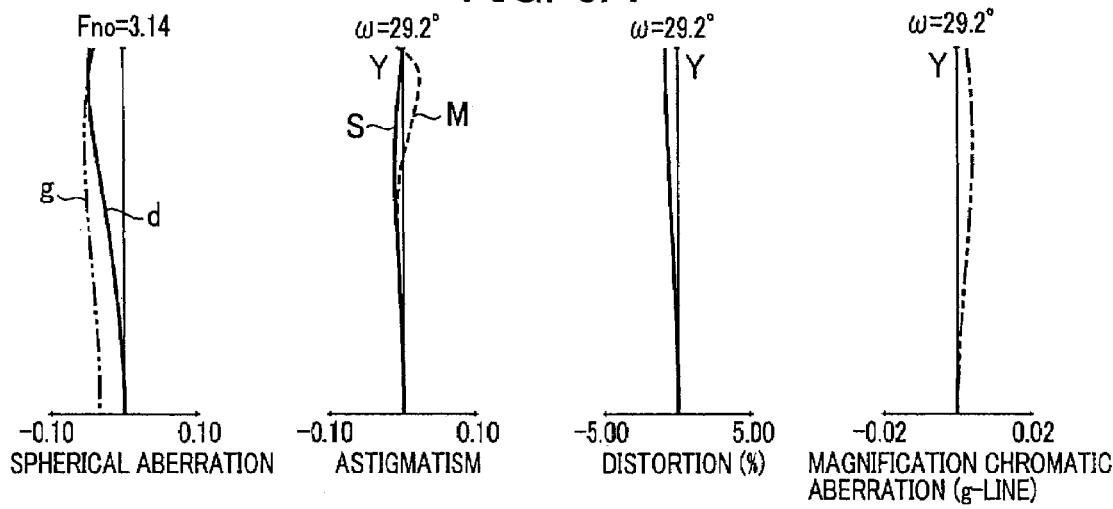
FIGS. 6A-6C illustrate an aberration diagram of the zoom lens of Exemplary Embodiment 3.
Figure 6B:
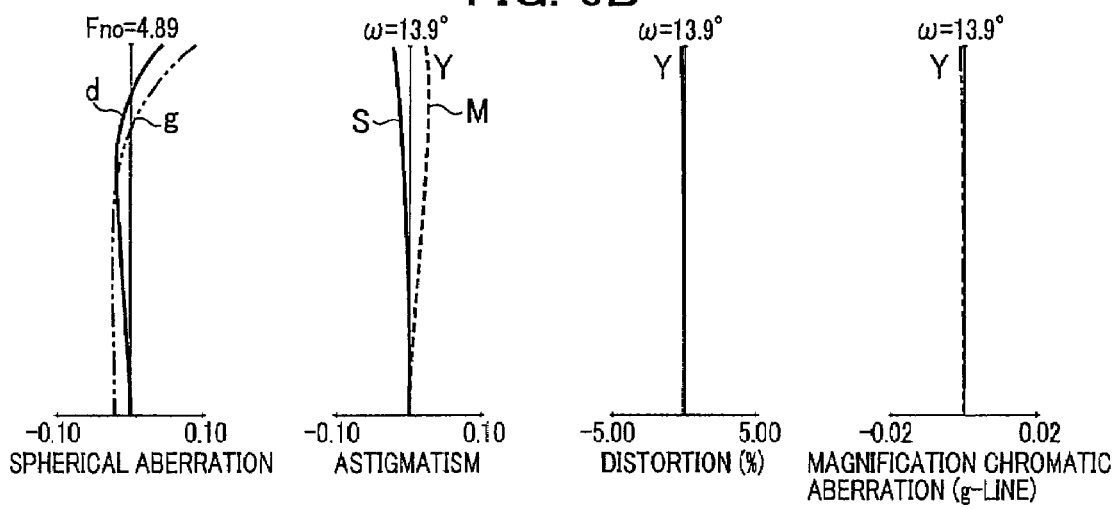
Figure 6C:
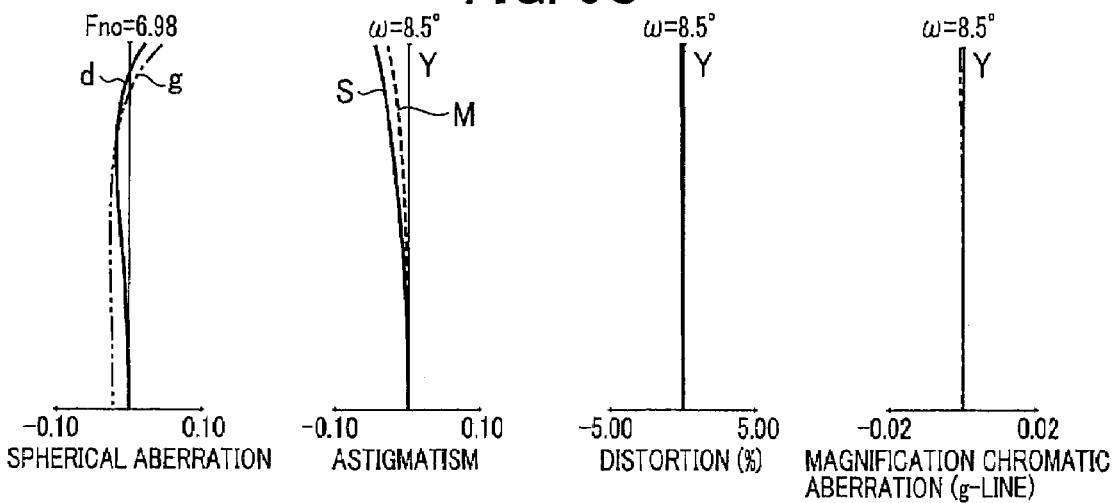

FIG. 5 is a lens sectional view in a wide-angle end of a zoom lens according to Exemplary Embodiment 3. FIGS. 6(A) to (C) illustrate aberration diagrams of the wide-angle end of the zoom lens, an intermediate zoom position, and a telephoto end respectively, according to Exemplary Embodiment 3. The example of Exemplary Embodiment 3 relates to the zoom lens having a zoom ratio of about 3.8, and an aperture ratio of about 3.1 to 7.0.

Figure 7:
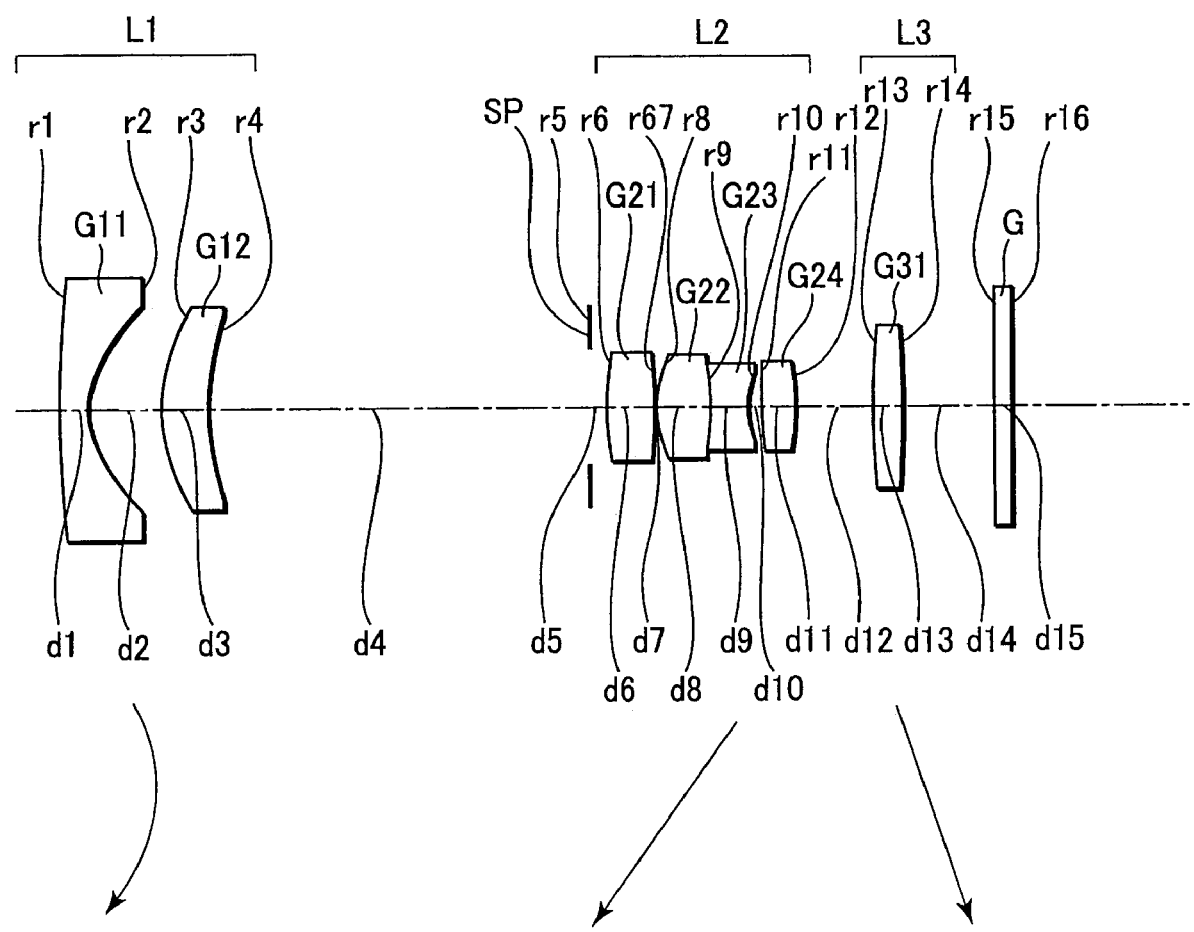
FIG. 7 illustrates a sectional view of a zoom lens of Exemplary Embodiment 4.
Figure 8A:
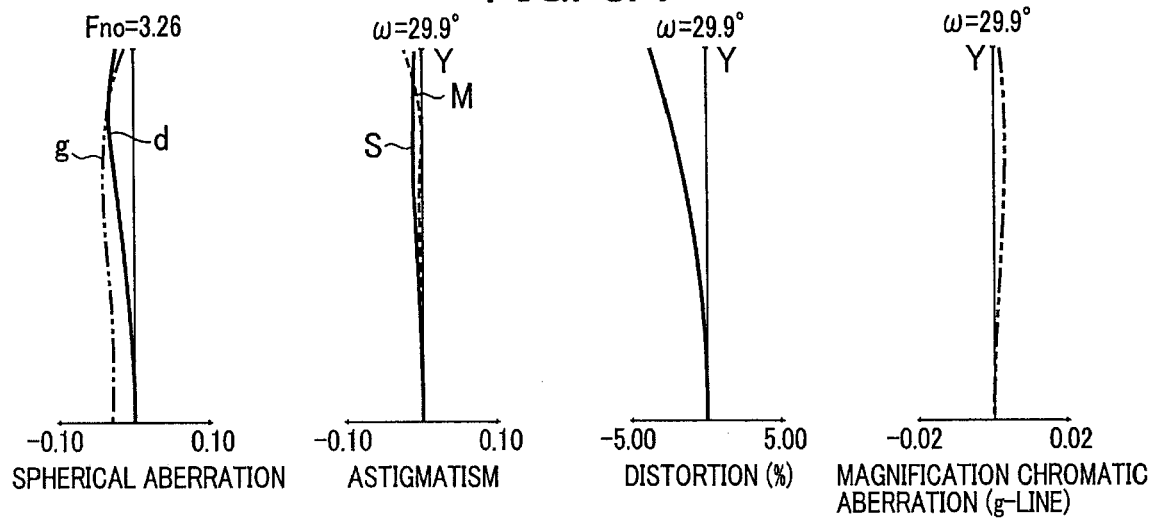
FIGS. 8A-8C illustrate an aberration diagram of the zoom lens of Exemplary Embodiment 4.
Figure 8B:
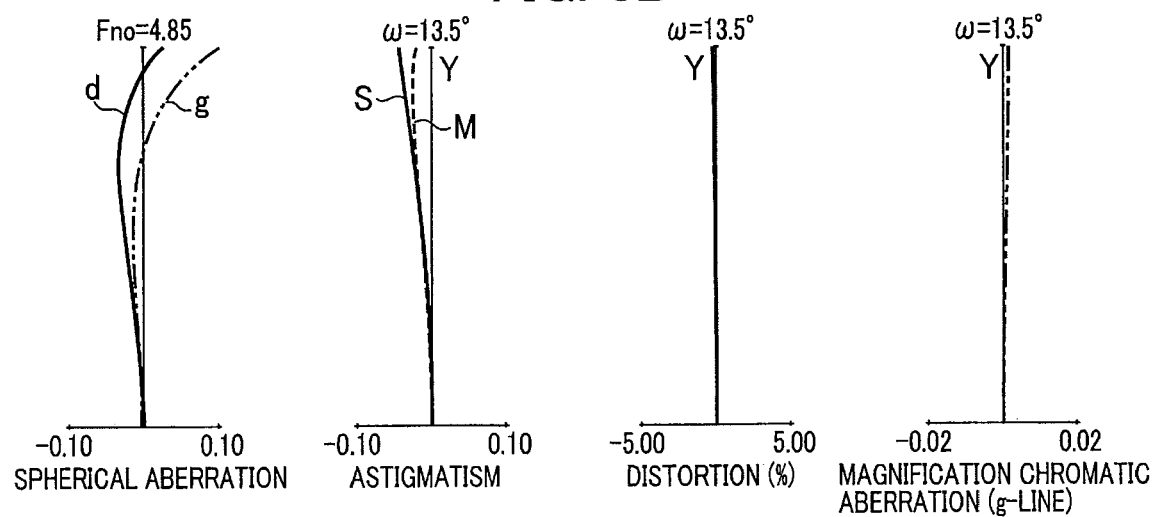
Figure 8C:
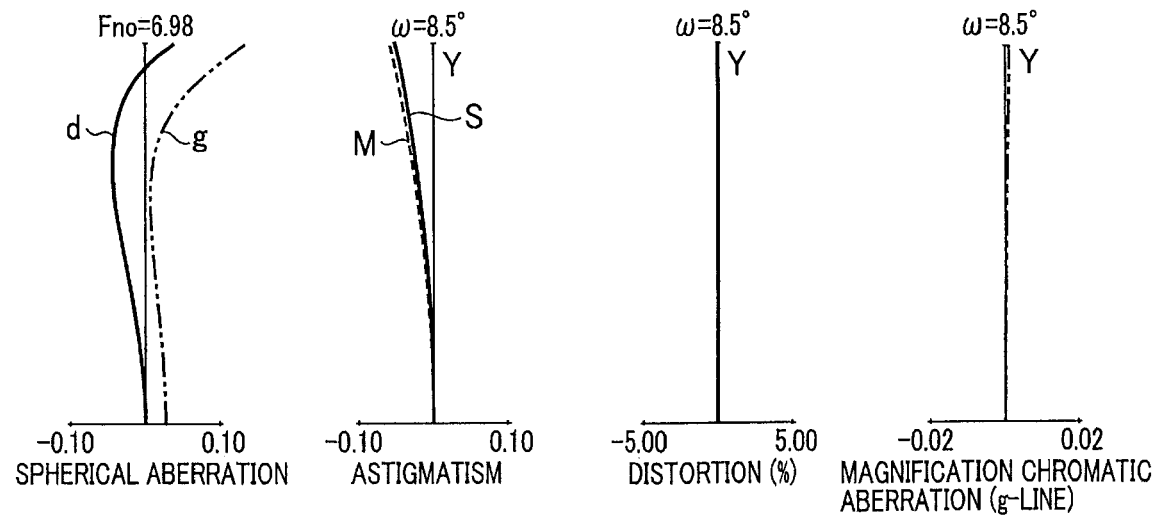

FIG. 7 is a lens sectional view in a wide-angle end of a zoom lens according to Exemplary Embodiment 4. FIGS.

8(A) to (C) illustrate aberration diagrams of the wide-angle end of the zoom lens, an intermediate zoom position, and a telephoto end respectively, according to Exemplary Embodiment 4. The example of Exemplary Embodiment 4 relates to the zoom lens having a zoom ratio of about 3.8, and an aperture ratio of about 3.3 to 7.0.

Figure 9:
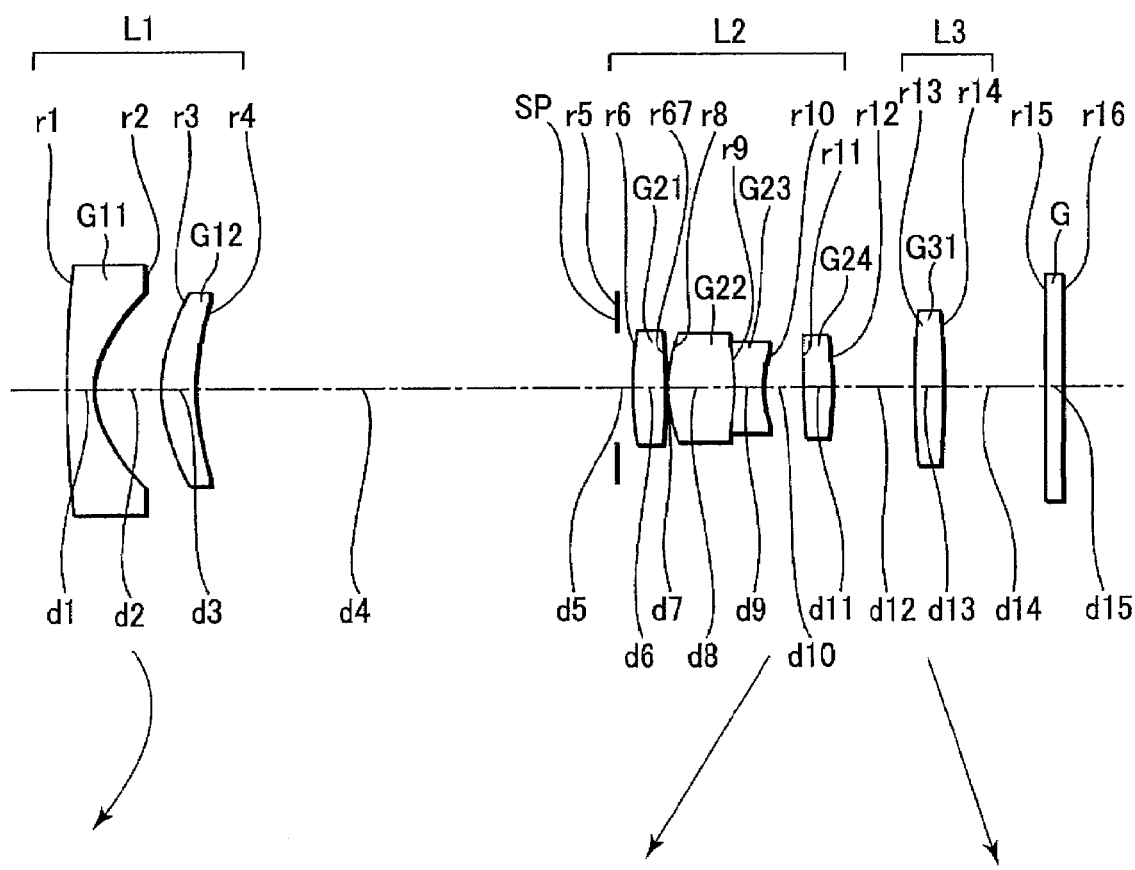
FIG. 9 illustrates a sectional view of a zoom lens of Exemplary Embodiment 5.
Figure 10A:
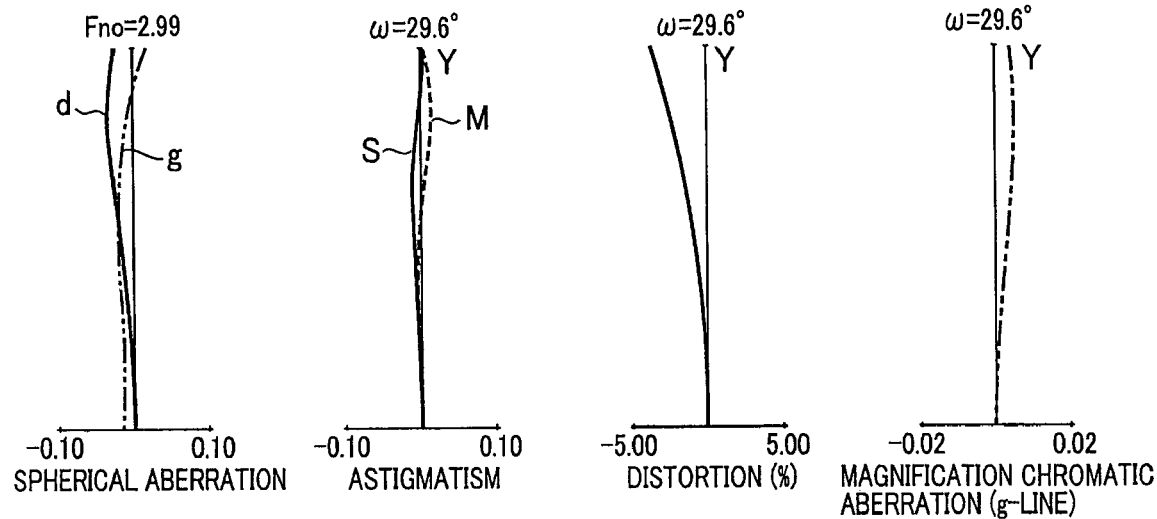
FIGS. 10A-10C illustrate an aberration diagram of the zoom lens of Exemplary Embodiment 5.
Figure 10B:
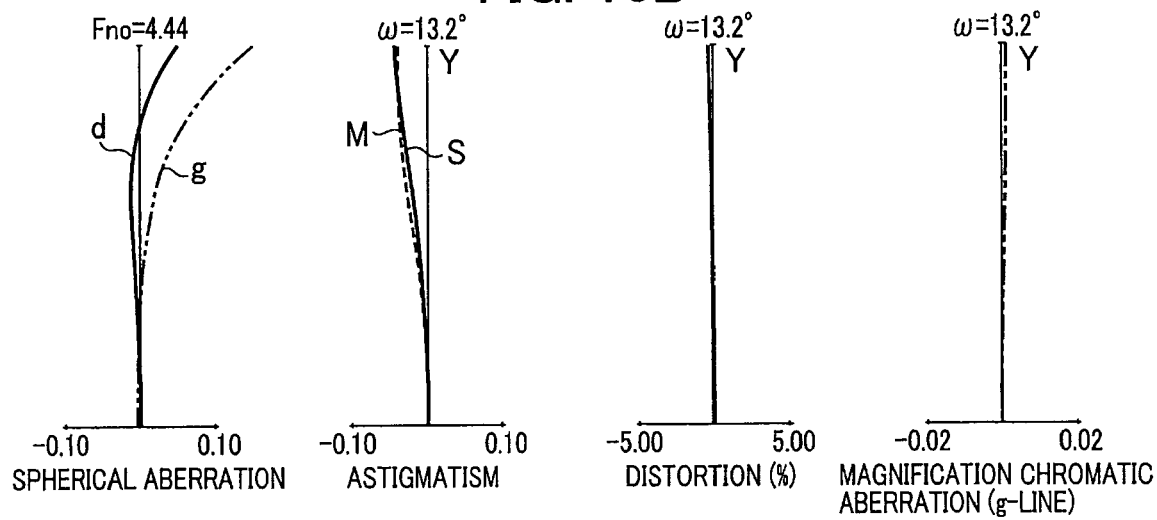
Figure 10C:
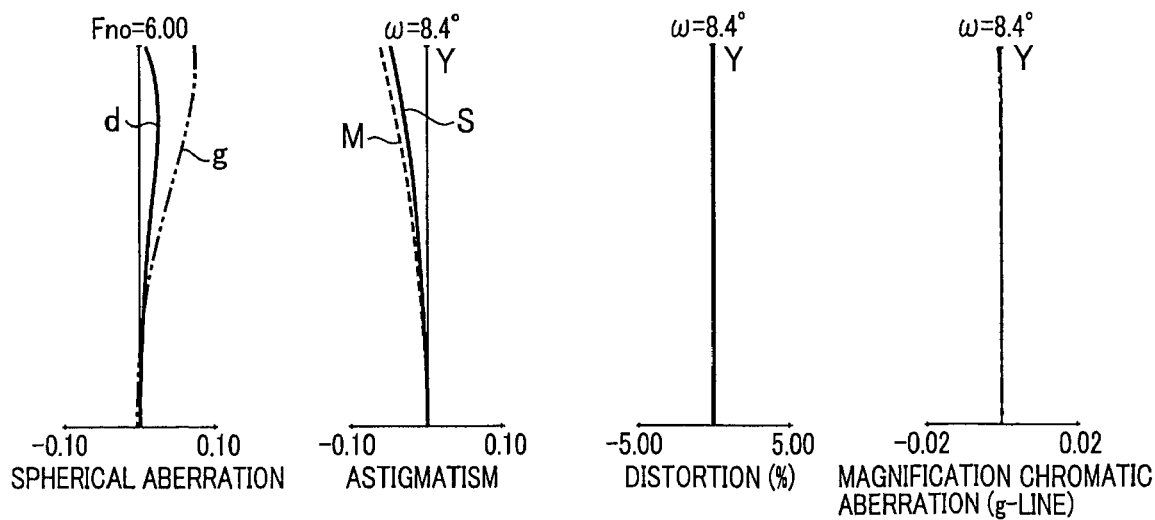

FIG. 9 is a lens sectional view in a wide-angle end of a zoom lens according to Exemplary Embodiment 5. FIGS. 10(A) to (C) illustrate aberration diagrams of the wide-angle end of the zoom lens, an intermediate zoom position, and a telephoto end respectively, according to Exemplary Embodiment 5. The example of Exemplary Embodiment 5 relates to the zoom lens having a zoom ratio of about 3.8, and an aperture ratio of about 3.0 to 6.0.

Figure 11:
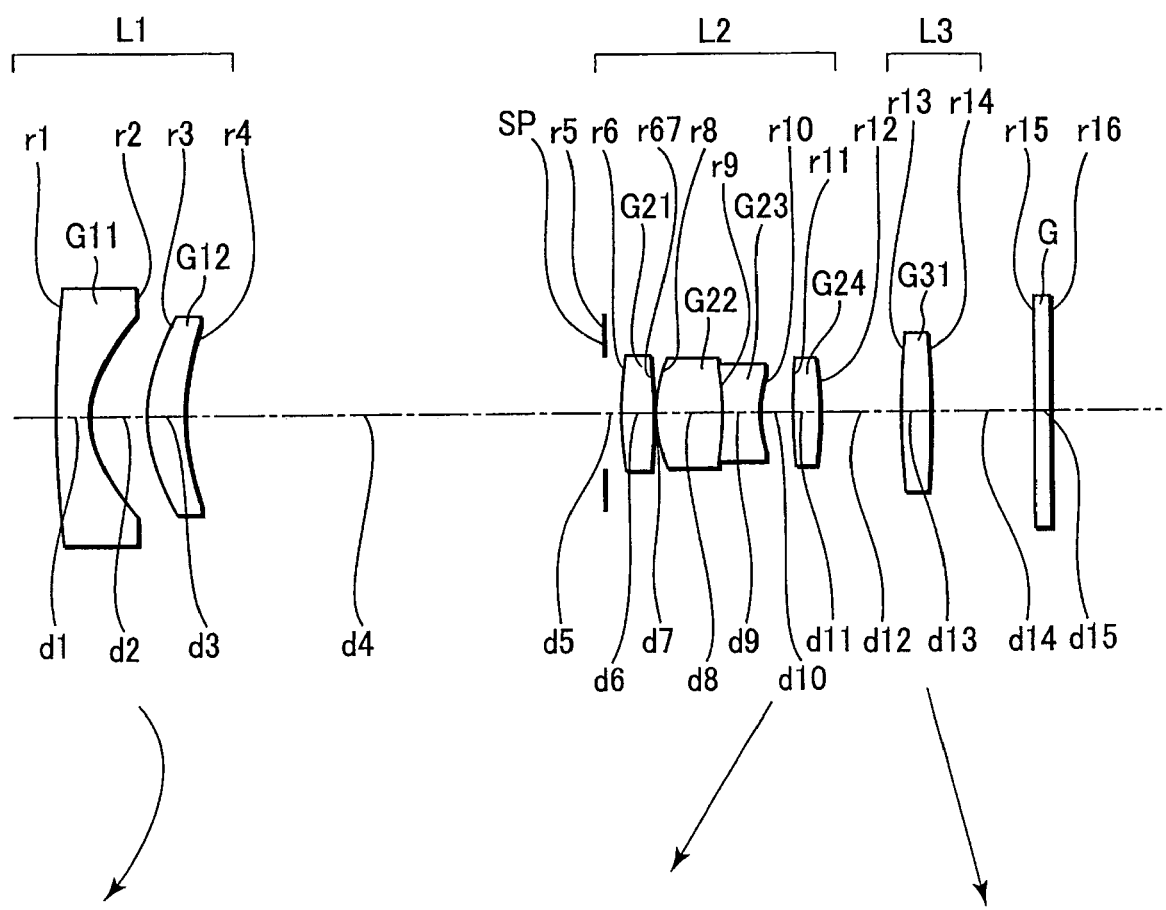
FIG. 11 illustrates a sectional view of a zoom lens of Exemplary Embodiment 6.
Figure 12A:
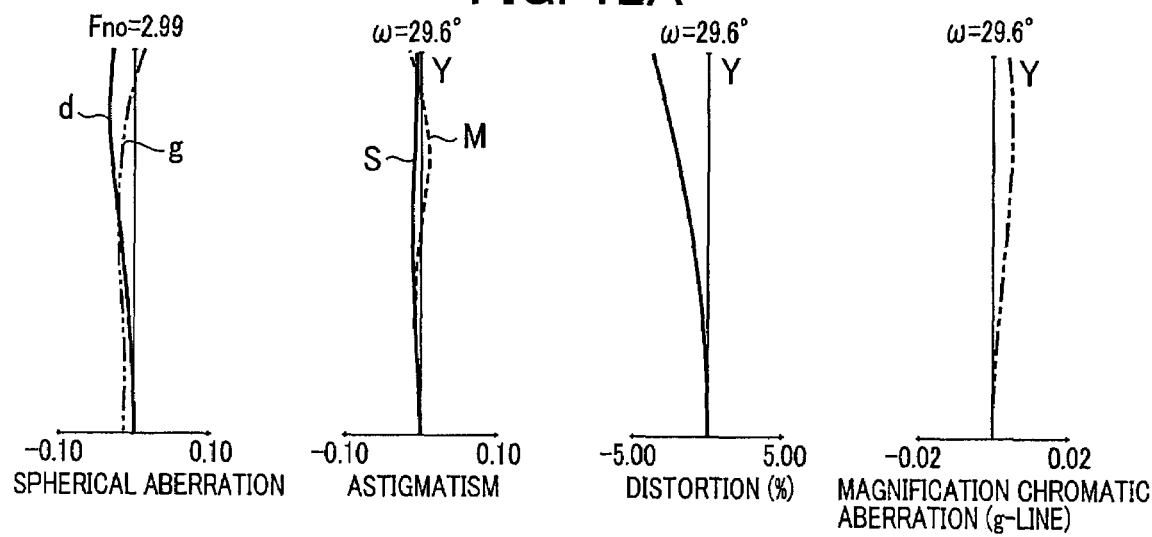
FIGS. 12A-12C illustrate an aberration diagram of the zoom lens of Exemplary Embodiment 6.
Figure 12B:
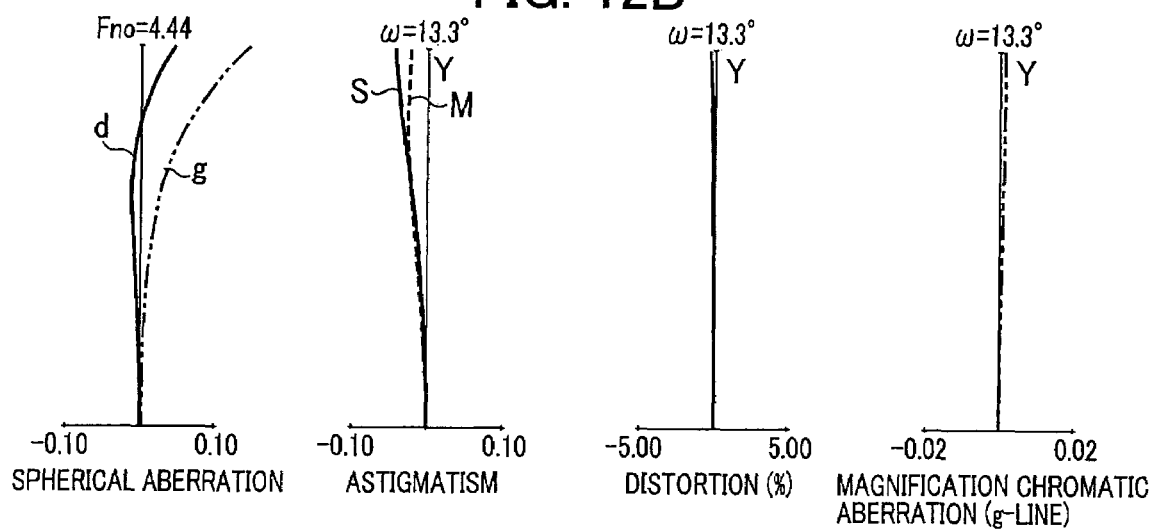
Figure 12C:
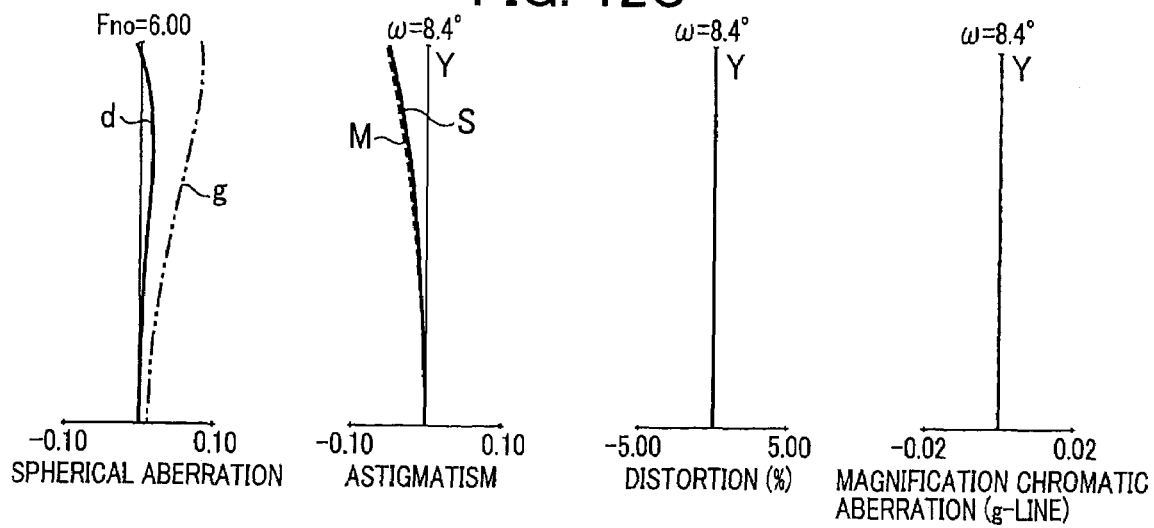

FIG. 11 is a lens sectional view in a wide-angle end of a zoom lens according to Exemplary Embodiment 6. FIGS. 12(A) to (C) illustrate aberration diagrams of the wide-angle end of the zoom lens, an intermediate zoom position, and a telephoto end respectively, according to Exemplary Embodiment 6. The example of Exemplary Embodiment 6 relates to the zoom lens having a zoom ratio of about 3.8-fold, and an aperture ratio of about 3.0 to 6.0.

Figure 13:
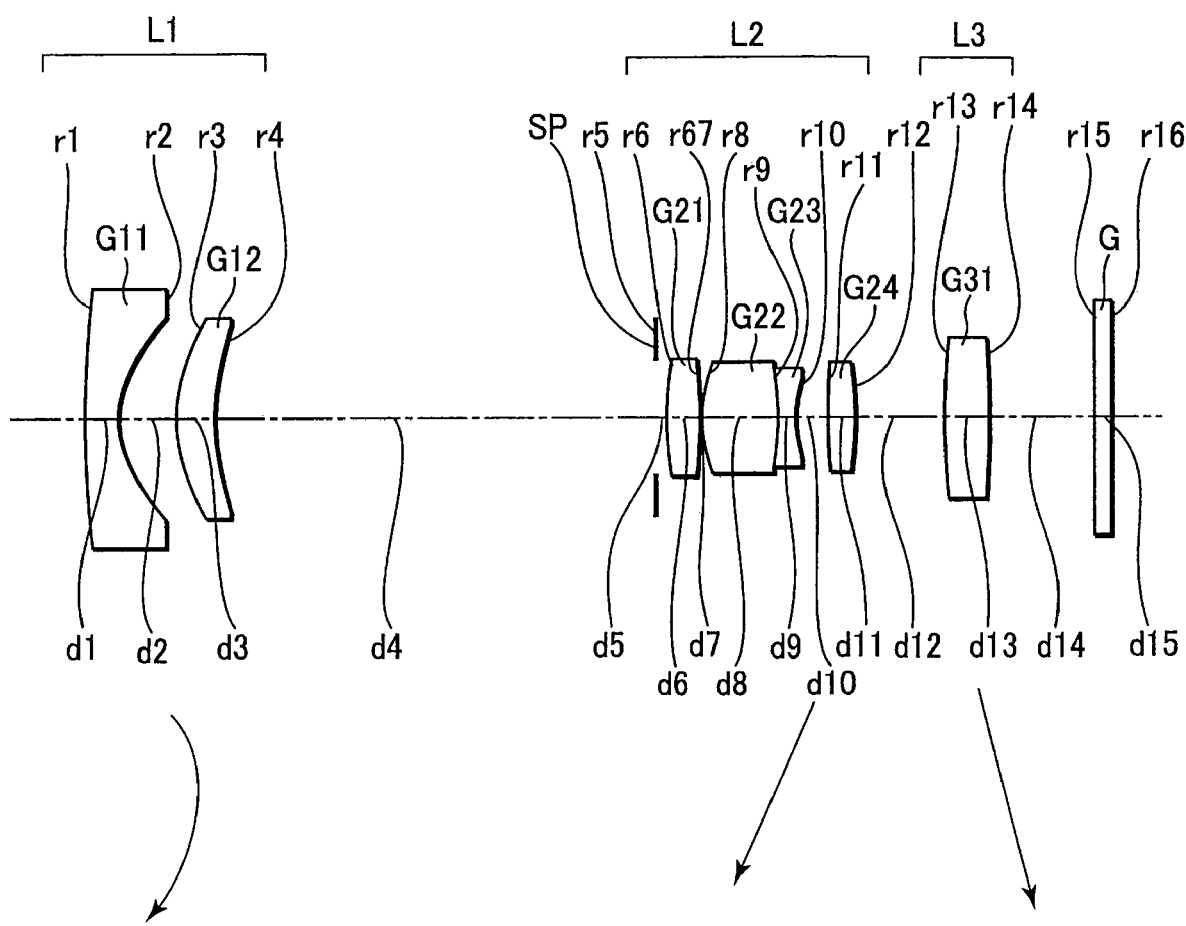
FIG. 13 illustrates a sectional view of a zoom lens of Exemplary Embodiment 7.
Figure 14A:
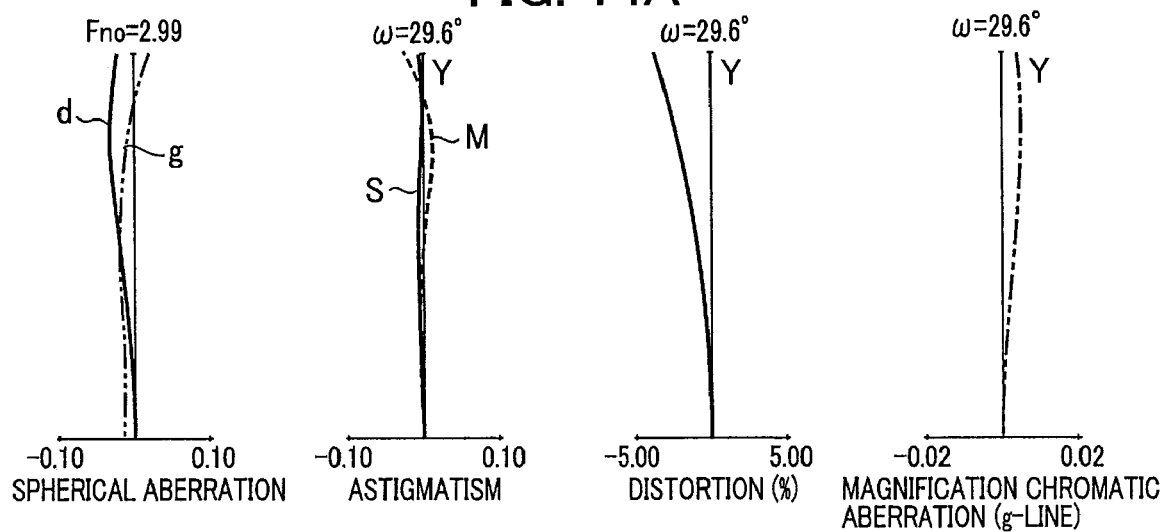
FIGS. 14A-14C illustrate an aberration diagram of the zoom lens of Exemplary Embodiment 7.
Figure 14B:
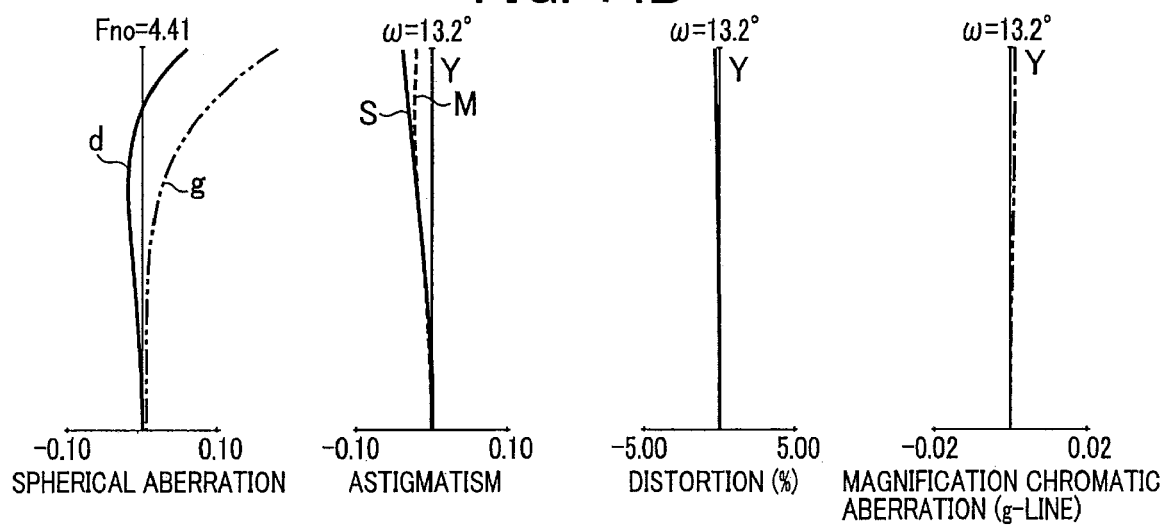
Figure 14C:
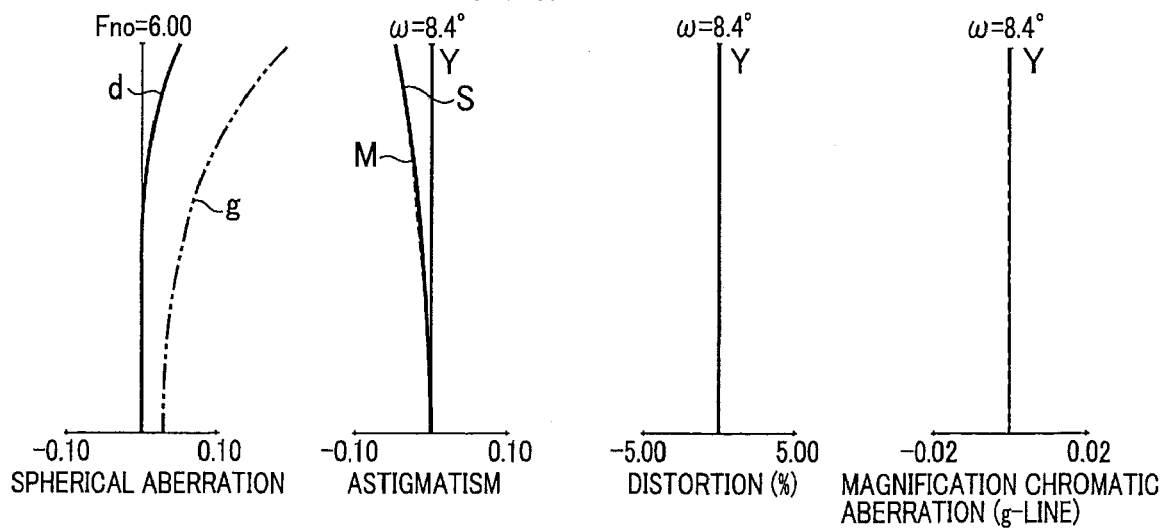

FIG. 13 is a lens sectional view in a wide-angle end of a zoom lens according to Exemplary Embodiment 7. FIGS. 14(A) to (C) illustrate aberration diagrams of the wide-angle end of the zoom lens, an intermediate zoom position, and a telephoto end respectively, according to Exemplary Embodiment 7. The example of Exemplary Embodiment 7 relates to the zoom lens having a zoom ratio of about 3.8, and an aperture ratio of about 3.0 to 6.0.

Figure 15:
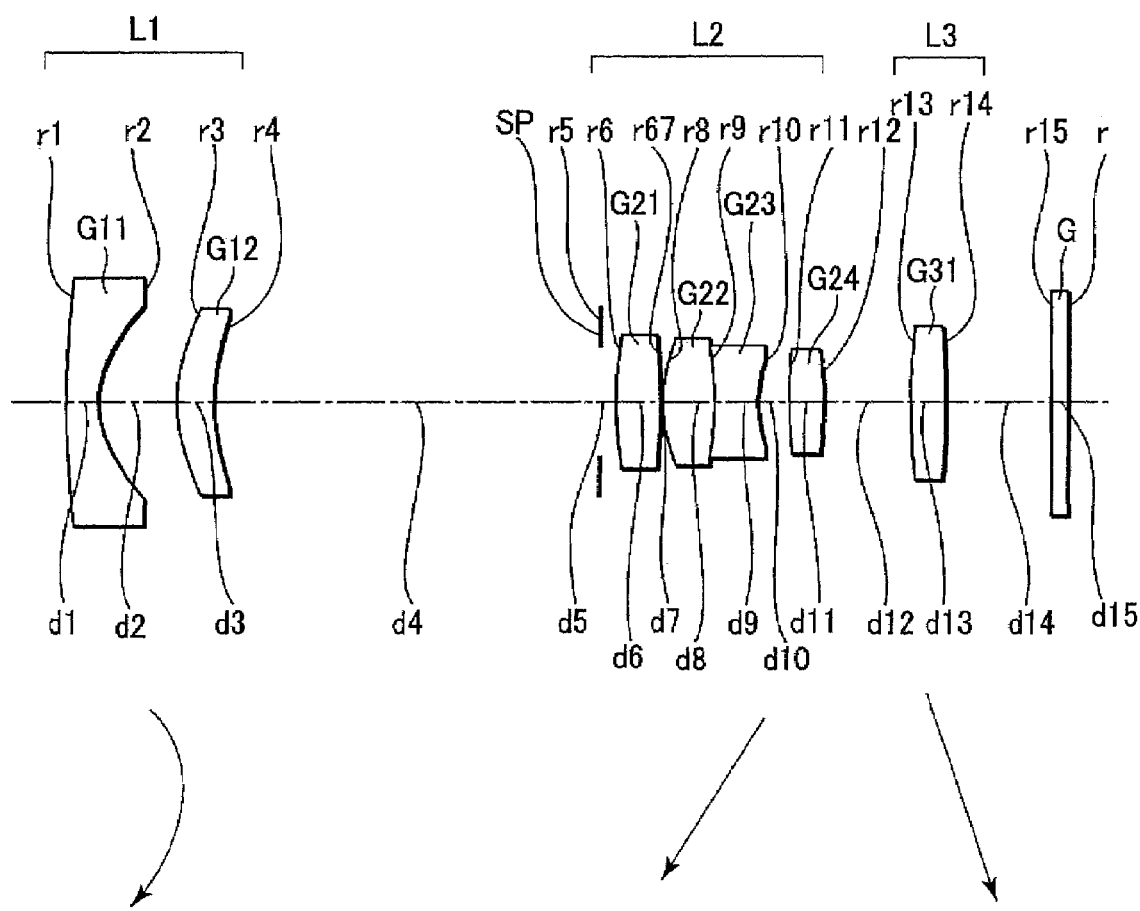
FIG. 15 illustrates a sectional view of a zoom lens of Exemplary Embodiment 8.
Figure 16A:
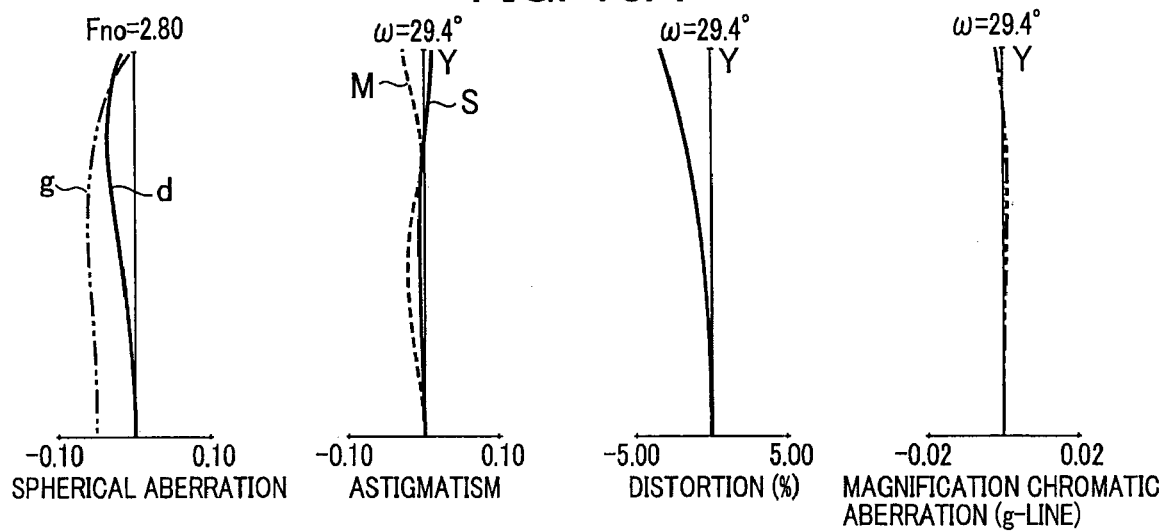
FIGS. 16A-16C illustrate an aberration diagram of the zoom lens of Exemplary Embodiment 8.
Figure 16B:
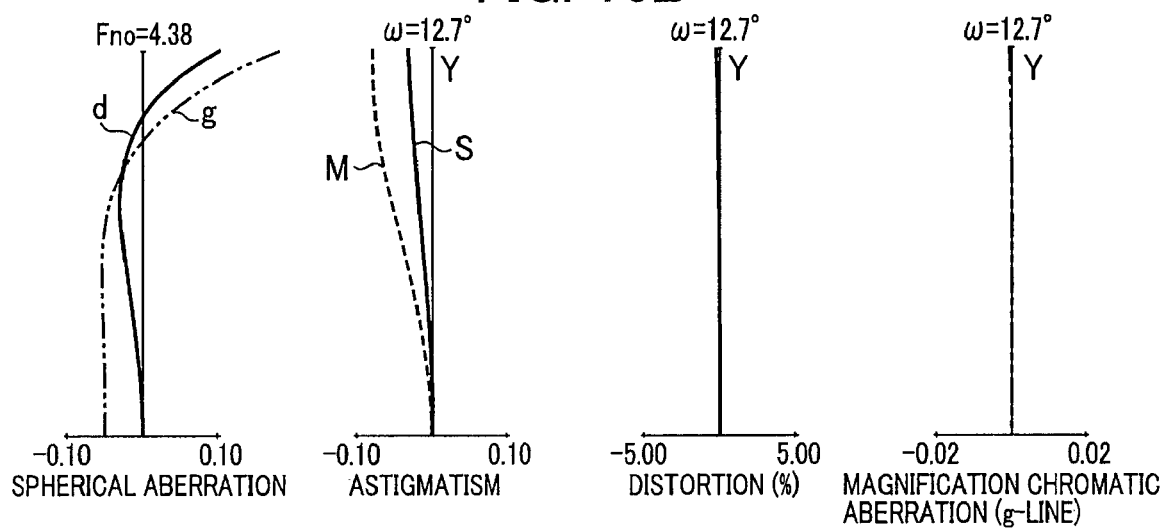
Figure 16C:
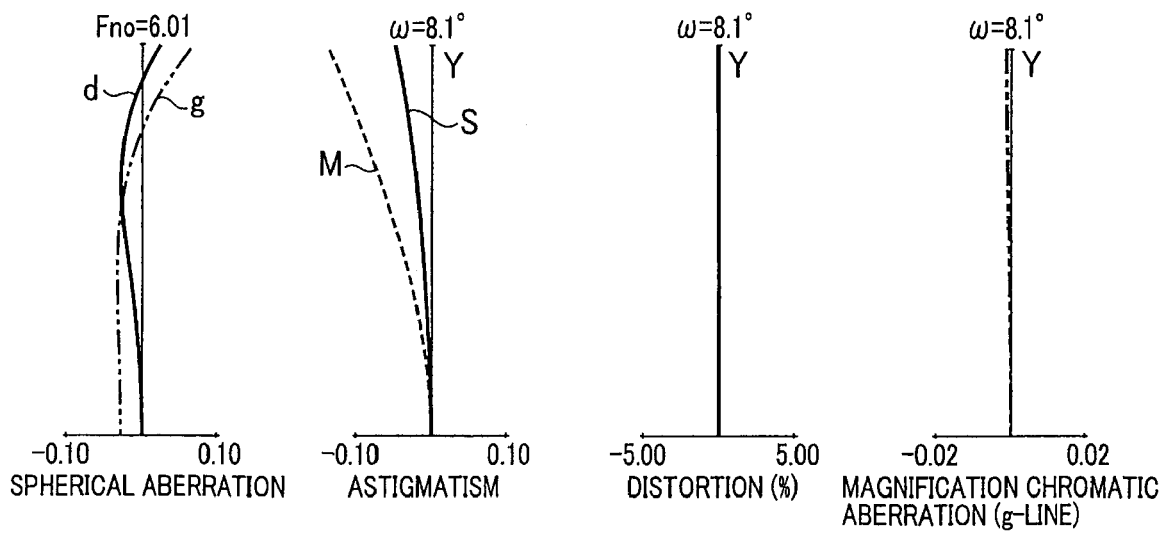

FIG. 15 is a lens sectional view in a wide-angle end of a zoom lens according to Exemplary Embodiment 8. FIGS. 16(A) to (C) illustrate aberration diagrams of the wide-angle end of the zoom lens, an intermediate zoom position, and a telephoto end respectively, according to Exemplary Embodiment 8. The example of Exemplary Embodiment 8 relates to the zoom lens having a zoom ratio of about 3.8, and an aperture ratio of about 2.8 to 6.0.

Figure 17:
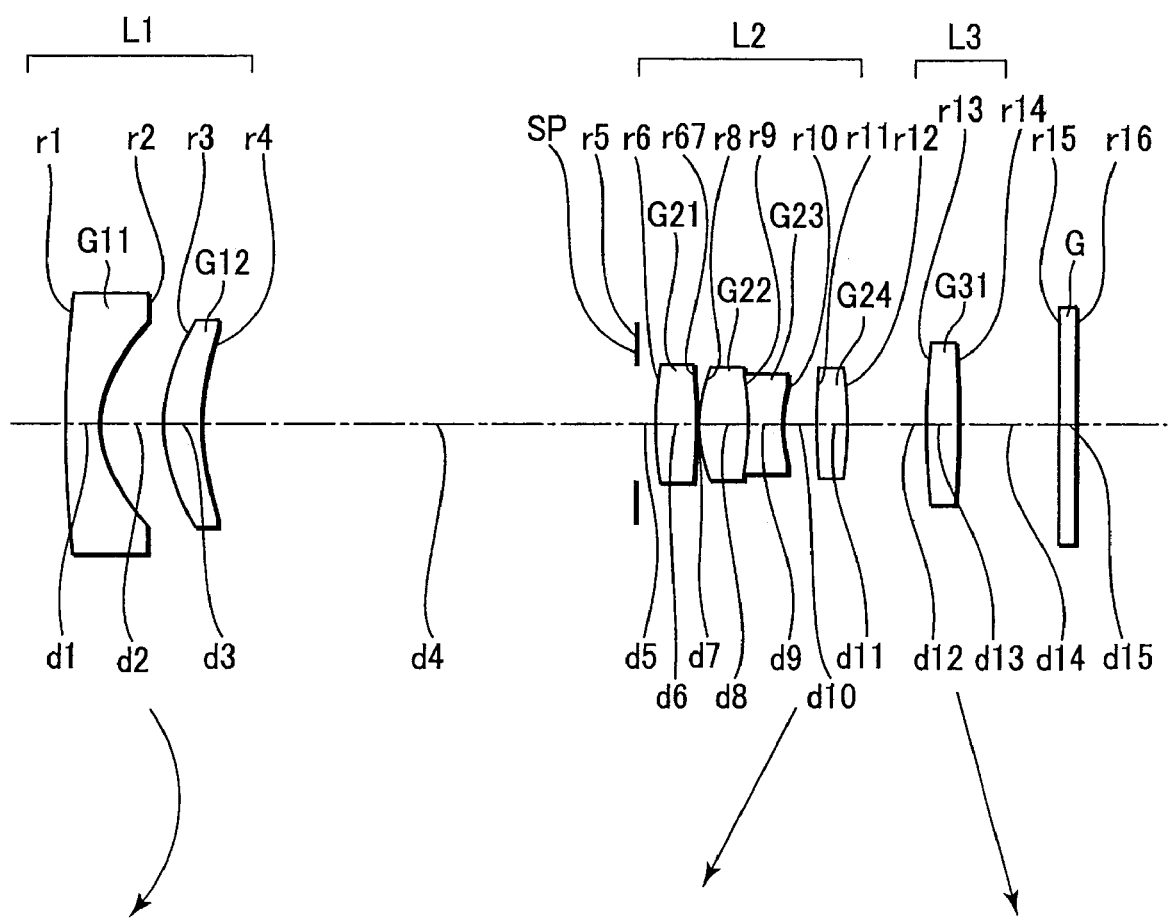
FIG. 17 illustrates a sectional view of a zoom lens of Exemplary Embodiment 9.
Figure 18A:
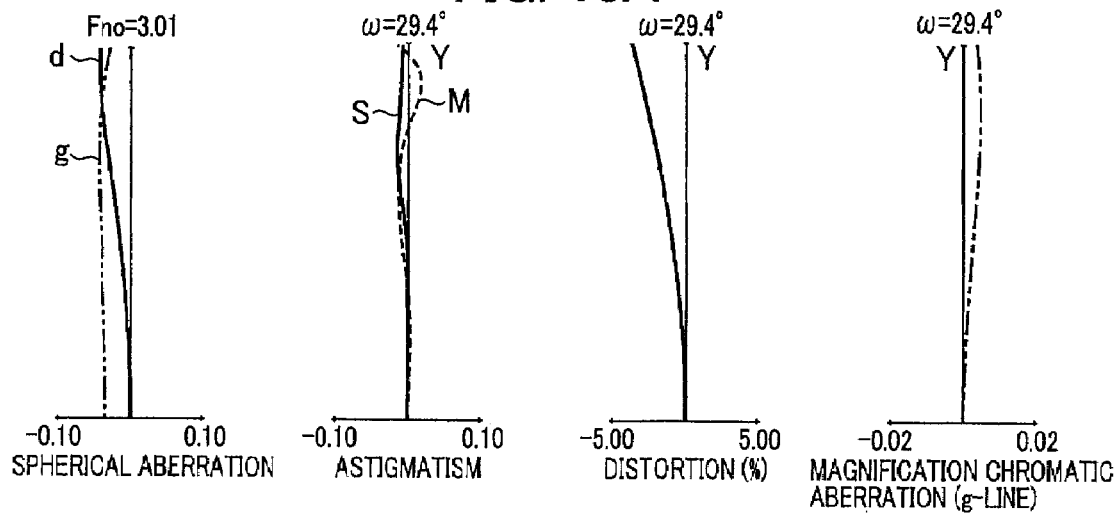
FIGS. 18A-18C illustrate an aberration diagram of the zoom lens of Exemplary Embodiment 9.
Figure 18B:
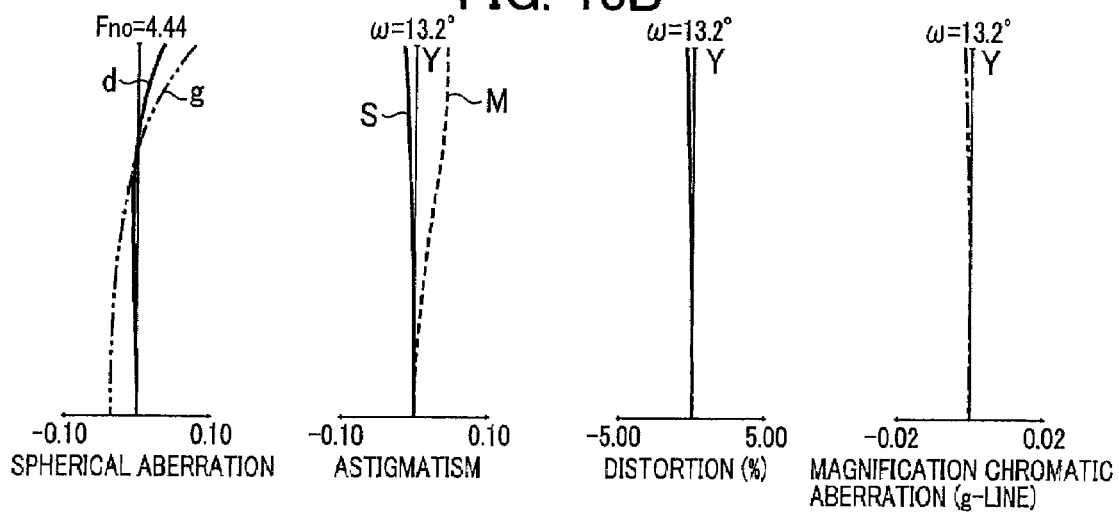
Figure 18C:
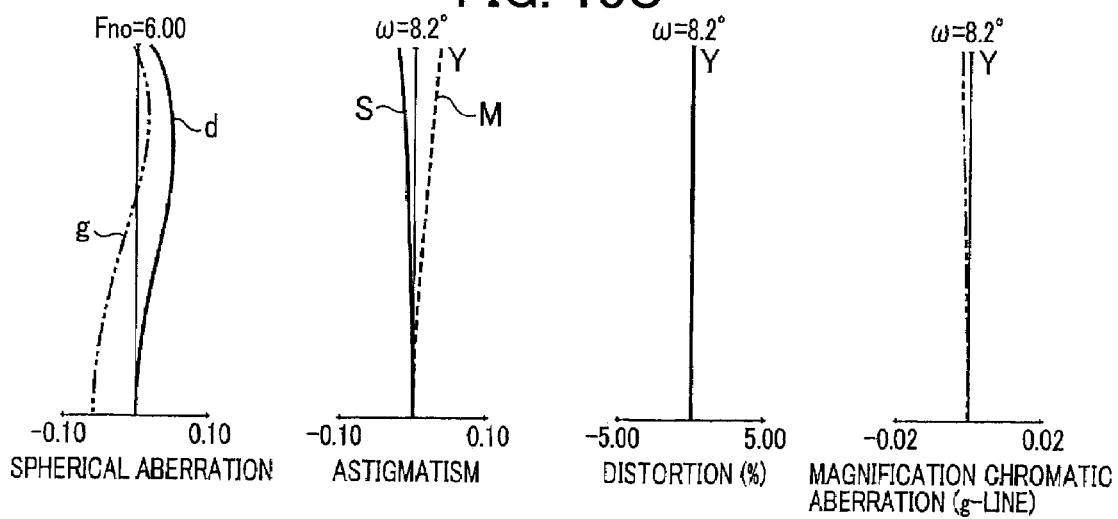

FIG. 17 is a lens sectional view in a wide-angle end of a zoom lens according to Exemplary Embodiment 9. FIGS. 18(A) to (C) illustrate aberration diagrams of the wide-angle end of the zoom lens, an intermediate zoom position, and a telephoto end respectively, according to Exemplary Embodiment 9. The example of Exemplary Embodiment 9 relates to the zoom lens having a zoom ratio of about 3.8, and an aperture ratio of about 3.0 to 6.0.

The zoom lenses of Exemplary Embodiments 1 to 9 are photographing lens systems which can be used in an image pickup apparatus. When each of the zoom lenses is used as a photographing optical system of a video camera or a digital still camera for example, the zoom lens can form an image on an image pickup surface of a solid-state image pickup element (photoelectric conversion element) for example a CCD or CMOS sensor. When each zoom lens is used as the photographing optical system of a camera for a silver salt film, the zoom lens can form an image on a film surface.

In each lens sectional view, the left side is an object side (front side), and the right side is an image side (rear side). In the lens sectional view, L1 denotes a first lens unit having a negative refractive power (optical power=inverse number of focal length), L2 denotes a second lens unit having a positive refractive power, and L3 denotes a third lens unit having a positive refractive power. Moreover, SP denotes an aperture, and is positioned on the object side of the second lens unit L2. Furthermore, G denotes a glass block corresponding to an optical filter, a face plate.

In each aberration diagram, d, g denote a d-line, and g-line, respectively, and M, S denote a meridional image plane, and a sagittal image plane, respectively. Chromatic aberration of magnification (lateral chromatic aberration) is represented by the g-line.

It is to be noted that in each of Exemplary Embodiments 1 to 9, the wide-angle end and the telephoto end refer to the zoom positions at a time when the lens unit for varying a magnification is positioned in opposite ends of a mechanism region where the unit is movable along the optical axis.

The zoom lens according to each of Exemplary Embodiments 1 to 9 has, in order from the object side to an image side, three lens units: the first lens unit L1 having a negative refractive power; the second lens unit L2 having a positive refractive power; and the third lens unit L3 having a positive refractive power. Moreover, the first lens unit moves along a convex track to the image side (A), the second lens unit moves to the object side (B), and the third lens unit moves to the image side (C) during the zooming from the wide-angle end to the telephoto end.

According to each of Exemplary Embodiments 1 to 9, the zoom lens performs main magnification variation by movement of the second lens unit L2. Moreover, the movement of an image plane is compensated by the movement of the first lens unit L1 along the convex track and the movement of the third lens unit L3 to the image side in association with the magnification variation.

The third lens unit L3 can share an increase of the refractive power of the photographing lens in association with miniaturization of the image pickup element, so that the refractive power can be reduced in a short zoom system constituted of the first and second lens units. The aberration caused in the lenses constituting the first lens unit L1 can be reduced to achieve a satisfactory optical performance. Telecentric image forming especially on the image side is facilitated by the third lens unit L3 serving the function of a field lens.

Moreover, the first lens unit L1 includes, in order from the object side to the image side, two lens elements: a negative lens G11 directing its convex surface on the object side and having a meniscus shape; and a positive lens G12 directing its concave surface on the image side and having a meniscus shape. It is to be noted that the surface of the negative lens G11 on the image side can be an aspherical surface. The second lens unit L2 includes, in order from the object side to the image side, a combination lens obtained by combining (e.g., bonding) a biconvex positive lens G21, a biconvex positive lens G22, and a biconcave negative lens G23; and a positive lens G24. The third lens unit L3 has at least one positive single lens.

Each of the lens units described in exemplary embodiments facilitate the construction of compact lens systems, with high zoom ratios, and a reduced protrudent lens system, while substantially maintaining optical performance during zooming.

Moreover, since each of Exemplary Embodiments 1 to 9 includes only one aspherical lens as the negative lens G11 of the first lens unit L1, a low-cost zoom lens can be realized.

The first lens unit L1 has a function of forming a pupil image of an off-axis principal ray on a center of an aperture. Since a refraction amount of the off-axis principal ray is large especially on a wide-angle side, miscellaneous off-axis aberrations, especially astigmatism and distortion aberration, are easily generated.

To facilitate reduction of off-axis aberrations, each of Exemplary Embodiments 1 to 9 has a constitution of negative and positive lenses to suppress an increase of a diameter of a lens closest to the object side in the same manner as in a wide-angle lens.

Moreover, the lens surface of the negative lens G11 on the image side can be formed to be aspherical in order to weaken the negative refractive power in a periphery, and accordingly the astigmatism and the distortion aberration are compensated with a good balance. Furthermore, the first lens unit can have only two lenses, contributing to a compact size of the whole lens system.

Moreover, each lens constituting the first lens unit L1 has a shape approximate to a concentric spherical shape centering on the intersection of the aperture SP and the ray in order to inhibit generation of the off-axis aberration generated by refraction of the off-axis principal ray.

Next, the second lens unit L2 which can have the biconvex positive lenses G21 and G22 has such a shape that the refraction angle of the off-axis principal ray emitted from the first lens unit is reduced, and any off-axis aberration is not generated.

Moreover, the positive lens G21 can be a lens which can have the largest height to pass an on-axis ray, and can contribute mainly to corrections of spherical aberration and comatic aberration.

In Exemplary Embodiments 1 to 9, the ray is gradually refracted by the positive lenses G21 and G22 to thereby reduce the spherical aberration and the comatic aberration.

Next, the negative lens G23 combination to the positive lens G22 is shaped in such a manner as to direct its concave surface on the image side, and accordingly the aberrations generated in the positive lenses G21 and G22 are reduced.

In Exemplary Embodiments 1 to 9, since an aspherical surface is not needed in the second lens unit L2, a low-cost zoom lens can be facilitated.

Next, the third lens unit L3 can include a biconvex positive lens G31, and has a function of a field lens for setting the unit to be telecentric on the image side.

Now assuming that a back focus (an air conversion length between the lens surface closest to the image side and the image plane along the optical axis) is sk', a focal length of the third lens unit is f3, and an image forming magnification of the third lens unit is $\beta 3$, the following relation can be established:

$$sk'=f3(1-\beta 3),$$

wherein $0<\beta 3<1.0$.

Here, when the third lens unit L3 is moved to the image side during zooming from the wide-angle end to the telephoto end, the back focus sk' decreases, and the image forming magnification $\beta 3$ of the third lens unit L3 increases on a telephoto side.

Then, as a result, since the third lens unit L3 can share the varying of the magnification, a movement amount of the second lens unit L2 can be decreased. Moreover, since the movement amount of the second lens unit L2 can be decreased, space can be saved, and this contributes to the miniaturization of the whole zoom lens system.

If a short-range object is photographed using the zoom lens according to Exemplary Embodiments 1 to 9, satisfactory performance is substantially maintained when the first lens unit L1 is moved to the object side. Additionally, the third lens unit L3 can be moved to the object side.

This can facilitate the reduction of the diameter of a front lens when the first lens unit L1 is focused and disposed closest to the object side. This can also prevent a load on an actuator from being increased at a time when the first lens unit which can have the largest lens weight is moved. Furthermore, when the focusing is performed by the third lens unit L3, the first lens unit L1 can be simply connected to the second lens unit L2 (e.g., via a cam), and moved at a zooming time, thus at least one exemplary embodiment simplifies a mechanism structure and enhances the precision.

Moreover, when the focusing is performed by the third lens unit, when the third lens unit is moved to the image side during the zooming from the wide-angle end to the telephoto end, the third lens unit L3 can be disposed closer to the image side in the telephoto end in which the focusing movement amount is large. Thus, in at least one exemplary embodiment, the total movement amount of the third lens unit L3 during zooming and focusing can be reduced, facilitating the development of a compact lens system.

It is to be noted that at least one of the following conditions can be satisfied in order to obtain a satisfactory optical performance at a high zoom ratio in the zoom lens according to each of Exemplary Embodiments 1 to 9.

(1-1) The following condition can be satisfied in order to obtain the satisfactory optical performance at a high magnification:

$$1.2<|\beta 23T|<1.9 \qquad (1),$$

wherein $\beta 23T$ is a combined magnification of the second and third lens units L2 and L3 in the telephoto end.

A value of $\beta 23T$ is the value which influences of the focal length of the telephoto end of the lens system.

When the value becomes smaller than a lower limit of Conditional Expression (1), the focal length of the telephoto end shortens. Therefore, the refractive power of the first lens unit L1 can be strengthened in order to secure a predetermined magnification. An outer diameter of the first lens unit L1 also increases. Therefore, it becomes difficult to correct aberrations (e.g., astigmatism and the comatic aberration). In addition, the increase of the outer diameter can facilitate cost increases.

Moreover, when the value exceeds an upper limit value of Conditional Expression (1), the focal length of the telephoto end lengthens. Therefore, the refractive power of the first lens unit L1 can be weakened in order to secure the predetermined magnification. The state in which the upper limit value of Conditional Expression (1) is exceeded facilitates reducing the outer diameter of the first lens unit L1, but a thickness of the first lens unit L1 increases. As a result, this fails to facilitate a compact lens system.

A numerical value range of Conditional Expression (1) can be set as follows:

$$1.25<|\beta 23T|<1.85 \qquad (1a).$$

(1-2) The following conditions can be satisfied in order to reduce the total lens length and obtain the satisfactory optical performance:

$$0.35<d/D<0.60 \qquad (2-1); \text{ and}$$

$$1.45<D/fW<1.80 \qquad (2-2),$$

wherein d denotes a total thickness of a positive lens G22 and a negative lens G23 along the optical axis, D denotes an interval between the surface of the second lens unit L2 closest to the object side and the surface of the unit closest to the image side along the optical axis, and fW is a focal length of the whole zoom lens system in the wide-angle end.

When the value exceeds the upper limit of Conditional Expression (2-1), it becomes difficult to correct the spherical aberration in the telephoto end.

When the value becomes so small as to exceed the lower limit of Conditional Expression (2-1), it becomes difficult to correct the aberration in the telephoto end, and fails to facilitate a compact lens system.

Furthermore, in Exemplary Embodiments 1 to 9, when Conditional Expression (2-1) is satisfied, since an aspherical surface is not needed in the second lens unit L2, the aberration can be reduced, and a compact zoom lens system can be facilitated.

When the thickness of the combination lens is reduced to such an extent that the lower limit of Conditional Expression (2-1) is exceeded, the spherical aberration cannot be suppressed unless the lens interval in the first lens unit L1 is increased. In such a case, the whole zoom lens system is enlarged. When the thickness of the combination lens is increased to such an extent that the upper limit of Conditional Expression (2-1) is exceeded, the spherical aberration cannot be suppressed when only spherical lenses are used in the second lens unit L2.

That is, when Conditional Expression (2-1) is satisfied, the aberration is satisfactorily suppressed, and the compact zoom lens can be facilitated. Thus, it is possible to secure the satisfactory optical performance even if no aspherical surface is used in the second lens unit L2. Therefore, the number of the aspherical lenses in the whole zoom lens system can be reduced, and this contributes to the cost reduction.

When the value becomes so large as to exceed the upper limit of Conditional Expression (2-2), the value fails to support facilitating the compact setting of the lens.

When the value becomes so small as to exceed the lower limit of Conditional Expression (2-2), the value facilitates the compact setting of the lens, but fails to facilitate the reduction of the spherical aberration.

The numerical value range of Conditional Expression (2-1) can be set as follows:

$$0.4<d/D<0.55 \quad (2\text{-}1a);$$

and $$1.5<D/fW<1.75 \quad (2\text{-}2b).$$

(1-3) The following condition can be satisfied in order to reduce the total lens length of the optical system:

$$-2.8<f1/fW<-2.0 \quad (3),$$

wherein f1 denotes a focal length of the first lens unit L1.

When the upper limit value of Conditional Expression (3) is exceeded, the total length of the optical system shortens. However, the shortening of the focal length of the first lens unit L1 fails to facilitate the reduction of the aberration, especially the distortion aberration in a whole zoom region.

Moreover, when the lower limit value of Conditional Expression (3) is exceeded, the movement amount of the first lens unit L1 during the zooming increases, and the total length of the optical system increases.

The numerical value range of Conditional Expression (3) can be set as follows:

$$-2.7<f1/fW<-2.1 \quad (3a).$$

(1-4) The following condition can be satisfied in order to reduce the total lens length of the optical system:

$$2.0<f2/fW<2.7 \quad (4),$$

wherein f2 denotes the focal length of the second lens unit L2.

When the upper limit value of Conditional Expression (4) is exceeded, the movement amount of the second lens unit L2 during the zooming increases, and the total length of the optical system lengthens.

Moreover, when the lower limit value of Conditional Expression (4) is exceeded, the total length of the optical system shortens. However, the shortening of the focal length of the second lens unit L2 fails to facilitate the reduction of the aberration in the whole zoom region.

The numerical value range of Conditional Expression (4) can be set as follows:

$$2.1<f2/fW<2.6 \quad (4a).$$

(1-5) The following condition can be satisfied in order to obtain the telecentric property of the optical system:

$$4.0<f3/fW<5.0 \quad (5),$$

wherein f3 denotes the focal length of the third lens unit L3.

When the upper limit value of Conditional Expression (5) is exceeded, an emission pupil position comes close to the image plane, and the telecentric property is deteriorated.

When the lower limit of Conditional Expression (5) is exceeded, and the focal length of the third lens unit L3 shortens, the telecentric property becomes satisfactory, but the astigmatism increases, and it becomes difficult to correct the astigmatism.

The numerical value range of Conditional Expression (5) can be set as follows:

$$4.1<f3/fW<4.9 \quad (5a).$$

Next, numerical data of Exemplary Embodiments 1 to 9 will be described. In each numerical example, i denotes an order of the surface from the object side, Ri denotes a curvature radius of the i-th lens surface, Di denotes an interval between the i-th surface and the i+1-th surface along the optical axis, Ni and νi denote a refractive index and Abbe number on the basis of the d-line, respectively, Moreover, two planes closest to the image side constitute a glass block G. Assuming that a light traveling direction is positive, x denotes a displacement from a surface vertex in an optical axis direction, h denotes a height from the optical axis in a direction vertical to the optical axis, R denotes a paraxial curvature radius, k denotes a conic constant, and B, C, D, and E are aspherical coefficients, an aspherical surface shape is represented by:

$$x=(h^2/R)/[1+\{1-(1+k)(h/R)^2\}^{1/2}]+Bh^4+Ch^6+Dh^8+Eh^{10}$$

Moreover, "e-0x" refers to "×10$^{-x}$". Furthermore, f denotes a focal length, Fno denotes an F number, and ω denotes a half field angle. In addition, a relation between each of the above-described conditional expressions and each numerical value example is shown in Table 1.

TABLE 1

Numerical Example 1
f = 5.50 to 17.28  Fno = 2.90 to 5.24  2ω = 29.7° to 10.0°

| | | | |
|---|---|---|---|
| R1 = 49.729 | D1 = 1.50 | N1 = 1.683430 | ν1 = 52.4 |
| R2 = 4.941 | D2 = 2.80 | | |
| R3 = 8.810 | D3 = 1.70 | N2 = 1.846660 | ν2 = 23.9 |
| R4 = 14.324 | D4 = variable | | |
| R5 = aperture | D5 = 0.70 | | |

TABLE 1-continued

| | | | |
|---|---|---|---|
| R6 = 14.614 | D6 = 1.75 | N3 = 1.696797 | ν3 = 55.5 |
| R7 = −47.546 | D7 = 0.10 | | |
| R8 = 6.508 | D8 = 2.35 | N4 = 1.603112 | ν4 = 60.6 |
| R9 = −14.435 | D9 = 1.85 | N5 = 1.806100 | ν5 = 33.3 |
| R10 = 5.344 | D10 = 1.36 | | |
| R11 = 44.265 | D11 = 1.50 | N6 = 1.772499 | ν6 = 49.6 |
| R12 = −20.712 | D12 = variable | | |
| R13 = 17.600 | D13 = 1.50 | N7 = 1.487490 | ν7 = 70.2 |
| R14 = −37.974 | D14 = variable | | |
| R15 = ∞ | D15 = 0.81 | N8 = 1.516330 | ν8 = 64.1 |
| R16 = ∞ | | | |

| | Focal distance | | |
|---|---|---|---|
| Variable interval | 5.50 | 12.95 | 17.28 |
| D4 | 19.11 | 3.20 | 3.22 |
| D12 | 4.06 | 13.91 | 19.62 |
| D14 | 4.71 | 4.36 | 3.92 |

Aspherical coefficient

R2 k = −1.57051e+00 B = 1.00040e−03 C = 2.52797e−06
D = −2.11744e−07 E = 5.48035e−09

Numerical Example 2
f = 5.20 to 19.40 Fno = 3.38 to 3.98 2ω = 29.7° to 8.5°

| | | | |
|---|---|---|---|
| R1 = 41.517 | D1 = 1.20 | N1 = 1.683430 | ν1 = 52.4 |
| R2 = 4.534 | D2 = 2.70 | | |
| R3 = 7.970 | D3 = 2.00 | N2 = 1.846660 | ν2 = 23.9 |
| R4 = 12.658 | D4 = variable | | |
| R5 = aperture | D5 = 0.70 | | |
| R6 = 7.558 | D6 = 1.95 | N3 = 1.487490 | ν3 = 70.2 |
| R7 = −34.663 | D7 = 0.28 | | |
| R8 = 6.322 | D8 = 2.05 | N4 = 1.638539 | ν4 = 55.4 |
| R9 = −7.499 | D9 = 1.50 | N5 = 1.834000 | ν5 = 37.2 |
| R10 = 4.833 | D10 = 0.83 | | |
| R11 = 20.441 | D11 = 1.50 | N6 = 1.696797 | ν6 = 55.5 |
| R12 = −21.202 | D12 = variable | | |
| R13 = 46.140 | D13 = 1.25 | N7 = 1.834807 | ν7 = 42.7 |
| R14 = −35.618 | D14 = variable | | |
| R15 = ∞ | D15 = 0.81 | N8 = 1.516330 | ν8 = 64.1 |
| R16 = ∞ | | | |

| | Focal distance | | |
|---|---|---|---|
| Variable interval | 5.20 | 15.95 | 19.40 |
| D4 | 16.80 | 2.94 | 1.80 |
| D12 | 3.12 | 17.24 | 21.45 |
| D14 | 4.56 | 3.28 | 2.69 |

Aspherical coefficient

R2 k = −1.77797e+00 B = 1.66314e−03 C = −1.23495e−05
D = 3.81177e−07 E = −4.17703e−09

Numerical Example 3
f = 5.15 to 19.40 Fno = 3.14 to 6.98 2ω = 29.2° to 8.5°

| | | | |
|---|---|---|---|
| R1 = 37.036 | D1 = 1.20 | N1 = 1.683430 | ν1 = 52.4 |
| R2 = 4.500 | D2 = 3.26 | | |
| R3 = 8.896 | D3 = 2.00 | N2 = 1.846660 | ν2 = 23.9 |
| R4 = 14.947 | D4 = variable | | |
| R5 = aperture | D5 = 0.70 | | |
| R6 = 9.411 | D6 = 1.85 | N3 = 1.516330 | ν3 = 64.1 |
| R7 = −41.935 | D7 = 0.28 | | |
| R8 = 6.373 | D8 = 2.05 | N4 = 1.603112 | ν4 = 60.6 |
| R9 = −10.716 | D9 = 2.05 | N5 = 1.834000 | ν5 = 37.2 |
| R10 = 5.161 | D10 = 0.83 | | |
| R11 = 28.615 | D11 = 1.50 | N6 = 1.603112 | ν6 = 60.6 |
| R12 = −14.456 | D12 = variable | | |
| R13 = 31.147 | D13 = 1.25 | N7 = 1.712995 | ν7 = 53.9 |
| R14 = −28.821 | D14 = variable | | |
| R15 = ∞ | D15 = 0.81 | N8 = 1.516330 | ν8 = 64.1 |
| R16 = ∞ | | | |

TABLE 1-continued

| | Focal distance | | |
|---|---|---|---|
| Variable interval | 5.15 | 15.75 | 19.40 |
| D4 | 17.24 | 3.68 | 2.41 |
| D12 | 2.69 | 19.77 | 24.64 |
| D14 | 5.54 | 3.42 | 2.76 |

Aspherical coefficient

R2 k = −1.61834e+00 B = 1.40026e−03 C = −1.85711e−05
D = 9.56155e−07 E = −2.06096e−08

Numerical Example 4
f = 5.15 to 19.40 Fno = 3.26 to 6.98 2ω = 29.9° to 8.5°

| | | | |
|---|---|---|---|
| R1 = 58.781 | D1 = 1.40 | N1 = 1.683430 | ν1 = 52.4 |
| R2 = 4.725 | D2 = 3.01 | | |
| R3 = 8.849 | D3 = 2.00 | N2 = 1.846660 | ν2 = 23.9 |
| R4 = 14.412 | D4 = variable | | |
| R5 = aperture | D5 = 0.70 | | |
| R6 = 8.077 | D6 = 2.20 | N3 = 1.487490 | ν3 = 70.2 |
| R7 = −26.024 | D7 = 0.10 | | |
| R8 = 6.002 | D8 = 2.40 | N4 = 1.622992 | ν4 = 58.2 |
| R9 = −7.902 | D9 = 1.50 | N5 = 1.834000 | ν5 = 37.2 |
| R10 = 4.629 | D10 = 0.55 | | |
| R11 = 22.011 | D11 = 1.50 | N6 = 1.712995 | ν6 = 53.9 |
| R12 = −24.802 | D12 = variable | | |
| R13 = 37.187 | D13 = 1.30 | N7 = 1.772499 | ν7 = 49.6 |
| R14 = −28.934 | D14 = variable | | |
| R15 = ∞ | D15 = 0.81 | N8 = 1.516330 | ν8 = 64.1 |
| R16 = ∞ | | | |

| | Focal distance | | |
|---|---|---|---|
| Variable interval | 5.15 | 16.05 | 19.40 |
| D4 | 16.42 | 2.91 | 1.80 |
| D12 | 3.45 | 17.45 | 21.41 |
| D14 | 4.11 | 3.09 | 2.80 |

Aspherical coefficient

R2 k = −1.75960e+00 B = 1.37386e−03 C = −6.07840e−06
D = −6.23270e−08 E = 4.79777e−09

Numerical Example 5
f = 5.56 to 21.00 Fno = 2.99 to 6.00 2ω = 29.6° to 8.4°

| | | | |
|---|---|---|---|
| R1 = 45.108 | D1 = 1.55 | N1 = 1.683430 | ν1 = 52.4 |
| R2 = 5.063 | D2 = 2.92 | | |
| R3 = 8.903 | D3 = 1.65 | N2 = 1.846660 | ν2 = 23.9 |
| R4 = 14.057 | D4 = variable | | |
| R5 = aperture | D5 = 0.70 | | |
| R6 = 25.157 | D6 = 1.55 | N3 = 1.696797 | ν3 = 55.5 |
| R7 = −25.157 | D7 = 0.10 | | |
| R8 = 6.523 | D8 = 3.30 | N4 = 1.603112 | ν4 = 60.6 |
| R9 = −11.354 | D9 = 1.25 | N5 = 1.806100 | ν5 = 33.3 |
| R10 = 5.778 | D10 = 2.02 | | |
| R11 = 354.322 | D11 = 1.25 | N6 = 1.772499 | ν6 = 49.6 |
| R12 = −15.778 | D12 = variable | | |
| R13 = 17.868 | D13 = 1.50 | N7 = 1.487490 | ν7 = 70.2 |
| R14 = −42.556 | D14 = variable | | |
| R15 = ∞ | D15 = 0.81 | N8 = 1.516330 | ν8 = 64.1 |
| R16 = ∞ | | | |

| | Focal distance | | |
|---|---|---|---|
| Variable interval | 5.56 | 17.43 | 21.00 |
| D4 | 20.48 | 3.38 | 2.03 |
| D12 | 4.10 | 19.88 | 24.36 |
| D14 | 4.77 | 3.89 | 3.61 |

Aspherical coefficient

R2 k = −1.32539e+00 B = 7.16011e−04 C = 5.94492e−06
D = −1.87944e−07 E = 4.19999e−09

TABLE 1-continued

Numerical Example 6
f = 5.56 to 21.00 Fno = 2.99 to 6.00 2ω = 29.6° to 8.4°

| | | | |
|---|---|---|---|
| R1 = 48.120 | D1 = 1.55 | N1 = 1.683430 | ν1 = 52.4 |
| R2 = 5.150 | D2 = 2.92 | | |
| R3 = 9.002 | D3 = 1.65 | N2 = 1.846660 | ν2 = 23.9 |
| R4 = 14.267 | D4 = variable | | |
| R5 = aperture | D5 = 0.70 | | |
| R6 = 24.053 | D6 = 1.70 | N3 = 1.696797 | ν3 = 55.5 |
| R7 = −29.069 | D7 = 0.10 | | |
| R8 = 6.765 | D8 = 3.25 | N4 = 1.603112 | ν4 = 60.6 |
| R9 = −11.281 | D9 = 1.60 | N5 = 1.806100 | ν5 = 33.3 |
| R10 = 5.998 | D10 = 1.63 | | |
| R11 = 189.465 | D11 = 1.25 | N6 = 1.772499 | ν6 = 49.6 |
| R12 = −15.275 | D12 = variable | | |
| R13 = 19.279 | D13 = 1.50 | N7 = 1.487490 | ν7 = 70.2 |
| R14 = −35.146 | D14 = variable | | |
| R15 = ∞ | D15 = 0.81 | N8 = 1.516330 | ν8 = 64.1 |
| R16 = ∞ | | | |

| | Focal distance | | |
|---|---|---|---|
| Variable interval | 5.56 | 17.39 | 21.00 |
| D4 | 20.31 | 3.26 | 1.90 |
| D12 | 3.99 | 19.69 | 24.20 |
| D14 | 4.94 | 3.99 | 3.63 |

Aspherical coefficient

R2 k = −1.47717e+00 B = 8.18024e−04 C = 3.91469e−06
D = −1.75977e−07 E = 4.03752e−09

Numerical Example 7
f = 5.56 to 21.00 Fno = 2.99 to 6.00 2ω = 29.6° to 8.4°

| | | | |
|---|---|---|---|
| R1 = 42.286 | D1 = 1.55 | N1 = 1.683430 | ν1 = 52.4 |
| R2 = 5.125 | D2 = 3.01 | | |
| R3 = 8.875 | D3 = 1.65 | N2 = 1.846660 | ν2 = 23.9 |
| R4 = 13.534 | D4 = variable | | |
| R5 = aperture | D5 = 0.70 | | |
| R6 = 20.648 | D6 = 1.45 | N3 = 1.696797 | ν3 = 55.5 |
| R7 = −32.144 | D7 = 0.10 | | |
| R8 = 6.676 | D8 = 3.60 | N4 = 1.603112 | ν4 = 60.6 |
| R9 = −9.670 | D9 = 0.70 | N5 = 1.806100 | ν5 = 33.3 |
| R10 = 6.052 | D10 = 1.61 | | |
| R11 = −60.080 | D11 = 1.25 | N6 = 1.804000 | ν6 = 46.6 |
| R12 = −12.288 | D12 = variable | | |
| R13 = 20.874 | D13 = 2.25 | N7 = 1.487490 | ν7 = 70.2 |
| R14 = −35.146 | D14 = variable | | |
| R15 = ∞ | D15 = 0.81 | N8 = 1.516330 | ν8 = 64.1 |
| R16 = ∞ | | | |

| | Focal distance | | |
|---|---|---|---|
| Variable interval | 5.56 | 17.39 | 21.00 |
| D4 | 20.51 | 3.27 | 1.96 |
| D12 | 4.11 | 19.64 | 24.27 |
| D14 | 4.77 | 4.06 | 3.62 |

Aspherical coefficient

R2 k = −1.62555e+00 B = 9.93078e−04 C = 2.60059e−07
D = −7.38079e−08 E = 2.96694e−09

Numerical Example 8
f = 5.60 to 21.39 Fno = 2.80 to 6.01 2ω = 29.4° to 8.1°

| | | | |
|---|---|---|---|
| R1 = 56.335 | D1 = 1.70 | N1 = 1.693500 | ν1 = 53.2 |
| R2 = 4.974 | D2 = 3.49 | | |
| R3 = 9.269 | D3 = 1.85 | N2 = 1.846660 | ν2 = 23.9 |
| R4 = 13.650 | D4 = variable | | |
| R5 = aperture | D5 = 0.70 | | |
| R6 = 14.159 | D6 = 2.15 | N3 = 1.719995 | ν3 = 50.2 |
| R7 = −39.252 | D7 = 0.10 | | |

TABLE 1-continued

| | | | |
|---|---|---|---|
| R8 = 6.742 | D8 = 2.45 | N4 = 1.603112 | ν4 = 60.6 |
| R9 = −13.884 | D9 = 1.90 | N5 = 1.806100 | ν5 = 33.3 |
| R10 = 5.305 | D10 = 1.60 | | |
| R11 = 70.397 | D11 = 1.60 | N6 = 1.772499 | ν6 = 49.6 |
| R12 = −21.912 | D12 = variable | | |
| R13 = 21.213 | D13 = 1.60 | N7 = 1.487490 | ν7 = 70.2 |
| R14 = −35.146 | D14 = variable | | |
| R15 = ∞ | D15 = 0.81 | N8 = 1.516330 | ν8 = 64.1 |
| R16 = ∞ | | | |

| | Focal distance | | |
|---|---|---|---|
| Variable interval | 5.60 | 17.92 | 21.39 |
| D4 | 18.08 | 3.56 | 2.49 |
| D12 | 4.02 | 21.78 | 26.79 |
| D14 | 5.00 | 5.00 | 5.00 |

Aspherical coefficient

R2 k = −1.72660e+00 B = 1.06844e−03 C = 4.12539e−06
D = −4.57521e−07 E = 1.16819e−08

Numerical Example 9
f = 5.60 to 21.00 Fno = 3.01 to 6.00 2ω = 29.4° to 8.2°

| | | | |
|---|---|---|---|
| R1 = 39.307 | D1 = 1.70 | N1 = 1.693500 | ν1 = 53.2 |
| R2 = 5.346 | D2 = 3.04 | | |
| R3 = 8.995 | D3 = 1.85 | N2 = 1.846660 | ν2 = 23.9 |
| R4 = 13.650 | D4 = variable | | |
| R5 = aperture | D5 = 0.70 | | |
| R6 = 14.756 | D6 = 2.15 | N3 = 1.712995 | ν3 = 53.9 |
| R7 = −57.854 | D7 = 0.10 | | |
| R8 = 6.551 | D8 = 2.45 | N4 = 1.603112 | ν4 = 60.6 |
| R9 = −15.543 | D9 = 1.65 | N5 = 1.806100 | ν5 = 33.3 |
| R10 = 5.411 | D10 = 1.62 | | |
| R11 = 44.972 | D11 = 1.60 | N6 = 1.772499 | ν6 = 49.6 |
| R12 = −22.392 | D12 = variable | | |
| R13 = 19.832 | D13 = 1.60 | N7 = 1.517417 | ν7 = 52.4 |
| R14 = −35.146 | D14 = variable | | |
| R15 = ∞ | D15 = 0.81 | N8 = 1.516330 | ν8 = 64.1 |
| R16 = ∞ | | | |

| | Focal distance | | |
|---|---|---|---|
| Variable interval | 5.60 | 17.44 | 21.00 |
| D4 | 21.24 | 3.41 | 1.98 |
| D12 | 3.87 | 18.96 | 23.22 |
| D14 | 4.76 | 3.87 | 3.62 |

TABLE 1

| Conditional expression | | Lower limit value | Upper limit value | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|---|---|---|
| (1) | β23T | 1.20 | 1.90 | 1.267 | 1.529 | 1.488 | 1.557 | 1.493 | 1.475 | 1.487 | 1.783 | 1.400 |
| (2-1) | d/D | 0.35 | 0.60 | 0.471 | 0.438 | 0.479 | 0.473 | 0.480 | 0.509 | 0.494 | 0.444 | 0.428 |
| (2-2) | D/fW | 1.45 | 1.80 | 1.619 | 1.559 | 1.661 | 1.602 | 1.703 | 1.713 | 1.565 | 1.749 | 1.709 |
| (3) | f1/fW | −2.80 | −2.00 | −2.477 | −2.440 | −2.532 | −2.418 | −2.528 | −2.561 | −2.538 | −2.143 | −2.680 |
| (4) | f2/fW | 2.00 | 2.70 | 2.354 | 2.248 | 2.524 | 2.219 | 2.434 | 2.427 | 2.428 | 2.332 | 2.426 |
| (5) | f3/fW | 4.00 | 5.00 | 4.522 | 4.663 | 4.112 | 4.125 | 4.680 | 4.635 | 4.893 | 4.891 | 4.421 |

Note that although reference item numbers (e.g., G21) are used consistently to refer to basic lens elements throughout FIGS. 1, 3, 5, 7, 9, 11, 13, 15, 17, 19, 21, 23, 25, and 27, each figure is associated with a particular exemplary embodiment which is associated with a numerical example. For example FIG. 1 corresponds to Exemplary Embodiment 1, with a first lens unit element G11, according to numerical example 1, which has an R1 value of about 49.729, whereas the first lens unit element G11 of FIG. 3, corresponding to the second exemplary embodiment and the second numerical example, has an R1 value of about 41.517. Thus although the units may have the same reference number from one figure to the next, the figures represent examples of exemplary embodiments (i.e., the numerical examples) and the same reference number units are general designations and can have different lens characteristics from one example to the next.

When each element is set as in the zoom lenses disclosed in Exemplary Embodiments 1 to 9, it is possible to achieve the zoom lens which is suitable especially for the photographing system (e.g., a video camera or a digital still camera) using the solid-state image pickup element and which is compact with a small number of constituting lenses and which is appropriate as a retracting type zoom lens and which has a superior optical performance (e.g., a zoom ratio of about three-fold to four-fold).

Moreover, when the aspherical surface is effectively introduced in the first lens unit L1, and especially the refractive powers of the first and second lens units L1 and L2 are appropriately set, it is possible to effectively reduce off-axis aberrations (e.g., astigmatism and the distortion aberration), and the spherical aberration when an aperture diameter is enlarged.

Moreover, since any aspherical surface is not needed in the second lens unit L2, the number of the aspherical surfaces can be reduced in the whole zoom lens, and a cost reduction can be realized.

It is to be noted that according to Exemplary Embodiments 1 to 9, each zoom lens can include three lens units, but there is not any restriction on the number of the lens units. For example, a lens unit having a weak positive or negative refractive power can be added on the image side of the third lens unit L3 to form a four-unit constitution.

Next, zoom lenses of Exemplary Embodiments 10 to 14 will be described.

Figure 19:
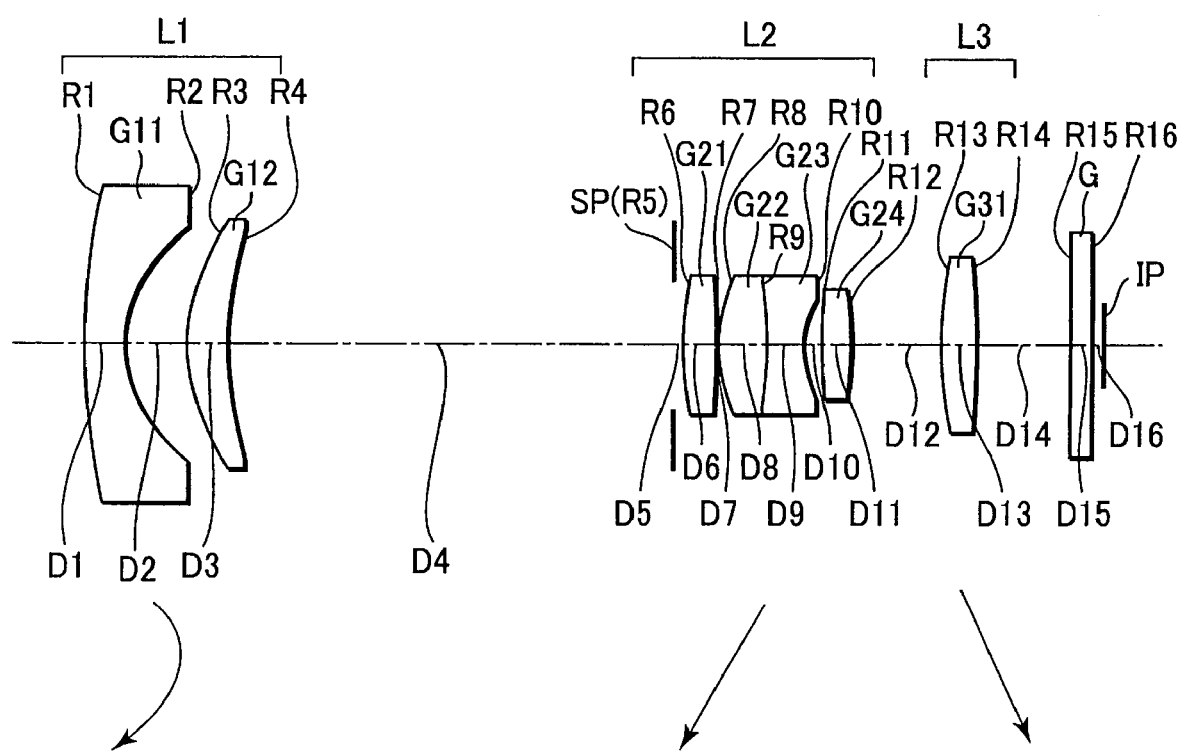
FIG. 19 illustrates a sectional view of a zoom lens of Exemplary Embodiment 10.
Figure 20A:
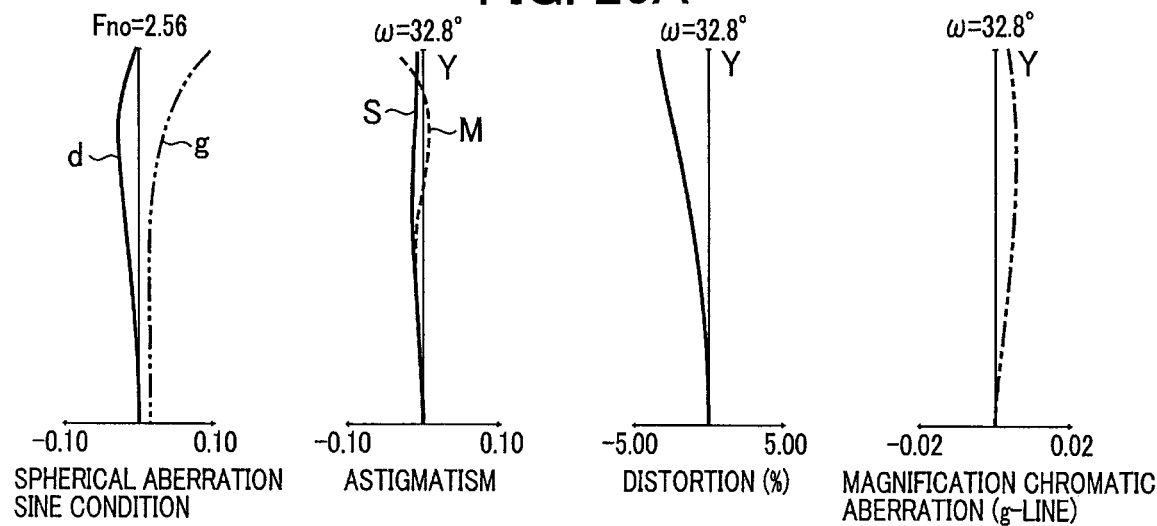
FIGS. 20A-20C illustrate an aberration diagram of the zoom lens of Exemplary Embodiment 10.
Figure 20B:
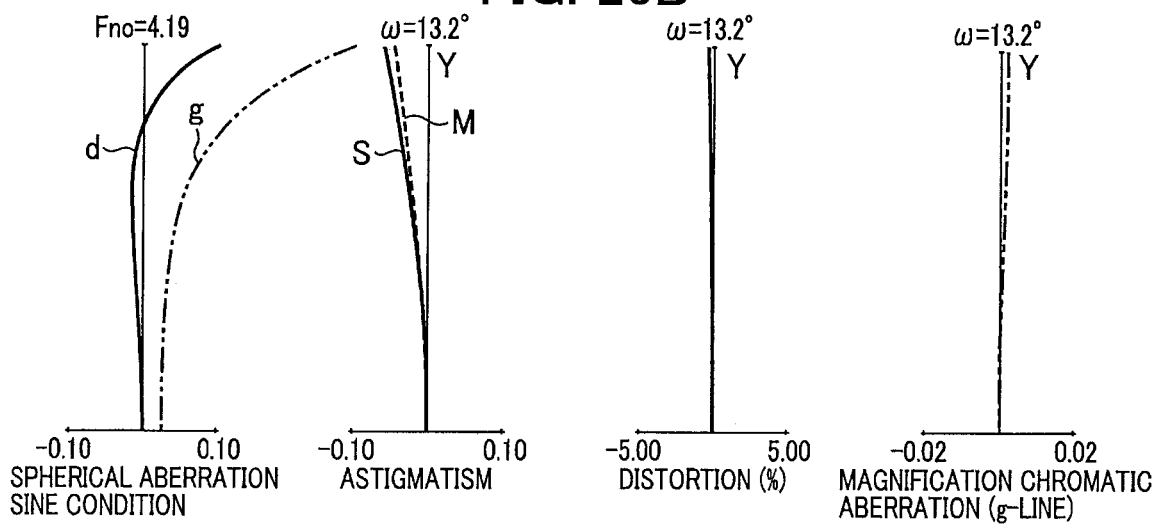
Figure 20C:
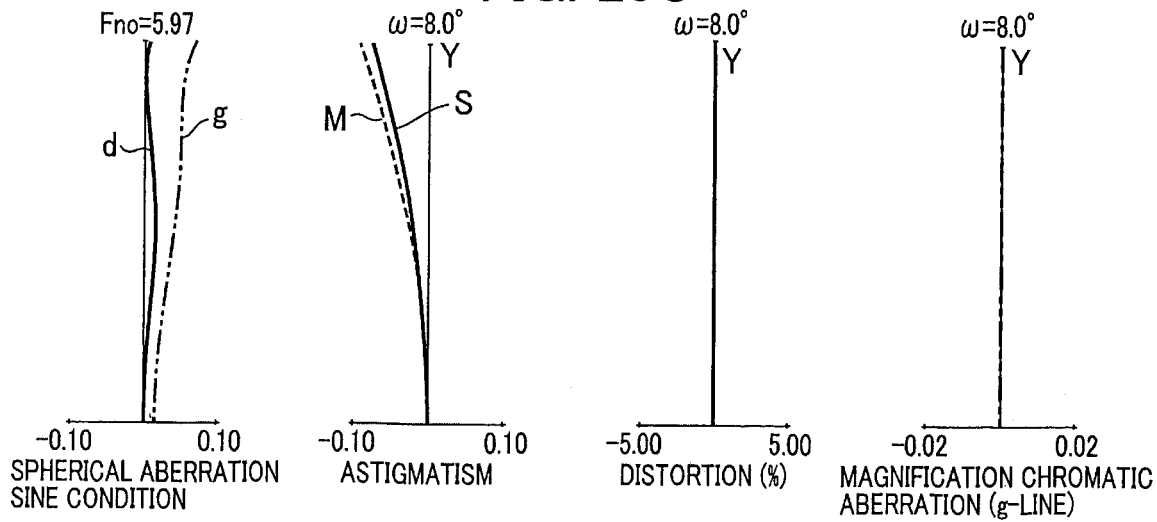

FIG. 19 is a lens sectional view in a wide-angle end (short-focal-length end) of a zoom lens according to Exemplary Embodiment 10. FIGS. 20(A) to (C) illustrate aberration diagrams of the wide-angle end of the zoom lens, an intermediate zoom position, and a telephoto end (long-focal-length end) according to Exemplary Embodiment 10. The example of Exemplary Embodiment 10 relates to the zoom lens having a zoom ratio of about 4.6, and an aperture ratio of about 2.6 to 6.0.

Figure 21:
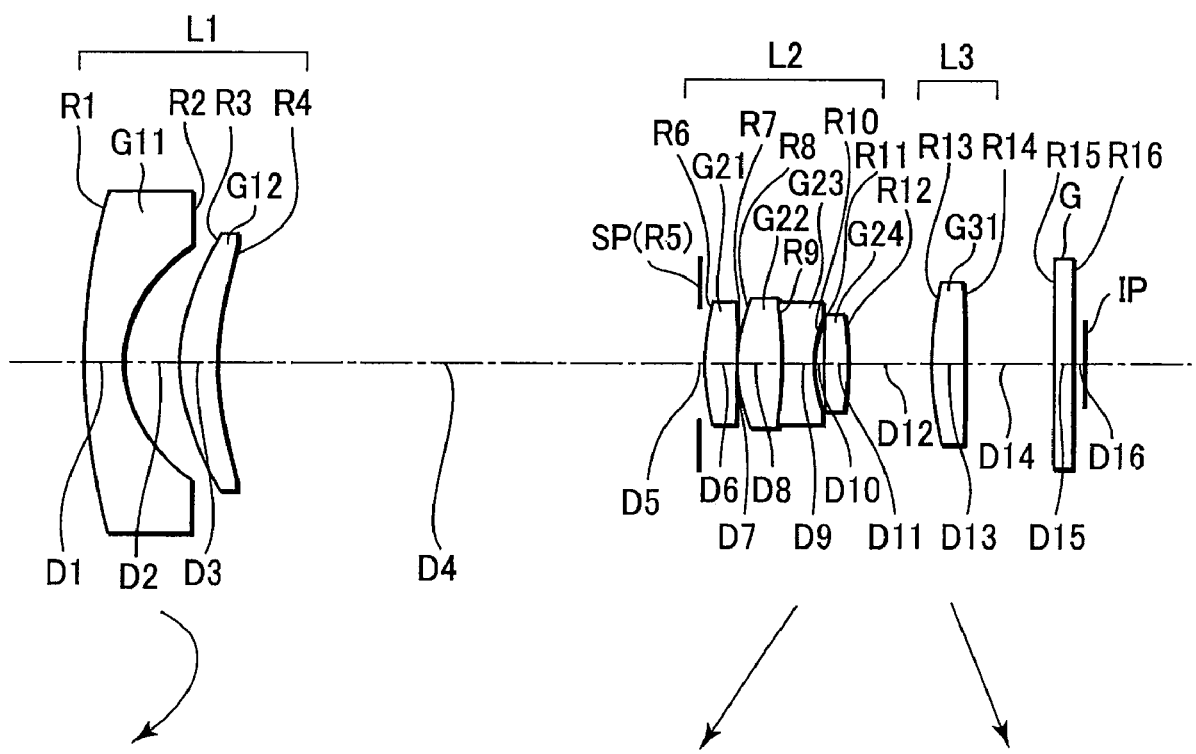
FIG. 21 illustrates a sectional view of a zoom lens of Exemplary Embodiment 11.
Figure 22A:
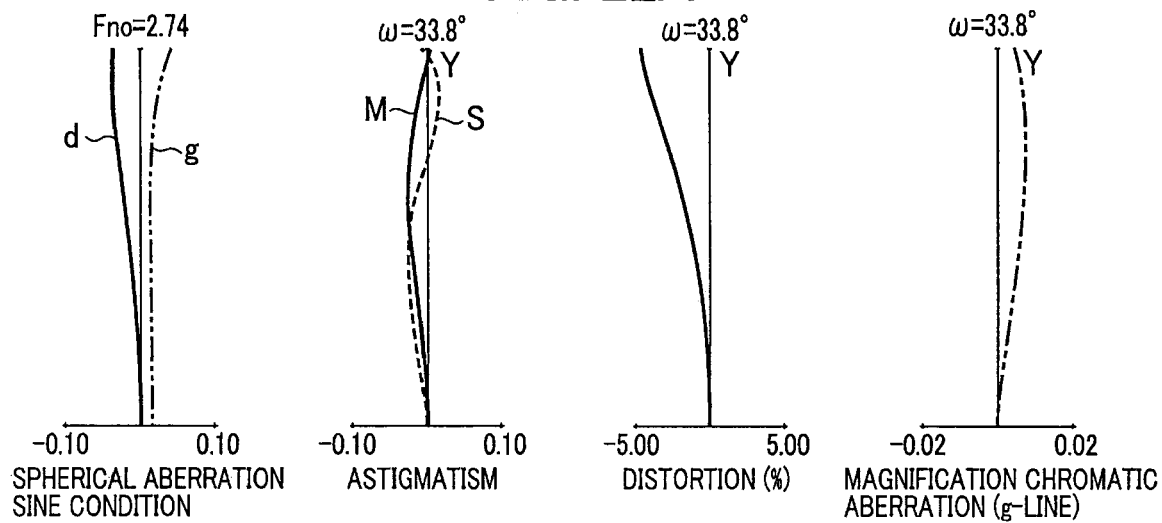
FIGS. 22A-22C illustrate an aberration diagram of the zoom lens of Exemplary Embodiment 11.
Figure 22B:
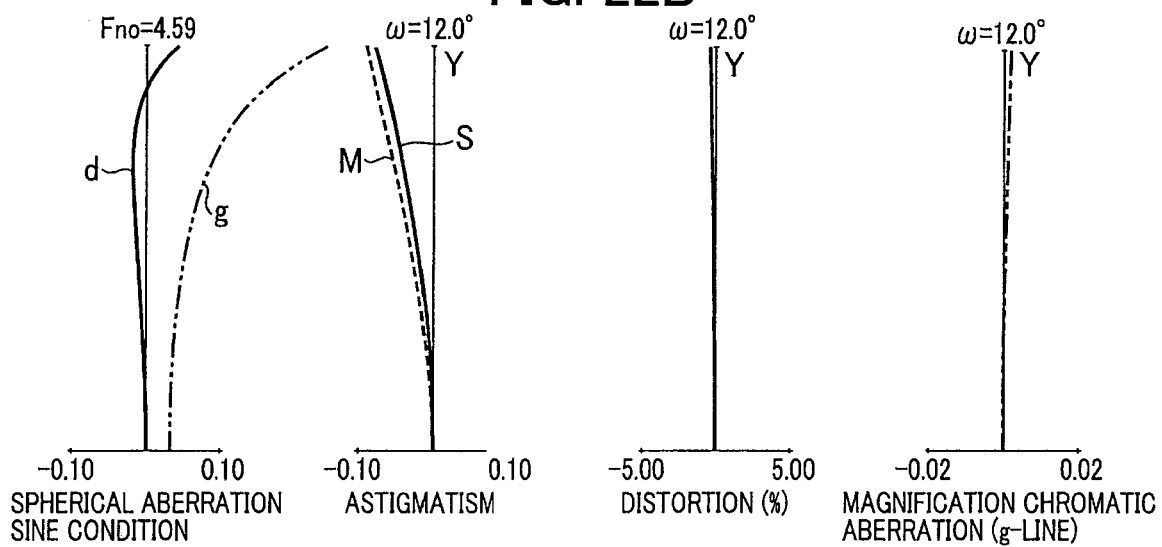
Figure 22C:
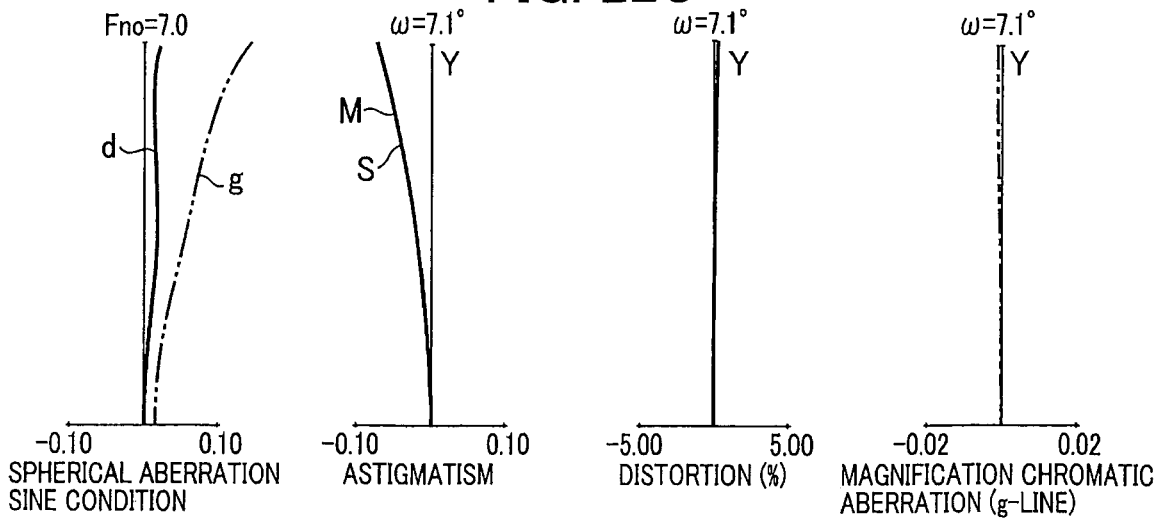

FIG. 21 is a lens sectional view in a wide-angle end of a zoom lens according to Exemplary Embodiment 11. FIGS. 22(A) to (C) illustrate aberration diagrams of the wide-angle end of the zoom lens, an intermediate zoom position, and a telephoto end respectively, according to Exemplary Embodiment 11. The example of Exemplary Embodiment 11 relates to the zoom lens having a zoom ratio of about 5.4, and an aperture ratio of about 2.7 to 7.0.

Figure 23:
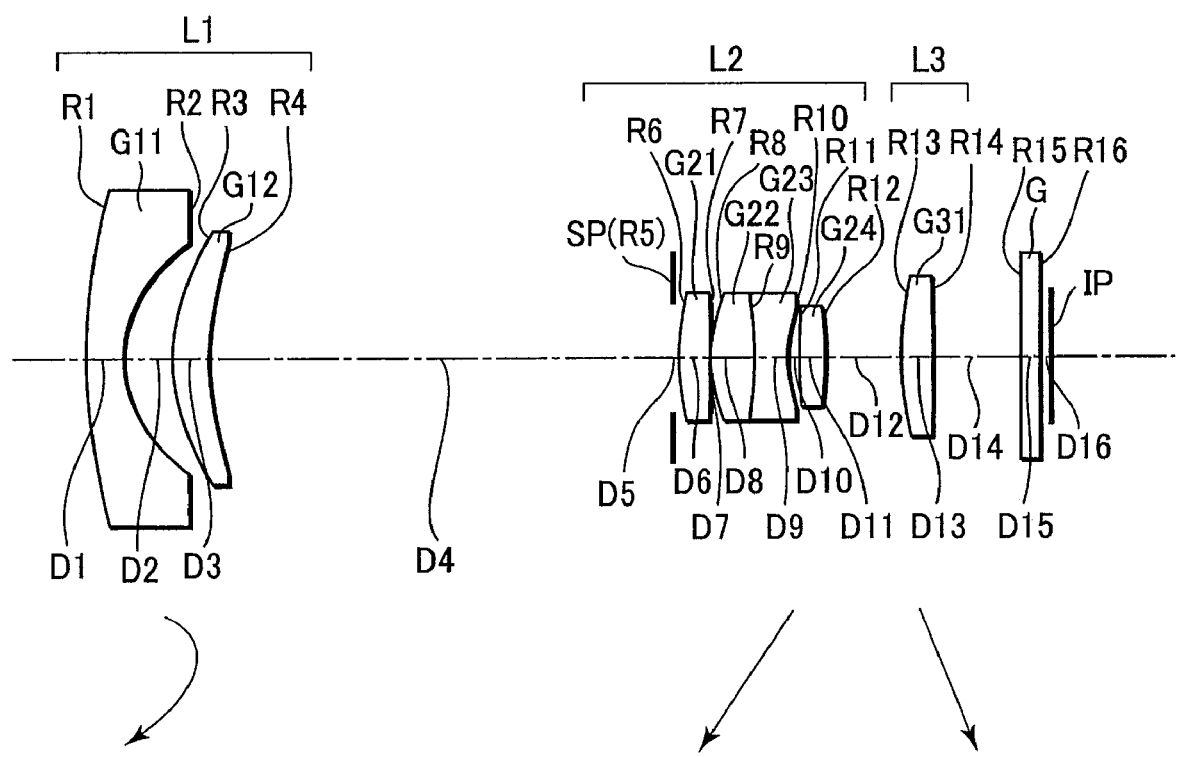
FIG. 23 illustrates a sectional view of a zoom lens of Exemplary Embodiment 12.
Figure 24A:
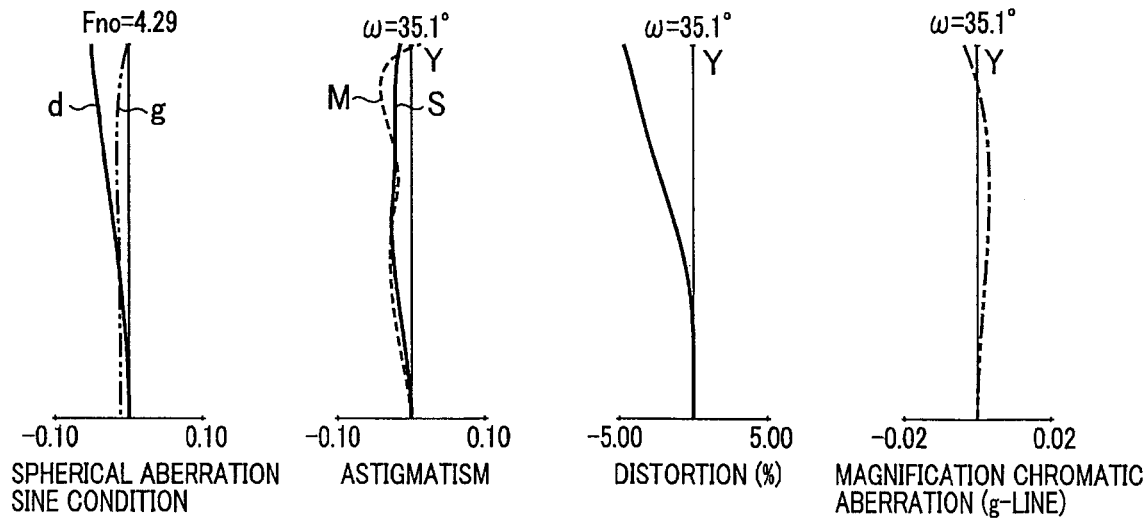
FIGS. 24A-24C illustrate an aberration diagram of the zoom lens of Exemplary Embodiment 12.
Figure 24B:
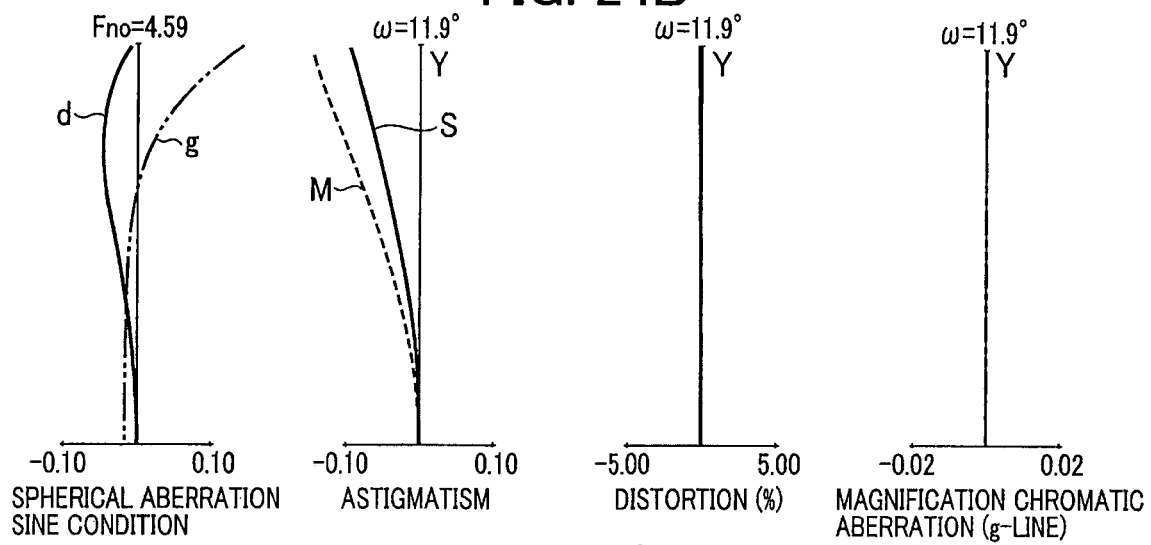
Figure 24C:
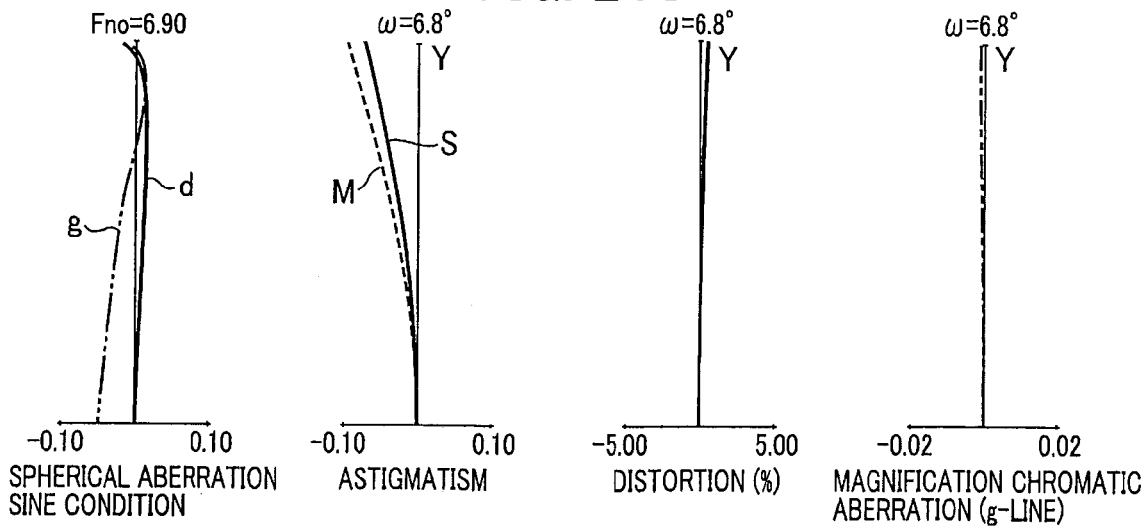

FIG. 23 is a lens sectional view in a wide-angle end of a zoom lens according to Exemplary Embodiment 12. FIGS. 24(A) to (C) illustrate aberration diagrams of the wide-angle end of the zoom lens, an intermediate zoom position, and a telephoto end respectively, according to Exemplary Embodiment 12. The example of Exemplary Embodiment 12 relates to the zoom lens having a zoom ratio of about 5.9, and an aperture ratio of about 2.5 to 6.9.

Figure 25:
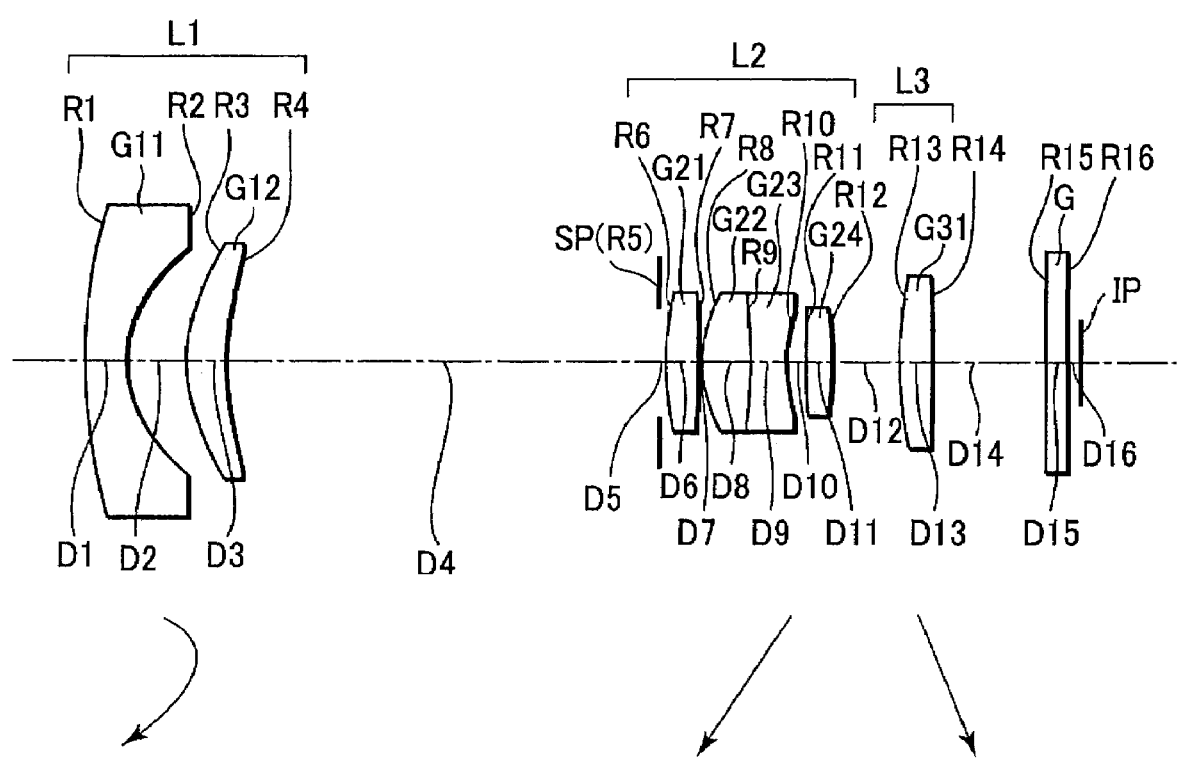
FIG. 25 illustrates a sectional view of a zoom lens of Exemplary Embodiment 13.
Figure 26A:
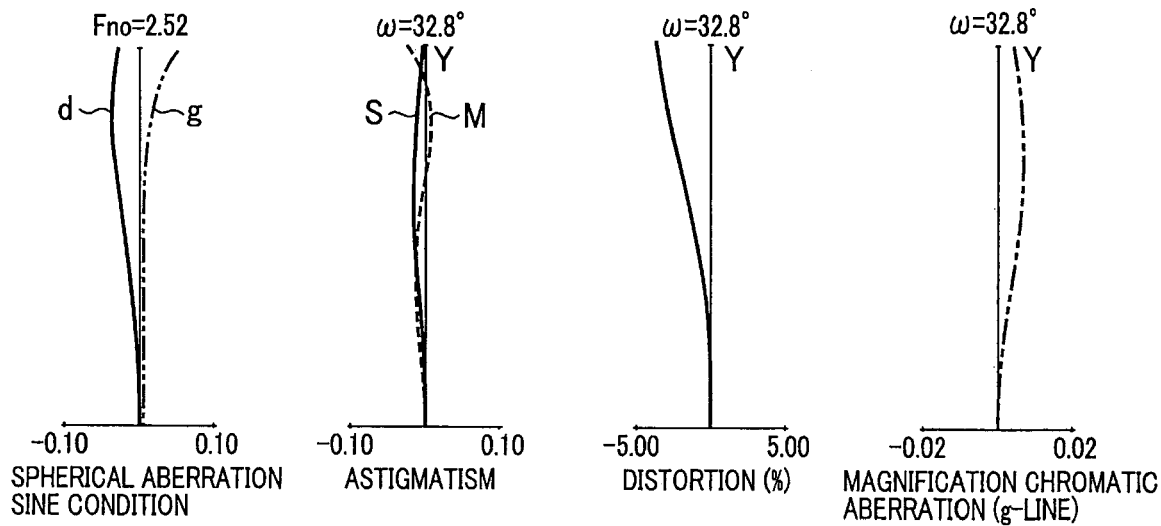
FIGS. 26A-26C illustrate an aberration diagram of the zoom lens of Exemplary Embodiment 13.
Figure 26B:
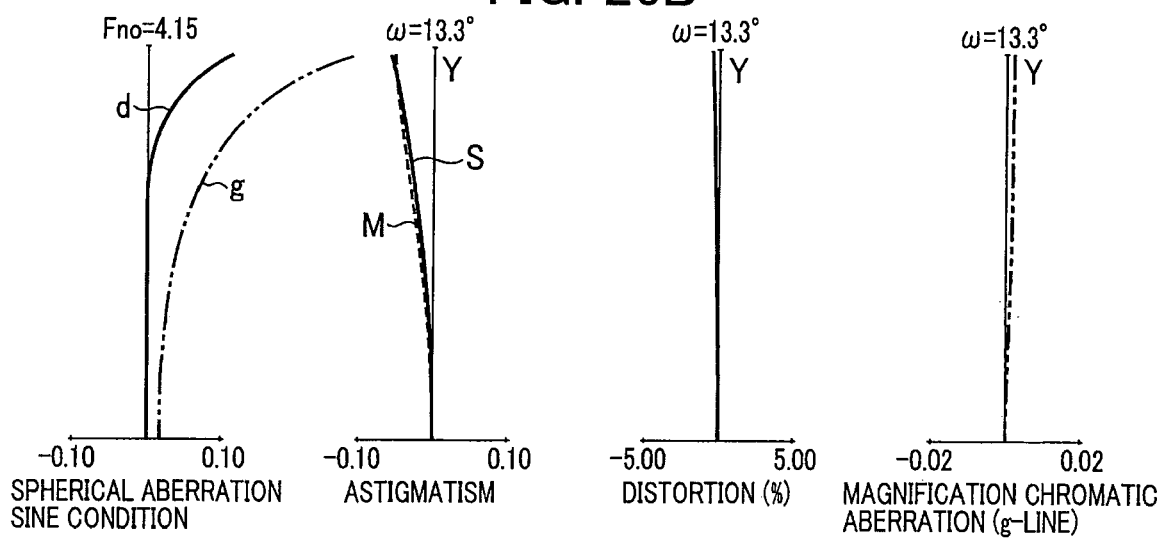
Figure 26C:
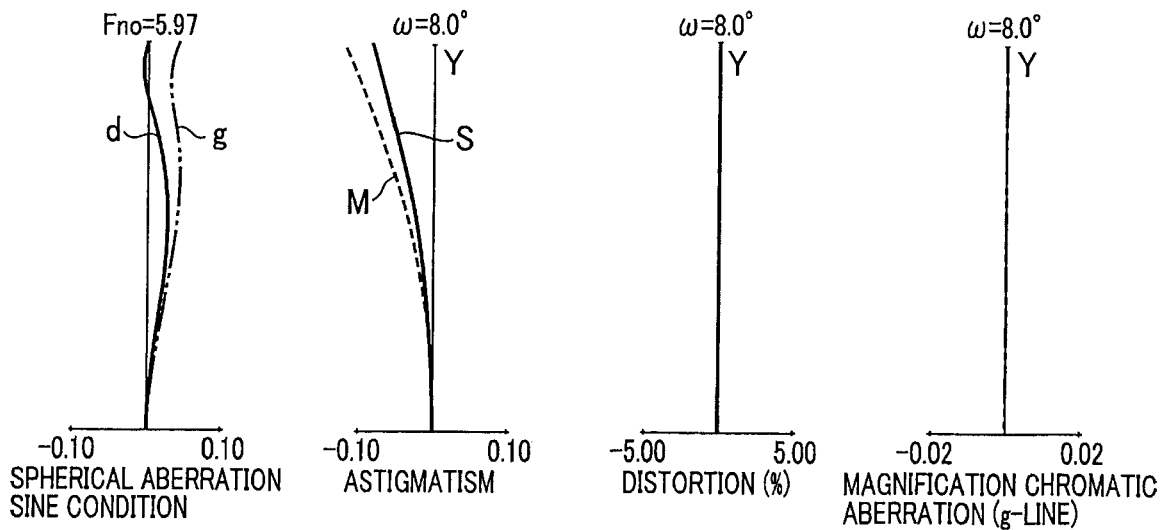

FIG. 25 is a lens sectional view in a wide-angle end of a zoom lens according to Exemplary Embodiment 13. FIGS. 26(A) to (C) illustrate aberration diagrams of the wide-angle end of the zoom lens, an intermediate zoom position, and a telephoto end respectively, according to Exemplary Embodiment 13. The example of Exemplary Embodiment 13 relates to the zoom lens having a zoom ratio of about 4.6, and an aperture ratio of about 2.5 to 6.0.

Figure 27:
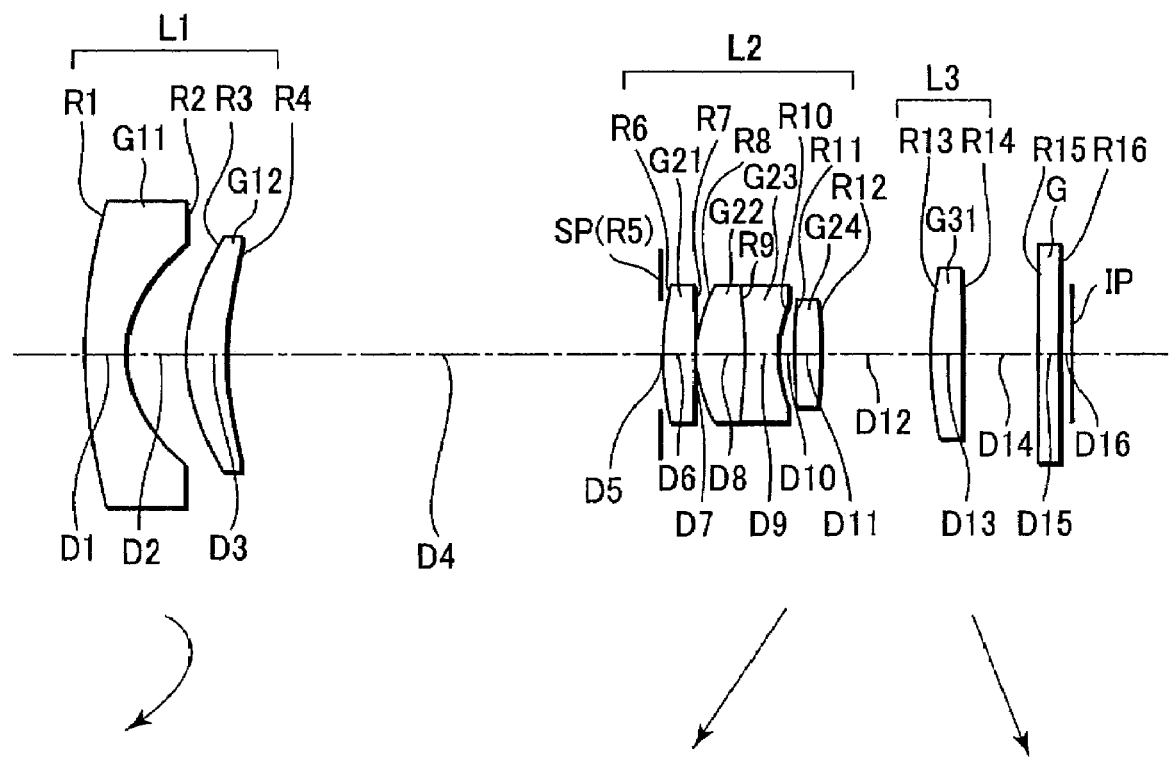
FIG. 27 illustrates a sectional view of a zoom lens of Exemplary Embodiment 14.
Figure 28A:
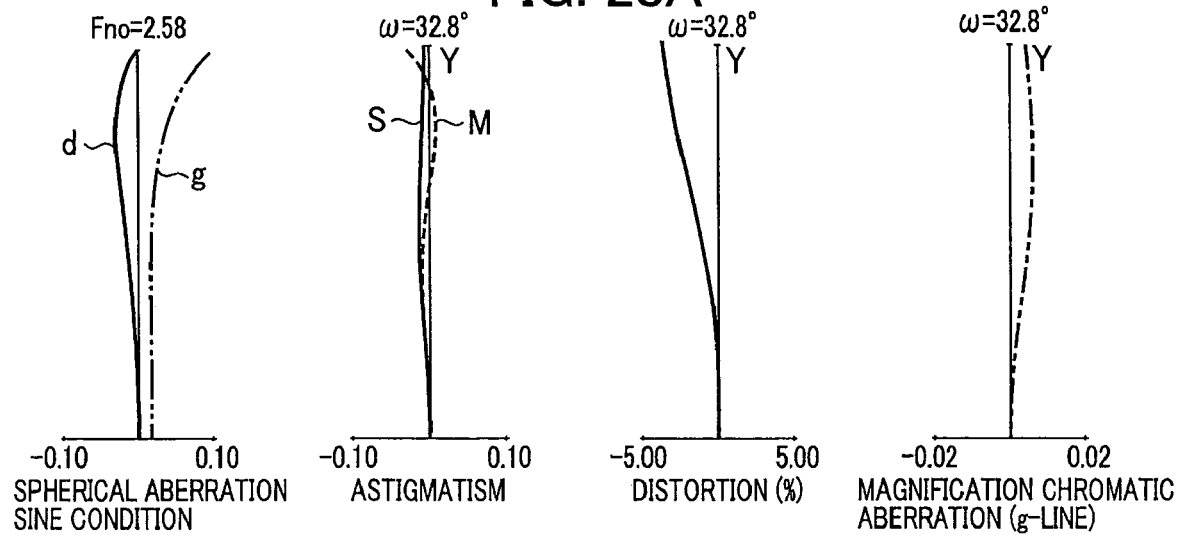
FIGS. 28A-28C illustrate an aberration diagram of the zoom lens of Exemplary Embodiment 14.
Figure 28B:
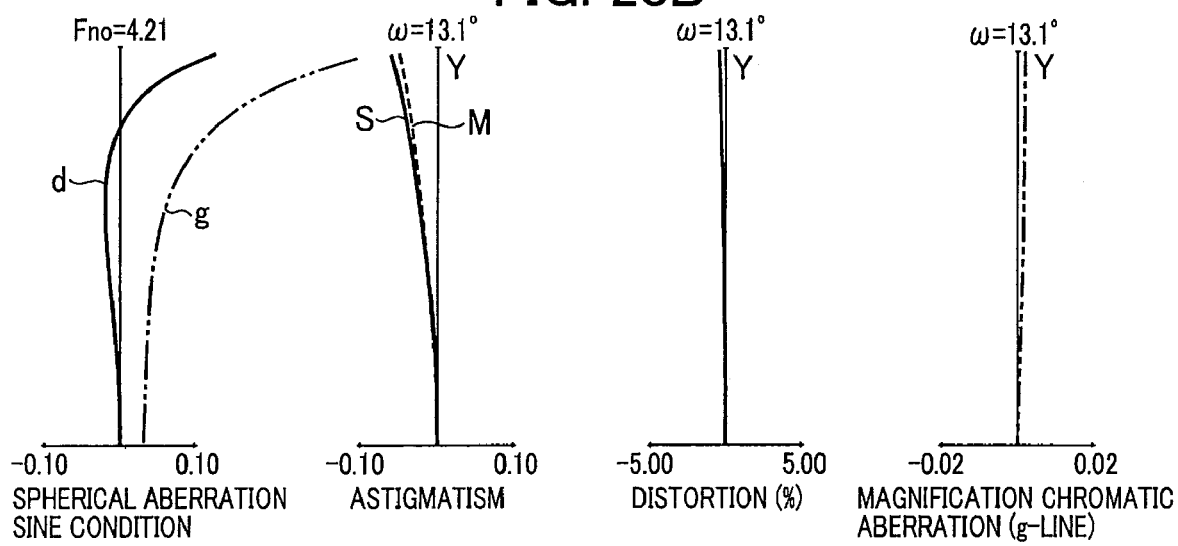
Figure 28C:
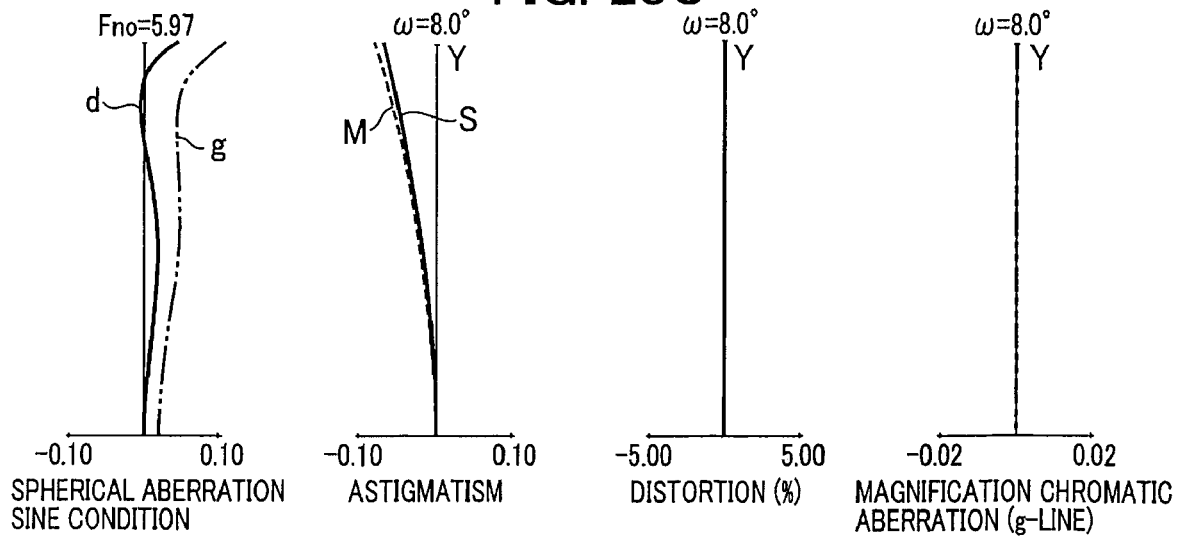

FIG. 27 is a lens sectional view in a wide-angle end of a zoom lens according to Exemplary Embodiment 14. FIGS. 28(A) to (C) illustrate aberration diagrams of the wide-angle end of the zoom lens, an intermediate zoom position, and a telephoto end respectively, according to Exemplary Embodiment 14. The example of Exemplary Embodiment 14 relates to the zoom lens having a zoom ratio of about 4.6, and an aperture ratio of about 2.5 to 6.0.

The zoom lenses of Exemplary Embodiments 10 to 14 are photographing lens systems which can be used in an image pickup apparatus. In each lens sectional view, the left side is an object side (front side), and the right side is an image side (rear side).

In the lens sectional views of FIGS. 19, 21, 23, 25, and 27, as mentioned above L1 denotes a first lens unit having a negative refractive power, L2 denotes a second lens unit having a positive refractive power, and L3 denotes a third lens unit having a positive refractive power. Moreover, SP denotes an aperture, and is positioned on the object side of the second lens unit L2.

Furthermore, G denotes an optical block corresponding to an optical filter, a face plate, a crystal low pass filter, an infrared cut filter. In addition, IP denotes an image plane. When the lens is used as a photographing optical system of a video camera or a digital still camera for example, a photosensitive surface is laid which corresponds to an image pickup surface of a solid-state image pickup element (photoelectric conversion element) for example a CCD sensor or a CMOS sensor.

In each aberration diagram, d, g denote a d-line and g-line, respectively, ΔM, ΔS denote a meridional image plane and a sagittal image plane, respectively, and a chromatic aberration of magnification is represented by the g-line.

It is to be noted that in each of Exemplary Embodiments 10 to 14, the wide-angle end and the telephoto end refer to the zoom positions at a time when the lens unit (second lens unit L2) for varying a magnification is positioned in opposite ends of a mechanism region where the unit is movable along the optical axis.

In the zoom lens according to each of Exemplary Embodiments 10 to 14, the first lens unit L1 substantially reciprocates along a convex track to the image side, the second lens unit L2 moves to the object side, and the third lens unit L3 moves to the image side during the zooming from the wide-angle end to the telephoto end.

According to each of Exemplary Embodiments 10 to 14, the zoom lens performs main magnification variation by movement of the second lens unit L2. Moreover, the movement of an image is compensated by the reciprocation of the first lens unit L1 and the movement of the third lens unit L3 toward the image side in association with the varying of the magnification.

Next, typical characteristics of a lens constitution will be described.

The first lens unit L1 includes, in order from the object side to the image side, two lenses: a negative lens G11 directing its convex surface on the object side and having a meniscus shape; and a positive lens G12 directing its concave surface on the image side and having a meniscus shape.

The first lens unit L1 has a function of forming a pupil image of a off-axis principal ray on a center of the aperture SP. Since a refraction amount of the off-axis principal ray is large especially on a wide-angle side, miscellaneous off-axis aberrations, especially astigmatism and distortion aberration, are easily generated.

To facilitate reduction of off-axis aberrations, each of Exemplary Embodiments 10 to 14 has a constitution of negative and positive lenses to suppress an increase of a diameter of the lens closest to the object side in the same manner as in a usual wide-angle lens.

Moreover, the lens surface of the negative lens G11 on the image side can be formed to be aspherical in order to weaken the negative refractive power in a lens periphery, and accordingly the astigmatism and the distortion aberration are compensated with a good balance. Furthermore, the first lens unit L1 can have only two lenses, and this contributes to a compact size of the whole lens.

Moreover, each lens element constituting the first lens unit L1 can have a lens shape approximate to a concentric spherical shape centering on the intersection of the aperture SP and the ray in order to inhibit generation of the off-axis aberration generated by refraction of a off-axis principal ray.

The second lens unit L2 includes, in order from the object side to the image side, a combination lens obtained by combining (e.g., bonding) a positive lens G21 having a convex surface on the object side, a positive lens G22 whose opposite side lens surfaces have convex shapes, and a negative lens G23 whose opposite lens surfaces have concave shapes; and a positive lens G24.

The second lens unit L2 which can have the positive lenses G21 and G22 on the object side has such a lens shape that the refraction angle of the off-axis principal ray emitted from the first lens unit L1 is reduced, thus reducing any off-axis aberration.

Moreover, the positive lens G21 is a lens which can have the largest height to pass an axial ray, and contributes mainly to corrections of spherical aberration and comatic aberration. In at least one exemplary embodiment, the positive lenses G21 and G22 are arranged, and a luminous flux is gradually refracted to thereby correct the spherical aberration and the comatic aberration satisfactorily.

Moreover, the surface of the negative lens G23 combination to the positive lens G22 can be formed into a concave shape, and accordingly the aberrations generated in the positive lenses G21 and G22 are canceled.

The third lens unit L3 can include a positive lens G31 whose at least one surface on the object side can have a convex shape.

The third lens unit L3 shares the increase of the refractive power of each lens unit in association with miniaturization of an image pickup element, so that the refractive power can be reduced in a short zoom system constituted of the first and second lens units L1, L2. Accordingly, the aberration is inhibited from being caused especially in each lens constituting the first lens unit L1 to achieve a satisfactory optical performance. Telecentric image forming on the image side, required especially for the photographing apparatus using the solid-state image pickup element, is facilitated by the third lens unit L3 serving the function of a field lens.

Now assuming that a back focus is sk', a focal length of the third lens unit L3 is f3, and an image forming magnification of the third lens unit L3 is β3, the following relation can be established:

$$sk'=f3(1-\beta 3),$$

wherein 0<β3<1.0.

Here, when the third lens unit L3 is moved to the image side during zooming from the wide-angle end to the telephoto end, the back focus sk' decreases, and the image forming magnification β3 of the third lens unit L3 increases in a zoom region on a telephoto side. Then, as a result, since the third lens unit L3 shares the varying of the magnification, a movement amount of the second lens unit L2 decreases. Moreover, as the movement amount of the second lens unit L2 decreases, space can be saved, and this contributes to the miniaturization of the lens system.

When a short-range object is photographed using the zoom lens according to each of Exemplary Embodiments 10 to 14, when the first lens unit L1 is moved to the object side, a satisfactory performance is obtained. The third lens unit L3 can be moved to the object side in performing the focusing.

This can facilitate the reduction of a front lens diameter when the first lens unit L1 is disposed closest to the object side and moved during the focusing. This can also prevent a load on an actuator from being increased at a time when the first lens unit L1 which can have the largest lens weight is moved. Furthermore, when the first lens unit L1 is not moved for the focusing, the first lens unit L1 can be simply connected to the second lens unit L2 (e.g., via a cam), and moved at a zooming time, thus at least one exemplary embodiment simplifies a mechanism structure and enhances the precision.

Moreover, when the focusing is performed by the third lens unit L3, when the third lens unit L3 can be moved to the image side during the zooming from the wide-angle end to the telephoto end, the third lens unit L3 can be disposed closer to the image side in the telephoto end in which the focusing movement amount is large rather than in the wide-angle end. As a result, the sum of the movement amounts of the third lens unit L3 required for the zooming and the focusing can be minimized, and the compact lens system can be easily facilitated.

As described above, when each lens unit can be formed into a lens constitution for establishing both of a desired refractive power arrangement and aberration correction, an entirely compact lens system, a high zoom ratio, and a reduced protruded lens length are achieved while maintaining the satisfactory optical performance.

It is to be noted that in the zoom lenses according to Exemplary Embodiments 10 to 14, at least one or more of the following conditions can be satisfied in order to obtain the satisfactory optical performance or minimize the whole lens system. Accordingly, an effect corresponding to each conditional expression is obtained.

Assuming that: the movement amount of the second lens unit L2 during the zooming from the wide-angle end to the telephoto end is Δ2× (a symbol of the movement amount Δ2× is positive for the movement to the object side, and negative in reverse movement); an interval between the second lens unit L2 and the third lens unit L3 in the wide-angle end is D23W; focal lengths of the first, second, and third lens units L1, L2, and L3 are f1, f2, and f3 in order; a focal length of the whole system in the wide-angle end is fW; the image forming magnifications of the second lens unit L2 in the wide-angle end and the telephoto end are β2W and β2T, respectively; the image forming magnifications of the third lens unit L3 in the wide-angle end and the telephoto end are β3W and β3T, respectively; an average value of refractive indexes of lens materials constituting the first lens unit L1 is n1a; the second lens unit L2 has a negative lens; and the material refractive index of the negative lens is n2b, the following conditions can be satisfied:

[Expression 3]

$$1.7 < \Delta 2 \times / \sqrt{|f1 * f2|} < 2.3 \quad (6);$$

$$0.5 < D23W/fW < 1.2 \quad (7);$$

$$3.8 < (\beta 2T * \beta 3W)/(\beta 2W * \beta 3T) > 5.2 \quad (8);$$

$$1.88 < n1a \quad (9);$$

$$1.85 < n2b \quad (10);$$

$$1.9 < f3/f2 < 2.5 \quad (11); \text{ and}$$

$$5.2 < f3/fW < 6.4 \quad (12).$$

When the movement amount Δ2× of the second lens unit L2 during the zooming becomes so small as to exceed the lower limit of Conditional Expression (6), the refractive powers of the first and second lens units L1 and L2 weaken. As a result, the movement amount of each lens unit increases in order to secure a predetermined zoom ratio, and it can become difficult to facilitate a compact whole system.

Moreover, when the upper limit value of the Conditional Expression (6) is exceeded, the refractive powers of the first and second lens units L1 and L2 strengthen. As a result, since the movement amount of each lens unit decreases in order to secure the predetermined zoom ratio, the whole system facilitates a compact size, but fails to facilitate the reduction of aberrations (e.g., astigmatism and comatic aberration).

When the interval D23W increases to exceed the upper limit of Conditional Expression (7), the closest object can be easily focused in the wide-angle end during the focusing with the third lens unit L3. However, since the total lens length increases, it is difficult to facilitate a compact whole system.

When the interval D23W decreases to exceed the lower limit of Conditional Expression (7), it is difficult to focus on the closest object with the third lens unit L3 only in the wide-angle end. As a result, for example, since the first lens unit L1 needs to be moved more for the focusing, the mechanism becomes complicated. When the first lens unit L1 is moved for the focusing, an effective diameter of the first lens unit increases, and this fails to facilitate the setting of a compact system.

When the lower limit of Conditional Expression (8) is exceeded, the second lens unit L2 insufficiently shares the varying of the magnification, and it becomes difficult to realize a zoom ratio that exceeds 4. The movement amount of the third lens unit L3 during the zooming increases, and the total length can increase.

Moreover, when the upper limit of the Conditional Expression (8) is exceeded, the second lens unit L2 excessively shares the varying of the magnification. Therefore, the number of the lenses constituting the second lens unit L2 can be increased to scatter an aberration load in the second lens unit L2, and the total length of the second lens unit L2 can increase.

When the lower limit value of the Conditional Expression (9) is exceeded, the refractive power of each lens constituting the first lens unit L1 can be increased in order to obtain the predetermined zoom ratio. As a result, the curvature radius of the lens surface, especially that of the lens surface on the image side, decreases, and it becomes difficult to mold the lens. When the curvature is moderated to obtain the predetermined zoom ratio, the number of the lenses of the first lens unit L1 increases, and the whole system can enlarge.

Moreover, when the lower limit value of Conditional Expression (10) is exceeded, the number of the lenses constituting the second lens unit L2 can be increased, or the thickness of the negative lens can be increased in order to obtain the predetermined zoom ratio. Therefore, it becomes difficult to facilitate a compact whole system.

When the refractive power of the second lens unit L2 weakens to exceed the upper limit of the Conditional Expression (11), the movement amount of the second lens unit L2 increases in order to secure the predetermined zoom ratio, and this fails to facilitate the setting of a compact system.

Moreover, when the refractive power of the third lens unit L3 strengthens to exceed the upper limit, the number of the lenses can be increased in order to correct the astigmatism, and it becomes difficult to facilitate a compact whole system.

When the refractive power of the second lens unit L2 strengthens to exceed the lower limit value of Conditional Expression (11), the number of the lenses of the second lens unit L2 can be increased in order to correct the comatic aberration, and it becomes difficult to facilitate a compact whole system.

When the upper limit value of Conditional Expression (12) is exceeded, an emission pupil position comes close to the image plane, and the telecentric property is deteriorated.

Moreover, when the refractive power of the third lens unit L3 strengthens to exceed the lower limit of Conditional Expression (12) exceeded, the telecentric property becomes satisfactory, but the astigmatism increases, and it becomes difficult to reduce the astigmatism.

The numerical value range of each conditional expression described above can be set as follows for the aberration correction and the miniaturization of the whole lens system.

The following conditions can be satisfied:

[Expression 4]

$$1.72 < \Delta 2 \times /\sqrt{|\theta 1 * f 2|} < 2.20 \quad (6a);$$

$$0.6 < D23W/fW < 1.1 \quad (7a);$$

$$3.9 < (\beta 2T*\beta 3W)/(\beta 2W*\beta 3T) > 5.1 \quad (8a);$$

$$1.90 < n1a \quad (9a);$$

$$1.90 < n2b \quad (10a);$$

$$2.0 < f3/f2 < 2.4 \quad (11a); \text{ and}$$

$$5.3 < f3/fW < 6.35 \quad (12a).$$

When each element is set as in Exemplary Embodiments 10 to 14, it is possible to achieve the zoom lens which is suitable especially for the photographing system using the solid-state image pickup element and which is compact with a small number of constituting lenses and which is appropriate as a popup system and which has a superior optical performance (e.g., a zoom ratio of about four-fold to six-fold).

Moreover, according to Exemplary Embodiments 10 to 14, when the aspherical surface is effectively introduced in the first lens unit L1, and especially the refractive powers of the first and second lens units L1 and L2 are appropriately set, it is possible to effectively reduce the off-axis aberration, especially the astigmatism and the distortion aberration, and the spherical aberration when an aperture diameter is enlarged.

It is to be noted that in Exemplary Embodiments 10 to 14 described above, each zoom lens is applicable to such a zoom type that two lens units (e.g., the first and second lens units, the first and third lens units, or the second and third lens units) are moved in such a manner as to change the interval between the lens units instead of moving three lens units during the zooming.

Moreover, even when a lens unit having a small refractive power is added to the object side of the first lens unit L1 and/or the image side of the third lens unit L3, an effect obtained in the exemplary embodiment is substantially unchanged.

Next, Numerical Examples 10 to 14 will be described. Since meanings indicated by symbols in Numerical Examples 10 to 14 are the same as those in Numerical Examples 1 to 9 described above, description thereof is omitted.

Numerical examples 10
f = 4.69 to 21.60 Fno = 2.56 to 5.97 2ω = 65.5° to 15.9°

| R1 = 28.278 | D1 = 1.80 | N1 = 1.882997 | v1 = 40.8 |
|---|---|---|---|
| R2 = 5.123 | D2 = 2.84 | | |
| R3 = 9.485 | D3 = 1.75 | N2 = 1.922860 | v2 = 18.9 |
| R4 = 16.168 | D4 = variable | | |
| R5 = aperture | D5 = 0.40 | | |
| R6 = 13.007 | D6 = 1.50 | N3 = 1.693501 | v3 = 53.2 |
| R7 = 690.521 | D7 = 0.10 | | |
| R8 = 6.185 | D8 = 2.25 | N4 = 1.696797 | v4 = 55.5 |
| R9 = −18.336 | D9 = 1.60 | N5 = 1.901355 | v5 = 31.6 |
| R10 = 5.092 | D10 = 0.81 | | |
| R11 = 23.853 | D11 = 1.30 | N6 = 1.719995 | v6 = 50.2 |
| R12 = −17.457 | D12 = variable | | |
| R13 = 18.330 | D13 = 1.60 | N7 = 1.487490 | v7 = 70.2 |
| R14 = −36.938 | D14 = variable | | |
| R15 = ∞ | D15 = 1.00 | N8 = 1.516330 | v8 = 64.1 |
| R16 = ∞ | | | |

| | Focal distance | | |
|---|---|---|---|
| Variable interval | 4.69 | 12.90 | 21.60 |
| D4 | 20.33 | 5.16 | 1.80 |
| D12 | 4.02 | 15.03 | 26.52 |
| D14 | 4.33 | 4.08 | 3.36 |

Aspherical coefficient

R2 k = −1.57269e+00 B = 9.31352e−04 C = −9.32116e−07
D = 1.10249e−08 E = 3.97985e−10
R8 k = −1.77870e−01 B = 5.38565e−05 C = 2.46566e−06

Numerical examples 11
f = 4.50 to 24.35 Fno = 2.74 to 7.00 2ω = 67.7° to 14.1°

| R1 = 28.104 | D1 = 1.80 | N1 = 1.882997 | v1 = 40.8 |
|---|---|---|---|
| R2 = 5.326 | D2 = 2.67 | | |
| R3 = 9.520 | D3 = 1.75 | N2 = 1.922860 | v2 = 18.9 |
| R4 = 16.301 | D4 = variable | | |
| R5 = aperture | D5 = 0.20 | | |
| R6 = 10.497 | D6 = 1.50 | N3 = 1.620411 | v3 = 60.3 |
| R7 = 91.154 | D7 = 0.10 | | |
| R8 = 6.413 | D8 = 2.05 | N4 = 1.788001 | v4 = 47.4 |
| R9 = −27.354 | D9 = 1.50 | N5 = 2.003300 | v5 = 28.3 |
| R10 = 5.137 | D10 = 0.50 | | |
| R11 = 24.649 | D11 = 1.20 | N6 = 1.834000 | v6 = 37.2 |
| R12 = −22.165 | D12 = variable | | |
| R13 = 15.118 | D13 = 1.60 | N7 = 1.516330 | v7 = 64.1 |
| R14 = −112.010 | D14 = variable | | |
| R15 = ∞ | D15 = 1.00 | N8 = 1.516330 | v8 = 64.1 |
| R16 = ∞ | | | |

| | Focal distance | | |
|---|---|---|---|
| Variable interval | 4.50 | 14.14 | 24.35 |
| D4 | 23.38 | 5.25 | 1.80 |
| D12 | 3.95 | 16.12 | 28.69 |
| D14 | 4.25 | 3.96 | 3.25 |

Aspherical coefficient

R2 k = −1.31424e+00 B = 6.16883e−04 C = 3.16840e−06
D = 1.01182e−08 E = −3.58477e−10
R8 k = −2.76663e+00 B = 1.25488e−03 C = −1.10959e−05
D = 3.02464e−07

Numerical examples 12
f = 4.29 to 25.30 Fno = 2.50 to 6.90 2ω = 70.2° to 13.6°

| R1 = 33.847 | D1 = 1.80 | N1 = 1.882997 | v1 = 40.8 |
|---|---|---|---|
| R2 = 5.319 | D2 = 2.49 | | |
| R3 = 9.526 | D3 = 1.75 | N2 = 1.922860 | v2 = 18.9 |
| R4 = 16.478 | D4 = variable | | |
| R5 = aperture | D5 = 0.20 | | |
| R6 = 10.394 | D6 = 1.45 | N3 = 1.639999 | v3 = 60.1 |
| R7 = 62.083 | D7 = 0.10 | | |
| R8 = 6.334 | D8 = 2.10 | N4 = 1.772499 | v4 = 49.6 |
| R9 = −51.827 | D9 = 1.55 | N5 = 2.003300 | v5 = 28.3 |
| R10 = 5.096 | D10 = 0.55 | | |
| R11 = 22.577 | D11 = 1.20 | N6 = 1.834000 | v6 = 37.2 |
| R12 = −21.511 | D12 = variable | | |
| R13 = 12.440 | D13 = 1.60 | N7 = 1.516330 | v7 = 64.1 |
| R14 = 110.419 | D14 = variable | | |
| R15 = ∞ | D15 = 1.00 | N8 = 1.516330 | v8 = 64.1 |
| R16 = ∞ | | | |

-continued

| | Focal distance | | |
|---|---|---|---|
| Variable interval | 4.29 | 14.31 | 25.30 |
| D4 | 22.31 | 4.94 | 1.78 |
| D12 | 3.54 | 16.87 | 30.62 |
| D14 | 4.16 | 3.50 | 2.42 |

Aspherical coefficient

R1 k = 1.66792e+01 B = 3.29890e−05 C = −3.75031e−06
D = 7.54949e−08 E = −8.64945e−10
R2 k = −1.28756e+00 B = 6.38450e−04 C = 5.28748e−06
D = −1.07260e−07 E = 7.71211e−10
R8 k = −3.00310e+00 B = 1.38557e−03 C = −1.77869e−05
D = 5.11304e−07

Numerical examples 13
f = 4.69 to 21.60 Fno = 2.52 to 5.97 2ω = 65.5° to 15.9°

| | | | |
|---|---|---|---|
| R1 = 27.781 | D1 = 1.80 | N1 = 1.882997 | ν1 = 40.8 |
| R2 = 5.112 | D2 = 2.87 | | |
| R3 = 9.459 | D3 = 1.75 | N2 = 1.922860 | ν2 = 18.9 |
| R4 = 16.081 | D4 = variable | | |
| R5 = aperture | D5 = 0.40 | | |
| R6 = 12.693 | D6 = 1.50 | N3 = 1.693501 | ν3 = 53.2 |
| R7 = 748.560 | D7 = 0.10 | | |
| R8 = 6.188 | D8 = 2.25 | N4 = 1.696797 | ν4 = 55.5 |
| R9 = −17.856 | D9 = 1.60 | N5 = 1.901355 | ν5 = 31.6 |
| R10 = 5.062 | D10 = 0.90 | | |
| R11 = 24.749 | D11 = 1.30 | N6 = 1.719995 | ν6 = 50.2 |
| R12 = −17.554 | D12 = variable | | |
| R13 = 20.052 | D13 = 1.60 | N7 = 1.487490 | ν7 = 70.2 |
| R14 = −32.668 | D14 = variable | | |
| R15 = ∞ | D15 = 1.00 | N8 = 1.516330 | ν8 = 64.1 |
| R16 = ∞ | | | |

| | Focal distance | | |
|---|---|---|---|
| Variable interval | 4.69 | 17.55 | 21.60 |
| D4 | 19.84 | 5.11 | 1.80 |
| D12 | 3.00 | 14.28 | 26.27 |
| D14 | 4.99 | 4.58 | 3.48 |

Aspherical coefficient

R2 k = −1.55604e+00 B = 9.15097e−04 C = −5.65375e−08
D = 7.02344e−09 E = 2.63734e−10
R8 k = −2.86351e−01 B = 1.03856e−04 C = 4.26746e−06

Numerical examples 14
f = 4.69 to 21.60 Fno = 2.58 to 5.97 2ω = 65.5° to 15.9°

| | | | |
|---|---|---|---|
| R1 = 28.388 | D1 = 1.80 | N1 = 1.882997 | ν1 = 40.8 |
| R2 = 5.087 | D2 = 2.90 | | |
| R3 = 9.529 | D3 = 1.75 | N2 = 1.922860 | ν2 = 18.9 |
| R4 = 16.168 | D4 = variable | | |
| R5 = aperture | D5 = 0.10 | | |
| R6 = 13.199 | D6 = 1.50 | N3 = 1.693501 | ν3 = 53.2 |
| R7 = 554.461 | D7 = 0.10 | | |
| R8 = 6.184 | D8 = 2.25 | N4 = 1.696797 | ν4 = 55.5 |
| R9 = −18.358 | D9 = 1.60 | N5 = 1.901355 | ν5 = 31.6 |
| R10 = 5.115 | D10 = 0.81 | | |
| R11 = 22.733 | D11 = 1.30 | N6 = 1.719995 | ν6 = 50.2 |
| R12 = −16.955 | D12 = variable | | |
| R13 = 16.884 | D13 = 1.60 | N7 = 1.487490 | ν7 = 70.2 |
| R14 = −49.680 | D14 = variable | | |
| R15 = ∞ | D15 = 1.00 | N8 = 1.516330 | ν8 = 64.1 |
| R16 = ∞ | | | |

| | Focal Distance | | |
|---|---|---|---|
| Variable interval | 4.69 | 12.98 | 21.60 |
| D4 | 20.79 | 5.40 | 1.96 |
| D12 | 5.06 | 15.84 | 26.79 |
| D14 | 3.58 | 3.27 | 2.80 |

Aspherical coefficient

R2 k = −1.49618e+00 B = 8.75196e−04 C = −3.59972e−07
D = 1.41022e−08 E = 3.46972e−10
R8 k = −4.33552e−01 B = 1.86343e−04 C = 5.39556e−06

TABLE 1

| Conditional expression | Upper limit value | Lower limit value | Embodiment 1 | Embodiment 2 | Embodiment 3 | Embodiment 4 | Embodiment 5 |
|---|---|---|---|---|---|---|---|
| Δ2X | | | 21.53 | 23.74 | 25.34 | 21.76 | 20.95 |
| f1 | | | −12.25 | −13.08 | −12.12 | −12.31 | −12.05 |
| f2 | | | 12.17 | 12.21 | 11.75 | 12.22 | 12.05 |
| (6) Δ2X/√|f1 · f2| | 1.7 | 2.3 | 1.76 | 1.88 | 2.12 | 1.77 | 1.74 |
| f3 | | | 25.37 | 25.91 | 27.00 | 25.74 | 26.06 |
| (11) f3/f2 | 1.9 | 2.5 | 2.08 | 2.12 | 2.30 | 2.11 | 2.16 |
| D23W | | | 4.02 | 3.95 | 3.54 | 3.00 | 5.06 |
| fw | | | 4.69 | 4.50 | 4.29 | 4.69 | 4.69 |
| (7) D23W/fw | 0.5 | 1.2 | 0.86 | 0.88 | 0.82 | 0.64 | 1.08 |
| β2W | | | −0.51 | −0.46 | −0.47 | −0.52 | −0.50 |
| β2T | | | −2.22 | −2.35 | −2.54 | −2.21 | −2.20 |
| β3W | | | 0.76 | 0.76 | 0.76 | 0.74 | 0.79 |
| (8) β2T | | | 0.79 | 0.79 | 0.82 | 0.79 | 0.72 |
| (β2T − β3W)/(β2W − β3T) | 3.8 | 5.2 | 4.17 | 4.89 | 5.01 | 3.95 | 4.87 |
| (12) f3/fW | 5.2 | 6.4 | 5.41 | 5.75 | 6.29 | 5.49 | 5.56 |
| (9) n1a | 1.88 | — | 1.903 | 1.903 | 1.903 | 1.903 | 1.903 |
| (10) n2b | 1.85 | — | 1.901 | 2.003 | 2.003 | 1.901 | 1.901 |

Next, an embodiment of a digital still camera (image pickup apparatus) will be described with reference to FIG. 29. In the camera, the zoom lens system of the exemplary embodiment can be used as the photographing optical system.

Figure 29:
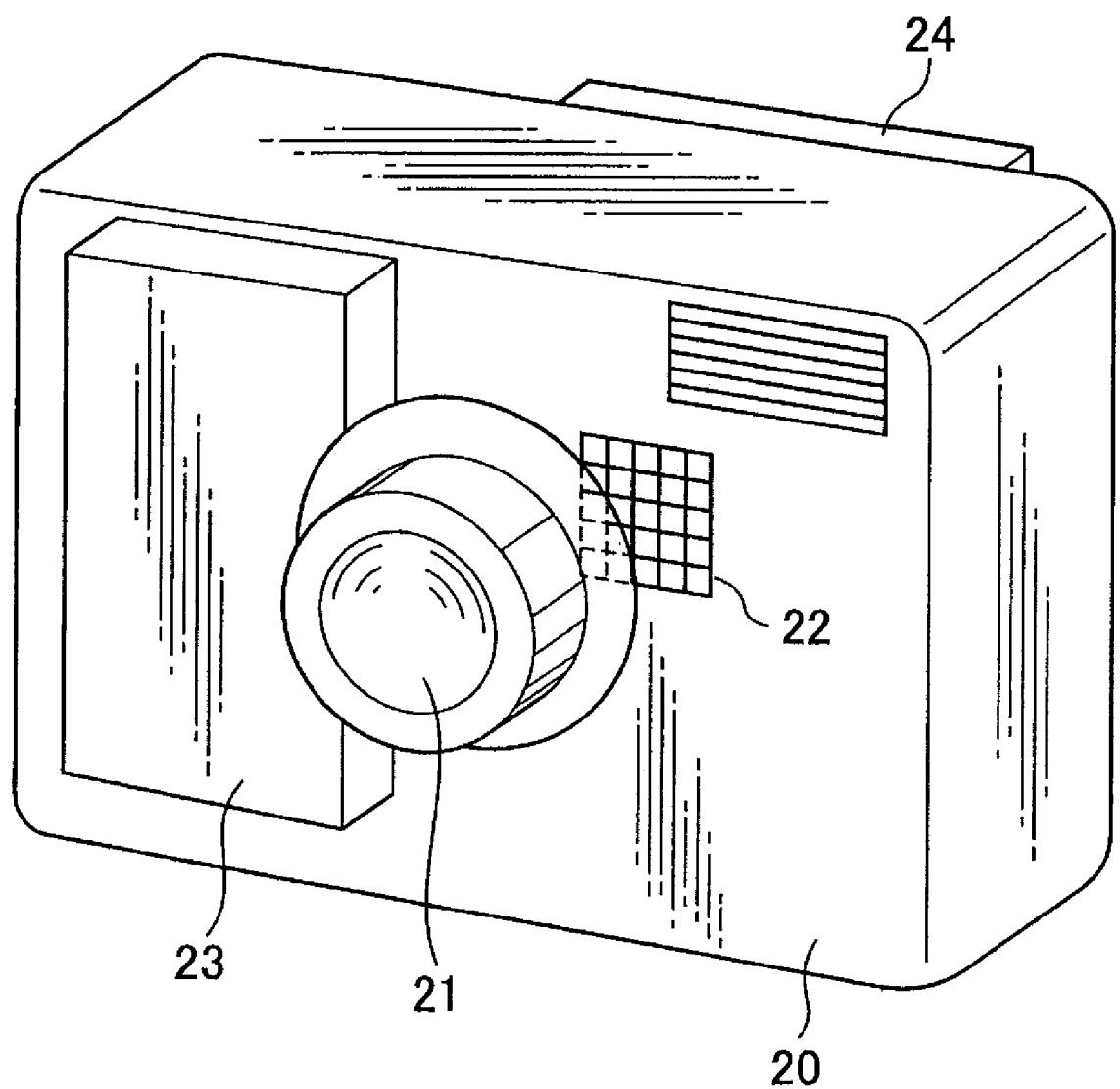
FIG. 29 illustrates a schematic diagram of a main part of an image pickup apparatus.

In FIG. 29: reference numeral 20 denotes a camera main body; 21 denotes an photographing optical system constituted of the zoom lens system of the exemplary embodiment; 22 denotes a solid-state image pickup element (photoelectric conversion element) for example a CCD sensor or a CMOS sensor which is built in the camera main body and which receives a subject image formed by the photographing optical system 21; 23 denotes a memory which records information corresponding to a subject image photoelectrically converted by the image pickup element 22; and 24 denotes a finder which can include a display panel (e.g., liquid crystal display panel) and which is used for observing the subject image formed on the solid-state image pickup element 22.

When the zoom lens system of at least one exemplary embodiment is applied to an image pickup apparatus such as the digital still camera in this manner, a small-sized image pickup apparatus having a high optical performance is realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2004-364447, filed Dec. 16, 2004, which is hereby incorporated by reference herein in its entirety.

What is claimed is:

1. A zoom lens system comprising, in order from an object side to an image side:
   a first lens unit having a negative optical power, wherein the first lens unit includes only, in order from the object side to the image side, a first negative lens element and a second positive lens element as the lens elements;
   a second lens unit having a positive optical power, wherein the second lens unit includes only, in order from the object side to the image side, a third positive lens element, a fourth positive lens element, a fifth negative lens element and a sixth positive lens element as the lens elements; and
   a third lens unit having a positive optical power,
   wherein an interval between the first and second lens units, and an interval between the second and third lens units change during zooming,
   wherein the third lens unit moves to the image side during the zooming from a wide-angle end to a telephoto end; and
   wherein a focal length of the third lens unit is f3, a focal length of the whole system in the wide-angle end is fW, and the condition 4.0<f3/fW<5.0 is satisfied.

2. The zoom lens system according to claim 1, wherein the fourth positive lens element and the fifth negative lens element constitute a combination lens.

3. The zoom lens system according to claim 1, wherein the first lens unit moves on a track having a convex shape on the image side along an optical axis, and the second lens unit contemporaneously moves to the object side along the optical axis during the zooming from the wide-angle end to the telephoto end.

4. The zoom lens system according to claim 1, wherein assuming that a combined magnification of the second and third lens units in the telephoto end is β323T, the following condition is satisfied:

$1.2 < |\beta 23T| < 1.9.$

5. The zoom lens system according to claim 1, wherein the first negative lens element has an aspherical surface on the image side, and has a meniscus shape which has a concave surface on the image side, and
   the second positive lens element has a meniscus shape which has a convex surface on the object side.

6. The zoom lens system according to claim 1, wherein the third positive lens element has a biconvex shape,
   the fourth positive lens element has a biconvex shape, and
   the fifth negative lens element has a biconcave shape.

7. The zoom lens system according to claim 1, wherein assuming that a total thickness of the fourth positive lens element and the fifth negative lens element along the optical axis is d, and the interval between the surface of the second lens unit closest to the object side and that of the second lens unit closest to the image side is D along the optical axis, the following condition is satisfied:

$0.35 < d/D < 0.60.$

8. The zoom lens system according to claim 1, wherein assuming that the interval between the surface of the second lens unit closest to the object side and that of the second lens unit closest to the image side is D along the optical axis, and a focal length of the whole system in the wide-angle end is fW, the following condition is satisfied:

$1.45 < D/fW < 1.80.$

9. The zoom lens system according to claim 1, wherein a focal length of the first lens unit is f1, and a focal length of the whole system in the wide-angle end is fW, the following condition is satisfied:

$-2.8 < f1/fW < -2.0.$

10. The zoom lens system according to claim 1, wherein a focal length of the second lens unit is f2, and a focal length of the whole system in the wide-angle end is fW, the following condition is satisfied:

$2.0 < f2/fW < 2.7.$

11. The zoom lens system according to claim 1, wherein the third lens unit has only positive lens elements as the lens elements.

12. The zoom lens system according to claim 1, which forms an image on a photoelectric conversion element.

13. An image pickup apparatus comprising:
    the zoom lens system according to claim 1 a zoom lens system including, in order from an object side to an image side,
    a first lens unit having a negative optical power, wherein the first lens unit includes only, in order from the object side to the image side, a first negative lens element and a second positive lens element as the lens elements;
    a second lens unit having a positive optical power, wherein the second lens unit includes only, in order from the object side to the image side, a third positive lens element, a fourth positive lens element, a fifth negative lens element and a sixth positive lens element as the lens elements; and
    a third lens unit having a positive optical power, wherein an interval between the first and second lens units, and an interval between the second and third lens units change during zooming, wherein the third lens unit moves to the image side during the zooming from a wide-angle end to a telephoto end, and wherein a focal length of the third lens unit is f3, a focal length of the whole system in the wide-angle end is fW, and the condition 4.0<f3/fW<5.0 is satisfied; and a photoelectric conversion element which receives an image formed by the zoom lens system.

14. A zoom lens system comprising, in order from an object side to an image side:

a first lens unit having a negative optical power, wherein the first lens unit includes only, in order from the object side to the image side, a first negative lens element and a second positive lens element as the lens elements;

a second lens unit having a positive optical power, wherein the second lens unit includes only, in order from the object side to the image side, a third positive lens element, a fourth positive lens element, a fifth negative lens element and a sixth positive lens element as the lens elements; and a third lens unit having a positive optical power, wherein an interval between the first and second lens units, and an interval between the second and third lens units change during zooming, wherein the third lens unit moves to the image side during the zooming from a wide-angle end to a telephoto end; and wherein assuming that the interval between the surface of the second lens unit closest to the object side and that of the second lens unit closest to the image side is D along the optical axis, a focal length of the whole system in the wide-angle end is fW, and the condition 1.45<D/fW<1.80 is satisfied.

* * * * *